(12) United States Patent
Hsieh et al.

(10) Patent No.: US 11,586,011 B2
(45) Date of Patent: Feb. 21, 2023

(54) OPTICAL IMAGING LENS

(71) Applicant: Genius Electronic Optical (Xiamen) Co., Ltd., Xiamen (CN)

(72) Inventors: Hung-Chien Hsieh, Taichung (TW); Hai Lin, Xiamen (CN); Qingzhi Zhu, Xiamen (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 297 days.

(21) Appl. No.: 17/032,422

(22) Filed: Sep. 25, 2020

(65) Prior Publication Data
US 2022/0050266 A1 Feb. 17, 2022

(30) Foreign Application Priority Data

Aug. 17, 2020 (CN) .......................... 202010824314.9

(51) Int. Cl.
*G02B 13/18* (2006.01)
*G02B 9/64* (2006.01)
*G02B 27/00* (2006.01)
*G02B 5/00* (2006.01)
*G02B 13/00* (2006.01)

(52) U.S. Cl.
CPC ............... *G02B 9/64* (2013.01); *G02B 13/18* (2013.01); *G02B 27/0081* (2013.01); *G02B 5/005* (2013.01); *G02B 13/002* (2013.01); *G02B 13/0045* (2013.01); *G02B 27/0025* (2013.01)

(58) Field of Classification Search
CPC ...... G02B 13/18; G02B 9/64; G02B 27/0081; G02B 5/005; G02B 13/0045; G02B 13/002; G02B 27/0025

USPC ........................ 359/708, 713, 740, 754, 755
See application file for complete search history.

(56) References Cited

U.S. PATENT DOCUMENTS

| | | | | |
|---|---|---|---|---|
| 10,429,621 B2 * | 10/2019 | Jhang | ................ | G02B 13/0045 |
| 10,459,200 B2 * | 10/2019 | Hsieh | ................ | G02B 13/0045 |
| 10,509,206 B2 * | 12/2019 | Jhang | .................... | G02B 1/041 |
| 10,585,265 B2 * | 3/2020 | Jhang | ...................... | G02B 9/64 |
| 10,705,319 B2 * | 7/2020 | Jhang | ...................... | G02B 9/64 |
| 10,725,269 B2 * | 7/2020 | Hsieh | ...................... | G02B 9/64 |
| 10,901,187 B2 * | 1/2021 | Jhang | ................ | G02B 13/0045 |
| 10,976,526 B2 * | 4/2021 | Hsieh | ...................... | G02B 9/64 |
| 11,009,684 B2 * | 5/2021 | Jhang | ...................... | G02B 9/64 |
| 2019/0101728 A1 * | 4/2019 | Hsieh | ...................... | G02B 9/64 |
| 2019/0101729 A1 * | 4/2019 | Hsieh | ................ | G02B 13/0045 |
| 2019/0204556 A1 * | 7/2019 | Jhang | ...................... | G02B 3/04 |
| 2019/0204558 A1 * | 7/2019 | Jhang | ................ | G02B 13/0045 |

(Continued)

FOREIGN PATENT DOCUMENTS

| CN | 109765679 A | * | 5/2019 | ............. | G02B 13/18 |
|---|---|---|---|---|---|
| CN | 111290104 A | | 6/2020 | | |

(Continued)

*Primary Examiner* — Evelyn A Lester
(74) *Attorney, Agent, or Firm* — Chen Yoshimura LLP

(57) ABSTRACT

An optical imaging lens may include a first, a second, a third, a fourth, a fifth, a sixth, a seventh, and an eighth lens elements positioned in an order from an object side to an image side. Through designing concave and/or convex surfaces of the eight lens elements, the improved optical imaging lens may provide better imaging quality while the system length may be shortened, the F-number may be reduced, the field of view may be extended, and the image height may be increased.

20 Claims, 33 Drawing Sheets

(56) References Cited

U.S. PATENT DOCUMENTS

| | | | |
|---|---|---|---|
| 2019/0204559 A1* | 7/2019 | Jhang | G02B 13/06 |
| 2019/0204560 A1* | 7/2019 | Jhang | G02B 9/64 |
| 2019/0361203 A1* | 11/2019 | Jhang | G02B 13/0045 |
| 2020/0124829 A1* | 4/2020 | Jhang | G02B 9/64 |
| 2020/0174227 A1 | 6/2020 | Nitta | |
| 2020/0201000 A1* | 6/2020 | Hsieh | G02B 13/0045 |
| 2020/0249439 A1 | 8/2020 | Song et al. | |
| 2020/0386971 A1* | 12/2020 | Jhang | G02B 9/64 |
| 2021/0096332 A1* | 4/2021 | Hsieh | G02B 13/0045 |
| 2021/0157092 A1 | 5/2021 | Chen et al. | |
| 2021/0165190 A1* | 6/2021 | Jhang | G02B 13/0045 |
| 2021/0191080 A1* | 6/2021 | Zhu | G02B 13/0045 |
| 2021/0191081 A1* | 6/2021 | Dong | G02B 13/0045 |
| 2021/0191082 A1* | 6/2021 | Zhang | G02B 9/64 |
| 2021/0191083 A1* | 6/2021 | Zhang | G02B 9/64 |
| 2021/0191084 A1* | 6/2021 | Dong | G02B 9/64 |
| 2021/0191085 A1* | 6/2021 | Lin | G02B 9/64 |
| 2021/0263285 A1 | 8/2021 | Wang et al. | |
| 2021/0294078 A1* | 9/2021 | Jhang | G02B 13/0045 |
| 2021/0302699 A1* | 9/2021 | Jhang | G02B 3/04 |
| 2021/0396964 A1* | 12/2021 | Hsieh | G02B 9/64 |
| 2021/0396965 A1* | 12/2021 | Hsieh | G02B 27/0025 |
| 2022/0050266 A1* | 2/2022 | Hsieh | G02B 3/04 |
| 2022/0050272 A1* | 2/2022 | Lin | G02B 13/0045 |
| 2022/0137362 A1* | 5/2022 | Hsieh | G02B 9/64 359/708 |
| 2022/0179173 A1* | 6/2022 | Hu | G02B 13/0045 |
| 2022/0179174 A1* | 6/2022 | Hu | G02B 13/0045 |
| 2022/0179175 A1* | 6/2022 | Lin | G02B 9/62 |
| 2022/0179176 A1* | 6/2022 | Lai | G02B 9/64 |

FOREIGN PATENT DOCUMENTS

| | | |
|---|---|---|
| JP | 2019-197088 A | 11/2019 |
| KR | 10-2020-0001452 A | 1/2020 |
| TW | 202129328 A | 8/2021 |

* cited by examiner

| Surface # | | Radius (mm) | Thickness /air gap (mm) | Refractive index | Abbe number | Focal length (mm) | Material |
|---|---|---|---|---|---|---|---|
| | Embodiment 1 |||||||
| | EFL = 6.710 mm ; HFOV = 38.944 degrees ; TTL = 8.565 mm |||||||
| | Fno = 1.700 ; Image Height = 6.150 mm |||||||
| OBJ | Object | INFINITY | INFINITY | | | | |
| STO | Aperture stop | INFINITY | -0.817 | | | | |
| L1A1 | 1st lens element | 2.921 | 0.951 | 1.535 | 55.690 | 7.039 | Plastic |
| L1A2 | | 11.375 | 0.085 | | | | |
| L2A1 | 2nd lens element | 7.540 | 0.313 | 1.661 | 20.373 | -18.006 | Plastic |
| L2A2 | | 4.555 | 0.306 | | | | |
| L3A1 | 3rd lens element | 15.836 | 0.564 | 1.535 | 55.690 | 25.912 | Plastic |
| L3A2 | | -113.422 | 0.429 | | | | |
| L4A1 | 4th lens element | -48.452 | 0.428 | 1.661 | 20.373 | -39.854 | Plastic |
| L4A2 | | 59.126 | 0.526 | | | | |
| L5A1 | 5th lens element | -16.853 | 1.001 | 1.535 | 55.690 | -12.751 | Plastic |
| L5A2 | | 11.775 | 0.278 | | | | |
| L6A1 | 6th lens element | 2.513 | 0.561 | 1.545 | 55.987 | 4.521 | Plastic |
| L6A2 | | -132.944 | 0.352 | | | | |
| L7A1 | 7th lens element | -10.750 | 0.383 | 1.535 | 55.690 | 42.422 | Plastic |
| L7A2 | | -7.395 | 0.783 | | | | |
| L8A1 | 8th lens element | -8.353 | 0.285 | 1.535 | 55.690 | -4.535 | Plastic |
| L8A2 | | 3.480 | 0.500 | | | | |
| TFA1 | Filtering unit | INFINITY | 0.260 | 1.560 | 51.300 | | |
| TFA2 | | INFINITY | 0.561 | | | | |
| IMA | Image plane | INFINITY | | | | | |

FIG. 8

| Embodiment 1 | | | | | | | |
|---|---|---|---|---|---|---|---|
| Aspherical Parameters | | | | | | | |
| Surface # | K | $a_4$ | $a_6$ | $a_8$ | $a_{10}$ | $a_{12}$ | $a_{14}$ | $a_{16}$ |
| L1A1 | -2.111141E-02 | 1.919234E-03 | -2.356646E-04 | 9.246136E-04 | -3.844325E-04 | -2.556838E-04 | 4.468473E-04 | -2.541237E-04 |
| L1A2 | 0.000000E+00 | -1.478377E-02 | 1.521544E-02 | -1.368123E-02 | 1.452900E-02 | -1.717730E-02 | 1.831520E-02 | -1.527110E-02 |
| L2A1 | -2.474868E+00 | -2.747768E-02 | 2.125474E-02 | -2.871701E-02 | 5.529599E-02 | -9.270309E-02 | 1.149537E-01 | -1.023612E-01 |
| L2A2 | 1.321880E+00 | -1.740891E-02 | 7.054026E-03 | -5.366232E-03 | -3.008780E-03 | 2.892428E-02 | -6.741556E-02 | 9.204452E-02 |
| L3A1 | 0.000000E+00 | -5.676874E-03 | 4.774254E-03 | -2.677979E-02 | 6.524287E-02 | -1.124455E-01 | 1.388223E-01 | -1.236606E-01 |
| L3A2 | 0.000000E+00 | -6.599295E-03 | -9.487286E-04 | -9.416810E-03 | 3.507360E-02 | -7.477841E-02 | 1.036285E-01 | -9.968754E-02 |
| L4A1 | 0.000000E+00 | -3.102133E-02 | 1.244102E-02 | -4.099588E-02 | 8.605559E-02 | -1.397688E-01 | 1.681016E-01 | -1.481593E-01 |
| L4A2 | 0.000000E+00 | -2.775140E-02 | 1.555084E-02 | -2.592570E-02 | 3.468826E-02 | -3.786476E-02 | 3.180793E-02 | -1.994848E-02 |
| L5A1 | -2.975723E+00 | -2.693405E-02 | 2.356705E-02 | -2.118968E-02 | 1.558904E-02 | -8.930916E-03 | 3.800398E-03 | -1.146034E-03 |
| L5A2 | -6.212574E+00 | -1.073807E-01 | 3.747680E-02 | -6.588188E-03 | -3.692464E-03 | 4.185907E-03 | -2.142725E-03 | 7.118155E-04 |
| L6A1 | -5.599044E+00 | -8.522451E-03 | -5.124636E-03 | 6.998725E-03 | -5.778129E-03 | 2.714098E-03 | -8.047582E-04 | 1.552520E-04 |
| L6A2 | 0.000000E+00 | 6.557943E-02 | -3.622861E-02 | 1.663945E-02 | -7.484081E-03 | 2.725073E-03 | -7.386788E-04 | 1.467115E-04 |
| L7A1 | 0.000000E+00 | 6.059621E-02 | -3.964898E-02 | 1.705981E-02 | -5.367942E-03 | 1.308192E-03 | -2.587062E-04 | 4.129697E-05 |
| L7A2 | -8.994832E+00 | 5.670916E-02 | -2.860726E-02 | 7.783284E-03 | -1.034214E-03 | -4.464519E-05 | 4.819161E-05 | -1.057689E-05 |
| L8A1 | 1.799536E+00 | -2.819887E-03 | -8.773739E-03 | 3.501088E-03 | -6.794290E-04 | 8.282275E-05 | -6.314451E-06 | 1.865982E-07 |
| L8A2 | -5.512178E-01 | -3.449695E-02 | 4.152855E-03 | -2.104204E-04 | -3.959055E-05 | 9.983331E-06 | -9.324802E-07 | 9.162984E-09 |
| Surface # | $a_{18}$ | $a_{20}$ | $a_{22}$ | $a_{24}$ | $a_{26}$ | $a_{28}$ | $a_{30}$ | |
| L1A1 | 5.491172E-05 | 1.346053E-05 | -1.288692E-05 | 4.069739E-06 | -6.948548E-07 | 6.405264E-08 | -2.514887E-09 | |
| L1A2 | 9.440905E-03 | -4.242929E-03 | 1.363335E-03 | -3.046139E-04 | 4.490412E-05 | -3.922833E-06 | 1.536883E-07 | |
| L2A1 | 6.541996E-02 | -2.998696E-02 | 9.763530E-03 | -2.202679E-03 | 3.272129E-04 | -2.877967E-05 | 1.135069E-06 | |
| L2A2 | -8.305964E-02 | 5.151834E-02 | -2.213958E-02 | 6.489986E-03 | -1.239949E-03 | 1.393108E-04 | -6.987198E-06 | |
| L3A1 | 7.967955E-02 | -3.694564E-02 | 1.214386E-02 | -2.745717E-03 | 4.035168E-04 | -3.441159E-05 | 1.276329E-06 | |
| L3A2 | 6.886909E-02 | -3.456981E-02 | 1.253005E-02 | -3.197820E-03 | 5.450260E-04 | -5.564378E-05 | 2.571286E-06 | |
| L4A1 | 9.548145E-02 | -4.478300E-02 | 1.509014E-02 | -3.555043E-03 | 5.553685E-04 | -5.163543E-05 | 2.160428E-06 | |
| L4A2 | 9.246509E-03 | -3.138448E-03 | 7.674234E-04 | -1.312850E-04 | 1.489233E-05 | -1.005665E-06 | 3.059247E-08 | |
| L5A1 | 2.386547E-04 | -3.337481E-05 | 2.942786E-06 | -1.344593E-07 | -7.077300E-11 | 2.950050E-10 | -9.334000E-12 | |
| L5A2 | -1.646896E-04 | 2.705477E-05 | -3.140647E-06 | 2.509103E-07 | -1.304996E-08 | 3.947560E-10 | -5.211000E-12 | |
| L6A1 | -1.856362E-05 | 1.032284E-06 | 4.907311E-08 | -1.368812E-08 | 1.084282E-09 | -4.152700E-11 | 6.510000E-13 | |
| L6A2 | -2.130680E-05 | 2.250456E-06 | -1.704046E-07 | 8.990943E-09 | -3.134230E-10 | 6.484000E-12 | -6.000000E-14 | |
| L7A1 | -5.125023E-06 | 4.754252E-07 | -3.186851E-08 | 1.487413E-09 | -4.569900E-11 | 8.300000E-13 | -7.000000E-15 | |
| L7A2 | 1.388901E-06 | -1.240043E-07 | 7.735804E-09 | -3.329690E-10 | 9.432000E-12 | -1.580000E-13 | 1.000000E-15 | |
| L8A1 | 2.111849E-08 | -3.435599E-09 | 2.508750E-10 | -1.114200E-11 | 3.070000E-13 | -5.000000E-15 | 0.000000E+00 | |
| L8A2 | 7.758179E-09 | -9.784670E-10 | 6.374700E-11 | -2.545000E-12 | 6.300000E-14 | -1.000000E-15 | 0.000000E+00 | |

FIG. 9

| Embodiment 2 ||||||||
|---|---|---|---|---|---|---|---|
| EFL = 6.661 mm ; HFOV = 40.953 degrees ; TTL = 8.372 mm ||||||||
| Fno = 1.700 ; Image Height = 6.150 mm ||||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.783 | | | | |
| L1A1 | 1st lens element | 2.898 | 0.949 | 1.535 | 55.690 | 6.930 | Plastic |
| L1A2 | | 11.599 | 0.082 | | | | |
| L2A1 | 2nd lens element | 7.302 | 0.328 | 1.661 | 20.373 | -17.853 | Plastic |
| L2A2 | | 4.445 | 0.318 | | | | |
| L3A1 | 3rd lens element | 16.791 | 0.553 | 1.535 | 55.690 | 24.888 | Plastic |
| L3A2 | | -64.784 | 0.410 | | | | |
| L4A1 | 4th lens element | -42.707 | 0.442 | 1.661 | 20.373 | -33.694 | Plastic |
| L4A2 | | 47.652 | 0.354 | | | | |
| L5A1 | 5th lens element | -21.377 | 0.946 | 1.535 | 55.690 | -12.553 | Plastic |
| L5A2 | | 10.000 | 0.191 | | | | |
| L6A1 | 6th lens element | 2.643 | 0.576 | 1.545 | 55.987 | 4.809 | Plastic |
| L6A2 | | -398.534 | 0.403 | | | | |
| L7A1 | 7th lens element | -9.323 | 0.396 | 1.535 | 55.690 | 57.266 | Plastic |
| L7A2 | | -7.261 | 1.046 | | | | |
| L8A1 | 8th lens element | -8.285 | 0.329 | 1.535 | 55.690 | -4.575 | Plastic |
| L8A2 | | 3.542 | 0.500 | | | | |
| TFA1 | Filtering unit | INFINITY | 0.260 | 1.560 | 51.300 | | |
| TFA2 | | INFINITY | 0.290 | | | | |
| IMA | Image plane | INFINITY | | | | | |

FIG. 12

| Embodiment 2 | | | | | | | |
|---|---|---|---|---|---|---|---|
| Aspherical Parameters | | | | | | | |
| Surface # | K | $a_4$ | $a_6$ | $a_8$ | $a_{10}$ | $a_{12}$ | $a_{14}$ | $a_{16}$ |
| L1A1 | -3.239065E-02 | 1.864143E-03 | -2.929711E-04 | 9.121400E-04 | -3.835212E-04 | -2.559268E-04 | 4.467860E-04 | -2.541177E-04 |
| L1A2 | 0.000000E+00 | -1.480323E-02 | 1.526163E-02 | -1.368960E-02 | 1.453000E-02 | -1.717701E-02 | 1.831535E-02 | -1.527107E-02 |
| L2A1 | -1.986671E+00 | -2.744052E-02 | 2.124073E-02 | -2.872252E-02 | 5.529630E-02 | -9.270258E-02 | 1.149536E-01 | -1.023612E-01 |
| L2A2 | 1.288011E+00 | -1.775219E-02 | 7.102522E-03 | -5.368977E-03 | -3.008443E-03 | 2.892275E-02 | -6.741589E-02 | 9.204458E-02 |
| L3A1 | 0.000000E+00 | -5.359789E-03 | 4.826868E-03 | -2.677806E-02 | 6.524936E-02 | -1.124446E-01 | 1.388224E-01 | -1.236605E-01 |
| L3A2 | 0.000000E+00 | -5.999268E-03 | -1.019644E-03 | -9.427546E-03 | 3.508139E-02 | -7.477697E-02 | 1.036281E-01 | -9.968759E-02 |
| L4A1 | 0.000000E+00 | -2.967300E-02 | 1.262345E-02 | -4.095203E-02 | 8.605706E-02 | -1.397676E-01 | 1.681013E-01 | -1.481592E-01 |
| L4A2 | 0.000000E+00 | -2.786026E-02 | 1.567376E-02 | -2.591681E-02 | 3.469395E-02 | -3.786460E-02 | 3.180798E-02 | -1.994848E-02 |
| L5A1 | 1.060524E+01 | -2.680106E-02 | 2.354088E-02 | -2.119303E-02 | 1.558904E-02 | -8.930895E-03 | 3.800400E-03 | -1.146034E-03 |
| L5A2 | -2.815123E+00 | -1.072124E-01 | 3.747752E-02 | -6.587792E-03 | -3.692352E-03 | 4.185982E-03 | -2.142725E-03 | 7.118158E-04 |
| L6A1 | -6.235328E+00 | -7.457863E-03 | -5.082618E-03 | 6.988102E-03 | -5.778143E-03 | 2.714222E-03 | -8.047398E-04 | 1.552534E-04 |
| L6A2 | 0.000000E+00 | 6.551860E-02 | -3.623084E-02 | 1.663722E-02 | -7.484278E-03 | 2.725067E-03 | -7.386790E-04 | 1.467115E-04 |
| L7A1 | 0.000000E+00 | 6.082917E-02 | -3.966099E-02 | 1.705346E-02 | -5.367864E-03 | 1.308204E-03 | -2.587061E-04 | 4.129696E-05 |
| L7A2 | -1.618550E+01 | 5.589347E-02 | -2.860139E-02 | 7.783161E-03 | -1.034204E-03 | -4.464450E-05 | 4.819162E-05 | -1.057689E-05 |
| L8A1 | 1.470442E+00 | -4.592345E-03 | -8.737840E-03 | 3.502228E-03 | -6.793994E-04 | 8.282377E-05 | -6.314444E-06 | 1.865963E-07 |
| L8A2 | -5.479351E-01 | -3.419610E-02 | 4.088459E-03 | -2.087499E-04 | -3.955952E-05 | 9.983347E-06 | -9.324468E-07 | 9.162401E-09 |
| Surface # | $a_{18}$ | $a_{20}$ | $a_{22}$ | $a_{24}$ | $a_{26}$ | $a_{28}$ | $a_{30}$ | |
| L1A1 | 5.491125E-05 | 1.346065E-05 | -1.288664E-05 | 4.069716E-06 | -6.948591E-07 | 6.405050E-08 | -2.514347E-09 | |
| L1A2 | 9.440890E-03 | -4.242936E-03 | 1.363332E-03 | -3.046134E-04 | 4.490430E-05 | -3.922863E-06 | 1.536907E-07 | |
| L2A1 | 6.541995E-02 | -2.998697E-02 | 9.763528E-03 | -2.202678E-03 | 3.272128E-04 | -2.877960E-05 | 1.135058E-06 | |
| L2A2 | -8.305968E-02 | 5.151834E-02 | -2.213958E-02 | 6.489987E-03 | -1.239948E-03 | 1.393108E-04 | -6.987204E-06 | |
| L3A1 | 7.967949E-02 | -3.694559E-02 | 1.214385E-02 | -2.745715E-03 | 4.035166E-04 | -3.441144E-05 | 1.276348E-06 | |
| L3A2 | 6.886910E-02 | -3.456986E-02 | 1.253006E-02 | -3.197818E-03 | 5.450252E-04 | -5.564363E-05 | 2.571261E-06 | |
| L4A1 | 9.548158E-02 | -4.478300E-02 | 1.509016E-02 | -3.555048E-03 | 5.553691E-04 | -5.163561E-05 | 2.160464E-06 | |
| L4A2 | 9.246512E-03 | -3.138448E-03 | 7.674236E-04 | -1.312849E-04 | 1.489234E-05 | -1.005665E-06 | 3.059221E-08 | |
| L5A1 | 2.386548E-04 | -3.337477E-05 | 2.942786E-06 | -1.344592E-07 | -7.075900E-11 | 2.950150E-10 | -9.334000E-12 | |
| L5A2 | -1.646895E-04 | 2.705478E-05 | -3.140647E-06 | 2.509103E-07 | -1.304996E-08 | 3.947560E-10 | -5.211000E-12 | |
| L6A1 | -1.856355E-05 | 1.032294E-06 | 4.907392E-08 | -1.368804E-08 | 1.084283E-09 | -4.152600E-11 | 6.510000E-13 | |
| L6A2 | -2.130680E-05 | 2.250456E-06 | -1.704046E-07 | 8.990944E-09 | -3.134230E-10 | 6.484000E-12 | -6.000000E-14 | |
| L7A1 | -5.125024E-06 | 4.754253E-07 | -3.186850E-08 | 1.487413E-09 | -4.569900E-11 | 8.300000E-13 | -7.000000E-15 | |
| L7A2 | 1.388902E-06 | -1.240043E-07 | 7.735804E-09 | -3.329690E-10 | 9.432000E-12 | -1.580000E-13 | 1.000000E-15 | |
| L8A1 | 2.111848E-08 | -3.435600E-09 | 2.508750E-10 | -1.114200E-11 | 3.070000E-13 | -5.000000E-15 | 0.000000E+00 | |
| L8A2 | 7.758163E-09 | -9.784660E-10 | 6.374700E-11 | -2.545000E-12 | 6.300000E-14 | -1.000000E-15 | 0.000000E+00 | |

FIG. 13

| Embodiment 3 |||||||
|---|---|---|---|---|---|---|
| EFL = 6.725 mm ; HFOV = 40.270 degrees ; TTL = 8.372 mm |||||||
| Fno = 1.700 ; Image Height = 6.150 mm |||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.822 | | | | |
| L1A1 | 1st lens element | 2.891 | 0.970 | 1.535 | 55.690 | 6.922 | Plastic |
| L1A2 | | 11.475 | 0.094 | | | | |
| L2A1 | 2nd lens element | 7.149 | 0.339 | 1.661 | 20.373 | -18.143 | Plastic |
| L2A2 | | 4.409 | 0.317 | | | | |
| L3A1 | 3rd lens element | 16.212 | 0.631 | 1.535 | 55.690 | 24.548 | Plastic |
| L3A2 | | -69.641 | 0.403 | | | | |
| L4A1 | 4th lens element | -51.988 | 0.430 | 1.661 | 20.373 | -34.777 | Plastic |
| L4A2 | | 42.036 | 0.374 | | | | |
| L5A1 | 5th lens element | -23.138 | 0.999 | 1.535 | 55.690 | -11.906 | Plastic |
| L5A2 | | 8.971 | 0.188 | | | | |
| L6A1 | 6th lens element | 2.686 | 0.528 | 1.545 | 55.987 | 4.671 | Plastic |
| L6A2 | | -47.358 | 0.405 | | | | |
| L7A1 | 7th lens element | -8.384 | 0.629 | 1.535 | 55.690 | 35.971 | Plastic |
| L7A2 | | -6.000 | 0.713 | | | | |
| L8A1 | 8th lens element | -8.327 | 0.447 | 1.535 | 55.690 | -4.568 | Plastic |
| L8A2 | | 3.543 | 0.500 | | | | |
| TFA1 | Filtering unit | INFINITY | 0.260 | 1.560 | 51.300 | | |
| TFA2 | | INFINITY | 0.406 | | | | |
| IMA | Image plane | INFINITY | | | | | |

FIG. 16

| Embodiment 3 | | | | | | | |
|---|---|---|---|---|---|---|---|
| Aspherical Parameters | | | | | | | |
| Surface # | K | $a_4$ | $a_6$ | $a_8$ | $a_{10}$ | $a_{12}$ | $a_{14}$ | $a_{16}$ |
| L1A1 | -3.423561E-02 | 1.806875E-03 | -2.992073E-04 | 9.135889E-04 | -3.820798E-04 | -2.556034E-04 | 4.467681E-04 | -2.541200E-04 |
| L1A2 | 0.000000E+00 | -1.471961E-02 | 1.526678E-02 | -1.369323E-02 | 1.452953E-02 | -1.717732E-02 | 1.831534E-02 | -1.527106E-02 |
| L2A1 | -2.034459E+00 | -2.741623E-02 | 2.121440E-02 | -2.873403E-02 | 5.529222E-02 | -9.270227E-02 | 1.149537E-01 | -1.023612E-01 |
| L2A2 | 1.243091E+00 | -1.782816E-02 | 7.063063E-03 | -5.394688E-03 | -3.005592E-03 | 2.892450E-02 | -6.741570E-02 | 9.204461E-02 |
| L3A1 | 0.000000E+00 | -5.340129E-03 | 4.755285E-03 | -2.679669E-02 | 6.524876E-02 | -1.124451E-01 | 1.388221E-01 | -1.236608E-01 |
| L3A2 | 0.000000E+00 | -6.159307E-03 | -1.109467E-03 | -9.438151E-03 | 3.508267E-02 | -7.477569E-02 | 1.036280E-01 | -9.968757E-02 |
| L4A1 | 0.000000E+00 | -2.922074E-02 | 1.257139E-02 | -4.092623E-02 | 8.605998E-02 | -1.397659E-01 | 1.681025E-01 | -1.481591E-01 |
| L4A2 | 0.000000E+00 | -2.720482E-02 | 1.574460E-02 | -2.591584E-02 | 3.469228E-02 | -3.786494E-02 | 3.180797E-02 | -1.994847E-02 |
| L5A1 | 3.558291E-01 | -2.677645E-02 | 2.351508E-02 | -2.119427E-02 | 1.558886E-02 | -8.930931E-03 | 3.800394E-03 | -1.146034E-03 |
| L5A2 | -4.812259E+00 | -1.073757E-01 | 3.748562E-02 | -6.586303E-03 | -3.692241E-03 | 4.185984E-03 | -2.142724E-03 | 7.118161E-04 |
| L6A1 | -7.640172E+00 | -7.108187E-03 | -5.126006E-03 | 6.987923E-03 | -5.778016E-03 | 2.714254E-03 | -8.047397E-04 | 1.552535E-04 |
| L6A2 | 0.000000E+00 | 6.629495E-02 | -3.615985E-02 | 1.663352E-02 | -7.484454E-03 | 2.725060E-03 | -7.386789E-04 | 1.467115E-04 |
| L7A1 | 0.000000E+00 | 6.105724E-02 | -3.963450E-02 | 1.705370E-02 | -5.367772E-03 | 1.308205E-03 | -2.587059E-04 | 4.129696E-05 |
| L7A2 | -1.239567E+01 | 5.566455E-02 | -2.860058E-02 | 7.783527E-03 | -1.034191E-03 | -4.464442E-05 | 4.819163E-05 | -1.057689E-05 |
| L8A1 | 1.414751E+00 | -4.514557E-03 | -8.736799E-03 | 3.502253E-03 | -6.793988E-04 | 8.282376E-05 | -6.314443E-06 | 1.865966E-07 |
| L8A2 | -5.486752E-01 | -3.410106E-02 | 4.087681E-03 | -2.087108E-04 | -3.955876E-05 | 9.983322E-06 | -9.324463E-07 | 9.162414E-09 |
| Surface # | $a_{18}$ | $a_{20}$ | $a_{22}$ | $a_{24}$ | $a_{26}$ | $a_{28}$ | $a_{30}$ | |
| L1A1 | 5.491233E-05 | 1.346028E-05 | -1.288677E-05 | 4.069767E-06 | -6.948613E-07 | 6.405564E-08 | -2.513287E-09 | |
| L1A2 | 9.440887E-03 | -4.242933E-03 | 1.363333E-03 | -3.046132E-04 | 4.490433E-05 | -3.922871E-06 | 1.536882E-07 | |
| L2A1 | 6.541996E-02 | -2.998696E-02 | 9.763528E-03 | -2.202678E-03 | 3.272128E-04 | -2.877961E-05 | 1.135063E-06 | |
| L2A2 | -8.305964E-02 | 5.151834E-02 | -2.213958E-02 | 6.489984E-03 | -1.239948E-03 | 1.393107E-04 | -6.987126E-06 | |
| L3A1 | 7.967943E-02 | -3.694558E-02 | 1.214385E-02 | -2.745714E-03 | 4.035167E-04 | -3.441155E-05 | 1.276303E-06 | |
| L3A2 | 6.886912E-02 | -3.456985E-02 | 1.253006E-02 | -3.197818E-03 | 5.450262E-04 | -5.564355E-05 | 2.571193E-06 | |
| L4A1 | 9.548165E-02 | -4.478300E-02 | 1.509016E-02 | -3.555048E-03 | 5.553694E-04 | -5.163569E-05 | 2.160481E-06 | |
| L4A2 | 9.246510E-03 | -3.138448E-03 | 7.674237E-04 | -1.312850E-04 | 1.489234E-05 | -1.005667E-06 | 3.059175E-08 | |
| L5A1 | 2.386548E-04 | -3.337479E-05 | 2.942787E-06 | -1.344596E-07 | -7.071500E-11 | 2.950190E-10 | -9.333000E-12 | |
| L5A2 | -1.646895E-04 | 2.705478E-05 | -3.140647E-06 | 2.509103E-07 | -1.304996E-08 | 3.947550E-10 | -5.211000E-12 | |
| L6A1 | -1.856355E-05 | 1.032292E-06 | 4.907384E-08 | -1.368804E-08 | 1.084284E-09 | -4.152600E-11 | 6.510000E-13 | |
| L6A2 | -2.130680E-05 | 2.250456E-06 | -1.704046E-07 | 8.990944E-09 | -3.134230E-10 | 6.484000E-12 | -6.000000E-14 | |
| L7A1 | -5.125023E-06 | 4.754253E-07 | -3.186851E-08 | 1.487413E-09 | -4.569900E-11 | 8.300000E-13 | -7.000000E-15 | |
| L7A2 | 1.388902E-06 | -1.240043E-07 | 7.735804E-09 | -3.329690E-10 | 9.432000E-12 | -1.580000E-13 | 1.000000E-15 | |
| L8A1 | 2.111847E-08 | -3.435600E-09 | 2.508750E-10 | -1.114200E-11 | 3.070000E-13 | -5.000000E-15 | 0.000000E+00 | |
| L8A2 | 7.758159E-09 | -9.784660E-10 | 6.374700E-11 | -2.545000E-12 | 6.300000E-14 | -1.000000E-15 | 0.000000E+00 | |

FIG. 17

| Embodiment 4 |||||||
|---|---|---|---|---|---|---|
| EFL = 5.260 mm ; HFOV = 43.137 degrees ; TTL = 7.405 mm |||||||
| Fno = 1.700 ; Image Height = 6.150 mm |||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.452 | | | | |
| L1A1 | 1st lens element | 2.921 | 0.749 | 1.535 | 55.690 | 6.797 | Plastic |
| L1A2 | | 13.298 | 0.089 | | | | |
| L2A1 | 2nd lens element | 5.369 | 0.408 | 1.661 | 20.373 | -19.828 | Plastic |
| L2A2 | | 3.703 | 0.340 | | | | |
| L3A1 | 3rd lens element | 11.703 | 0.462 | 1.535 | 55.690 | 23.403 | Plastic |
| L3A2 | | 167.299 | 0.275 | | | | |
| L4A1 | 4th lens element | -92.315 | 0.368 | 1.661 | 20.373 | -41.754 | Plastic |
| L4A2 | | 39.956 | 0.169 | | | | |
| L5A1 | 5th lens element | -12.950 | 0.869 | 1.535 | 55.690 | -11.781 | Plastic |
| L5A2 | | 12.663 | 0.227 | | | | |
| L6A1 | 6th lens element | 2.328 | 0.634 | 1.545 | 55.987 | 3.970 | Plastic |
| L6A2 | | -28.733 | 0.155 | | | | |
| L7A1 | 7th lens element | -10.429 | 0.400 | 1.535 | 55.690 | 17.986 | Plastic |
| L7A2 | | -5.082 | 0.580 | | | | |
| L8A1 | 8th lens element | -8.334 | 0.499 | 1.535 | 55.690 | -4.401 | Plastic |
| L8A2 | | 3.369 | 0.500 | | | | |
| TFA1 | Filtering unit | INFINITY | 0.260 | 1.560 | 51.300 | | |
| TFA2 | | INFINITY | 0.418 | | | | |
| IMA | Image plane | INFINITY | | | | | |

FIG. 20

| Embodiment 4 | | | | | | | |
|---|---|---|---|---|---|---|---|
| Aspherical Parameters | | | | | | | |
| Surface # | K | $a_4$ | $a_6$ | $a_8$ | $a_{10}$ | $a_{12}$ | $a_{14}$ | $a_{16}$ |
| L1A1 | 5.896154E-02 | 3.009863E-03 | -2.042390E-03 | 4.924659E-03 | -6.263141E-03 | 6.267178E-03 | -5.009272E-03 | 3.219954E-03 |
| L1A2 | 6.027543E+00 | -1.520730E-02 | 2.053411E-02 | -2.348631E-02 | 2.453454E-02 | -1.851876E-02 | 8.337698E-03 | -8.409282E-04 |
| L2A1 | -2.117388E+00 | -2.820455E-02 | 2.420648E-02 | -3.295499E-02 | 5.059494E-02 | -6.453835E-02 | 6.289884E-02 | -4.640712E-02 |
| L2A2 | 7.383334E-01 | -1.960406E-02 | 8.940938E-03 | -7.768211E-03 | -5.504034E-03 | 4.741156E-02 | -1.060755E-01 | 1.390792E-01 |
| L3A1 | 2.775427E+00 | -4.807765E-03 | -3.201961E-03 | 3.761093E-03 | -1.130264E-02 | 1.276599E-02 | 5.435739E-05 | -1.875461E-02 |
| L3A2 | -9.354596E+01 | -6.270098E-03 | -6.148900E-03 | 2.877734E-03 | 1.972736E-02 | -7.216327E-02 | 1.229997E-01 | -1.305944E-01 |
| L4A1 | 9.500531E+01 | -3.152821E-02 | 1.015648E-02 | -2.178747E-02 | 2.190879E-02 | -5.252426E-03 | -1.889548E-02 | 3.190547E-02 |
| L4A2 | 7.257892E+01 | -2.568356E-02 | 6.000706E-03 | 3.878011E-03 | -2.447043E-02 | 4.172176E-02 | -4.300188E-02 | 3.030900E-02 |
| L5A1 | -5.135150E+00 | -2.532321E-02 | 2.206626E-02 | -1.708483E-02 | 9.388954E-03 | -3.145661E-03 | 2.069749E-04 | 4.255956E-04 |
| L5A2 | -9.737108E+01 | -1.095848E-01 | 3.538824E-02 | -2.712931E-03 | -8.364934E-03 | 8.053212E-03 | -4.326548E-03 | 1.576200E-03 |
| L6A1 | -6.191040E+00 | -4.989531E-03 | -7.123057E-03 | 7.386939E-03 | -6.343087E-03 | 3.200408E-03 | -1.060052E-03 | 2.434300E-04 |
| L6A2 | 6.377896E+01 | 6.210317E-02 | -3.483173E-02 | 1.426501E-02 | -5.840075E-03 | 2.035678E-03 | -5.457399E-04 | 1.090396E-04 |
| L7A1 | 5.804165E+00 | 5.957353E-02 | -3.893522E-02 | 1.574688E-02 | -4.558075E-03 | 1.035109E-03 | -2.012232E-04 | 3.336390E-05 |
| L7A2 | -2.142339E+01 | 5.614720E-02 | -2.935779E-02 | 8.183810E-03 | -1.252973E-03 | 3.925507E-05 | 2.661241E-05 | -6.784000E-06 |
| L8A1 | -1.730564E-01 | -2.785169E-03 | -1.087247E-02 | 5.394232E-03 | -1.558153E-03 | 3.354389E-04 | -5.479685E-05 | 6.666443E-06 |
| L8A2 | -5.637802E-01 | -3.321650E-02 | 2.862666E-03 | 6.160578E-04 | -3.500145E-04 | 8.462701E-05 | -1.321757E-05 | 1.442365E-06 |
| Surface # | $a_{18}$ | $a_{20}$ | $a_{22}$ | $a_{24}$ | $a_{26}$ | $a_{28}$ | $a_{30}$ | |
| L1A1 | -1.617257E-03 | 6.146841E-04 | -1.710197E-04 | 3.349371E-05 | -4.357607E-06 | 3.356878E-07 | -1.163079E-08 | |
| L1A2 | -1.563690E-03 | 1.171446E-03 | -4.411708E-04 | 1.022913E-04 | -1.479756E-05 | 1.231796E-06 | -4.432346E-08 | |
| L2A1 | 2.588263E-02 | -1.083537E-02 | 3.341740E-03 | -7.340955E-04 | 1.082757E-04 | -9.578540E-06 | 3.845938E-07 | |
| L2A2 | -1.209528E-01 | 7.262654E-02 | -3.034148E-02 | 8.676583E-03 | -1.621438E-03 | 1.785375E-04 | -8.787673E-06 | |
| L3A1 | 2.646996E-02 | -1.996542E-02 | 9.475599E-03 | -2.914675E-03 | 5.656309E-04 | -6.305649E-05 | 3.078898E-06 | |
| L3A2 | 9.391361E-02 | -4.718133E-02 | 1.663910E-02 | -4.049030E-03 | 6.490449E-04 | -6.181359E-05 | 2.654735E-06 | |
| L4A1 | -2.731676E-02 | 1.497329E-02 | -5.528981E-03 | 1.374132E-03 | -2.211525E-04 | 2.089054E-05 | -8.828365E-07 | |
| L4A2 | -1.515142E-02 | 5.426233E-03 | -1.383399E-03 | 2.451152E-04 | -2.867912E-05 | 1.991585E-06 | -6.215122E-08 | |
| L5A1 | -2.583649E-04 | 8.101022E-05 | -1.601729E-05 | 2.066514E-06 | -1.695558E-07 | 8.057002E-09 | -1.692070E-10 | |
| L5A2 | -4.079943E-04 | 7.588799E-05 | -1.006529E-05 | 9.274427E-07 | -5.632314E-08 | 2.024723E-09 | -3.251200E-11 | |
| L6A1 | -3.945390E-05 | 4.474693E-06 | -3.457021E-07 | 1.718768E-08 | -4.893230E-10 | 5.250000E-12 | -5.900000E-14 | |
| L6A2 | -1.606855E-05 | 1.729235E-06 | -1.335960E-07 | 7.191260E-09 | -2.555590E-10 | 5.383000E-12 | -5.100000E-14 | |
| L7A1 | -4.404401E-06 | 4.344737E-07 | -3.069605E-08 | 1.495454E-09 | -4.758000E-11 | 8.880000E-13 | -7.000000E-15 | |
| L7A2 | 9.236652E-07 | -8.377882E-08 | 5.294055E-09 | -2.311190E-10 | 6.652000E-12 | -1.130000E-13 | 1.000000E-15 | |
| L8A1 | -5.956234E-07 | 3.868344E-08 | -1.799785E-09 | 5.837900E-11 | -1.253000E-12 | 1.600000E-14 | 0.000000E+00 | |
| L8A2 | -1.127043E-07 | 6.336948E-09 | -2.540340E-10 | 7.075000E-12 | -1.300000E-13 | 1.000000E-15 | 0.000000E+00 | |

FIG. 21

| Embodiment 5 |||||||
| --- |||||||
| EFL = 6.511 mm ; HFOV = 41.478 degrees ; TTL = 8.558 mm |||||||
| Fno = 1.700 ; Image Height = 6.150 mm |||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.739 | | | | |
| L1A1 | 1st lens element | 2.919 | 1.407 | 1.535 | 55.690 | 6.983 | Plastic |
| L1A2 | | 10.958 | 0.053 | | | | |
| L2A1 | 2nd lens element | 8.223 | 0.306 | 1.661 | 20.373 | -17.888 | Plastic |
| L2A2 | | 4.796 | 0.308 | | | | |
| L3A1 | 3rd lens element | 17.608 | 0.553 | 1.535 | 55.690 | 24.834 | Plastic |
| L3A2 | | -54.395 | 0.275 | | | | |
| L4A1 | 4th lens element | -35.254 | 0.522 | 1.661 | 20.373 | -36.560 | Plastic |
| L4A2 | | 79.615 | 0.285 | | | | |
| L5A1 | 5th lens element | -18.469 | 0.985 | 1.535 | 55.690 | -13.104 | Plastic |
| L5A2 | | 11.584 | 0.179 | | | | |
| L6A1 | 6th lens element | 2.686 | 0.596 | 1.545 | 55.987 | 4.710 | Plastic |
| L6A2 | | -56.584 | 0.252 | | | | |
| L7A1 | 7th lens element | -10.695 | 0.399 | 1.535 | 55.690 | 24.874 | Plastic |
| L7A2 | | -6.017 | 0.742 | | | | |
| L8A1 | 8th lens element | -8.580 | 0.442 | 1.535 | 55.690 | -4.611 | Plastic |
| L8A2 | | 3.544 | 0.500 | | | | |
| TFA1 | Filtering unit | INFINITY | 0.260 | 1.560 | 51.300 | | |
| TFA2 | | INFINITY | 0.496 | | | | |
| IMA | Image plane | INFINITY | | | | | |

FIG. 24

| Embodiment 5 | | | | | | | |
|---|---|---|---|---|---|---|---|
| Aspherical Parameters | | | | | | | |
| Surface # | K | $a_4$ | $a_6$ | $a_8$ | $a_{10}$ | $a_{12}$ | $a_{14}$ | $a_{16}$ |
| L1A1 | -2.333771E-02 | 2.219473E-03 | -2.279404E-03 | 4.853273E-03 | -6.279399E-03 | 6.263238E-03 | -5.010247E-03 | 3.219534E-03 |
| L1A2 | 2.199987E+00 | -1.519149E-02 | 2.010914E-02 | -2.355144E-02 | 2.453321E-02 | -1.850879E-02 | 8.338766E-03 | -8.396305E-04 |
| L2A1 | -7.703519E-01 | -2.801051E-02 | 2.438619E-02 | -3.290287E-02 | 5.062590E-02 | -6.452320E-02 | 6.290496E-02 | -4.640538E-02 |
| L2A2 | 1.189753E+00 | -1.702116E-02 | 9.122973E-03 | -7.788089E-03 | -5.502603E-03 | 4.741819E-02 | -1.060727E-01 | 1.390810E-01 |
| L3A1 | 1.176116E+01 | -3.870070E-03 | -2.790405E-03 | 3.935407E-03 | -1.127184E-02 | 1.276452E-02 | 5.225208E-05 | -1.875468E-02 |
| L3A2 | 8.323750E+01 | -5.405191E-03 | -6.051129E-03 | 3.027105E-03 | 1.974437E-02 | -7.216131E-02 | 1.229983E-01 | -1.305951E-01 |
| L4A1 | 3.724553E+01 | -2.905978E-02 | 9.678760E-03 | -2.197033E-02 | 2.186118E-02 | -5.259300E-03 | -1.889528E-02 | 3.190509E-02 |
| L4A2 | -9.505620E+01 | -2.457394E-02 | 6.074196E-03 | 3.839589E-03 | -2.448472E-02 | 4.171921E-02 | -4.300212E-02 | 3.030893E-02 |
| L5A1 | 4.823037E+00 | -2.610047E-02 | 2.190086E-02 | -1.711158E-02 | 9.383811E-03 | -3.146647E-03 | 2.068263E-04 | 4.255783E-04 |
| L5A2 | -7.610200E+00 | -1.065964E-01 | 3.513098E-02 | -2.767497E-03 | -8.370624E-03 | 8.052997E-03 | -4.326529E-03 | 1.576214E-03 |
| L6A1 | -7.041824E+00 | -6.121473E-03 | -5.766528E-03 | 7.423423E-03 | -6.348096E-03 | 3.200728E-03 | -1.059897E-03 | 2.434637E-04 |
| L6A2 | 9.649725E+01 | 6.545491E-02 | -3.465555E-02 | 1.427216E-02 | -5.840430E-03 | 2.035594E-03 | -5.457500E-04 | 1.090386E-04 |
| L7A1 | 1.001174E+00 | 6.013661E-02 | -3.882664E-02 | 1.574234E-02 | -4.558313E-03 | 1.035109E-03 | -2.012263E-04 | 3.336371E-05 |
| L7A2 | -1.554339E+01 | 5.748082E-02 | -2.927091E-02 | 8.186942E-03 | -1.252929E-03 | 3.925106E-05 | 2.661186E-05 | -6.784045E-06 |
| L8A1 | 9.351361E-01 | -3.176670E-03 | -1.088787E-02 | 5.393996E-03 | -1.558140E-03 | 3.354406E-04 | -5.479674E-05 | 6.666450E-06 |
| L8A2 | -5.461150E-01 | -3.420381E-02 | 2.891085E-03 | 6.168640E-04 | -3.500058E-04 | 8.462781E-05 | -1.321755E-05 | 1.442364E-06 |
| Surface # | $a_{18}$ | $a_{20}$ | $a_{22}$ | $a_{24}$ | $a_{26}$ | $a_{28}$ | $a_{30}$ | |
| L1A1 | -1.617289E-03 | 6.146519E-04 | -1.710204E-04 | 3.350389E-05 | -4.356127E-06 | 3.364618E-07 | -1.166536E-08 | |
| L1A2 | -1.563294E-03 | 1.171517E-03 | -4.411318E-04 | 1.023128E-04 | -1.479198E-05 | 1.231437E-06 | -4.544422E-08 | |
| L2A1 | 2.588322E-02 | -1.083515E-02 | 3.341780E-03 | -7.340845E-04 | 1.082755E-04 | -9.580018E-06 | 3.832047E-07 | |
| L2A2 | -1.209524E-01 | 7.262660E-02 | -3.034150E-02 | 8.676583E-03 | -1.621445E-03 | 1.785366E-04 | -8.787939E-06 | |
| L3A1 | 2.646986E-02 | -1.996557E-02 | 9.475600E-03 | -2.914674E-03 | 5.656272E-04 | -6.305453E-05 | 3.079730E-06 | |
| L3A2 | 9.391355E-02 | -4.718130E-02 | 1.663913E-02 | -4.049019E-03 | 6.490479E-04 | -6.181234E-05 | 2.654893E-06 | |
| L4A1 | -2.731674E-02 | 1.497331E-02 | -5.528972E-03 | 1.374137E-03 | -2.211513E-04 | 2.089136E-05 | -8.825738E-07 | |
| L4A2 | -1.515146E-02 | 5.426227E-03 | -1.383401E-03 | 2.451148E-04 | -2.867915E-05 | 1.991594E-06 | -6.214530E-08 | |
| L5A1 | -2.583653E-04 | 8.101042E-05 | -1.601719E-05 | 2.066538E-06 | -1.695511E-07 | 8.057485E-09 | -1.691970E-10 | |
| L5A2 | -4.079920E-04 | 7.588837E-05 | -1.006524E-05 | 9.274447E-07 | -5.632367E-08 | 2.024454E-09 | -3.259100E-11 | |
| L6A1 | -3.945045E-05 | 4.475049E-06 | -3.456393E-07 | 1.719208E-08 | -4.886410E-10 | 5.515000E-12 | 2.400000E-14 | |
| L6A2 | -1.606862E-05 | 1.729232E-06 | -1.335961E-07 | 7.191285E-09 | -2.555530E-10 | 5.384000E-12 | -5.100000E-14 | |
| L7A1 | -4.404395E-06 | 4.344746E-07 | -3.069546E-08 | 1.495499E-09 | -4.757300E-11 | 8.890000E-13 | -7.000000E-15 | |
| L7A2 | 9.236623E-07 | -8.377904E-08 | 5.294042E-09 | -2.311200E-10 | 6.652000E-12 | -1.130000E-13 | 1.000000E-15 | |
| L8A1 | -5.956230E-07 | 3.868345E-08 | -1.799785E-09 | 5.837900E-11 | -1.253000E-12 | 1.600000E-14 | 0.000000E+00 | |
| L8A2 | -1.127043E-07 | 6.336947E-09 | -2.540340E-10 | 7.075000E-12 | -1.300000E-13 | 1.000000E-15 | 0.000000E+00 | |

FIG. 25

| Embodiment 6 |||||||
|---|---|---|---|---|---|---|
| EFL = 6.505 mm ; HFOV = 41.530 degrees ; TTL = 8.479 mm |||||||
| Fno = 1.700 ; Image Height = 6.150 mm |||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.751 | | | | |
| L1A1 | 1st lens element | 2.820 | 1.328 | 1.545 | 55.987 | 6.774 | Plastic |
| L1A2 | | 9.878 | 0.079 | | | | |
| L2A1 | 2nd lens element | 9.021 | 0.289 | 1.671 | 19.243 | -22.574 | Plastic |
| L2A2 | | 5.601 | 0.365 | | | | |
| L3A1 | 3rd lens element | 15.019 | 0.588 | 1.535 | 55.690 | 29.642 | Plastic |
| L3A2 | | 265.802 | 0.210 | | | | |
| L4A1 | 4th lens element | 34.140 | 0.562 | 1.671 | 19.243 | -29.335 | Plastic |
| L4A2 | | 12.479 | 0.104 | | | | |
| L5A1 | 5th lens element | 20.028 | 0.535 | 1.535 | 55.690 | 34.507 | Plastic |
| L5A2 | | -242.981 | 0.295 | | | | |
| L6A1 | 6th lens element | -13.707 | 1.169 | 1.535 | 55.690 | 6.848 | Plastic |
| L6A2 | | -2.984 | 0.020 | | | | |
| L7A1 | 7th lens element | 24.636 | 0.577 | 1.661 | 20.373 | -36.108 | Plastic |
| L7A2 | | 12.065 | 0.657 | | | | |
| L8A1 | 8th lens element | -96.648 | 0.595 | 1.535 | 55.690 | -5.058 | Plastic |
| L8A2 | | 2.798 | 0.685 | | | | |
| TFA1 | Filtering unit | INFINITY | 0.260 | 1.560 | 51.300 | | |
| TFA2 | | INFINITY | 0.161 | | | | |
| IMA | Image plane | INFINITY | | | | | |

FIG. 28

| Embodiment 6 |||||
|---|---|---|---|---|
| Aspherical Parameters |||||
| Surface # | K | $a_4$ | $a_6$ | $a_8$ | $a_{10}$ |
| L1A1 | 1.156932E-01 | 2.742701E-04 | 1.018766E-04 | -1.396122E-05 | 5.176020E-06 |
| L1A2 | 1.921611E+01 | -1.240120E-02 | 4.252444E-03 | -1.088785E-03 | 7.674740E-05 |
| L2A1 | 1.624221E+01 | -2.131896E-02 | 8.115606E-03 | -2.551648E-03 | 5.526370E-04 |
| L2A2 | 6.443112E+00 | -1.259047E-02 | 1.556515E-03 | 2.247797E-03 | -2.749909E-03 |
| L3A1 | 6.134066E+01 | -1.002127E-02 | 1.277405E-03 | -4.817506E-03 | 3.362604E-03 |
| L3A2 | -1.164821E+02 | -1.959225E-02 | 1.101404E-02 | -1.354895E-02 | 8.255307E-03 |
| L4A1 | 9.872308E+01 | -3.347143E-02 | 1.175305E-02 | -8.834872E-03 | 2.596965E-03 |
| L4A2 | -1.308663E+02 | -4.741004E-02 | 1.991116E-02 | -8.333090E-03 | 1.548718E-03 |
| L5A1 | -8.465156E+01 | -6.310032E-02 | 2.638714E-02 | -9.179019E-03 | 2.729565E-03 |
| L5A2 | -1.308080E+02 | -2.627054E-02 | 7.134480E-03 | -9.690177E-04 | 1.198776E-05 |
| L6A1 | 9.307886E+00 | -9.611467E-03 | 2.328504E-03 | -1.000999E-03 | 2.008914E-04 |
| L6A2 | -2.164077E+00 | -1.163201E-02 | 5.399422E-03 | -2.489584E-03 | 5.830394E-04 |
| L7A1 | 1.750526E+01 | -1.986100E-02 | 4.378823E-03 | -3.494278E-03 | 1.730237E-03 |
| L7A2 | -5.523990E+01 | -6.238066E-03 | -5.256685E-03 | 2.389622E-03 | -6.127191E-04 |
| L8A1 | 8.616990E+01 | -5.827775E-02 | 1.075730E-02 | -9.069573E-04 | 1.960322E-05 |
| L8A2 | -7.824723E+00 | -2.685850E-02 | 5.283093E-03 | -6.493656E-04 | 5.096080E-05 |
| Surface # | $a_{12}$ | $a_{14}$ | $a_{16}$ | $a_{18}$ | $a_{20}$ |
| L1A1 | 3.065841E-06 | -5.047157E-07 | -4.829740E-08 | | |
| L1A2 | 2.222793E-06 | 4.937522E-07 | 7.070353E-08 | | |
| L2A1 | -8.668159E-05 | 1.261722E-05 | -5.902598E-07 | | |
| L2A2 | 1.351793E-03 | -3.238389E-04 | 3.392770E-05 | | |
| L3A1 | -1.478754E-03 | 3.693071E-04 | -3.552185E-05 | | |
| L3A2 | -3.187462E-03 | 7.191841E-04 | -6.952469E-05 | | |
| L4A1 | -4.472130E-04 | 2.884468E-05 | -8.009725E-07 | | |
| L4A2 | 5.170732E-05 | -7.287764E-05 | 9.062637E-06 | | |
| L5A1 | -5.823043E-04 | 7.462373E-05 | -4.184500E-06 | | |
| L5A2 | 1.576758E-05 | -1.688584E-06 | 4.050206E-09 | | |
| L6A1 | -1.768048E-05 | 6.097548E-07 | 9.169300E-09 | | |
| L6A2 | -6.955437E-05 | 4.503610E-06 | -1.285187E-07 | | |
| L7A1 | -5.632315E-04 | 1.162444E-04 | -1.449652E-05 | 9.885493E-07 | -2.807073E-08 |
| L7A2 | 9.997590E-05 | -1.040350E-05 | 6.616516E-07 | -2.317821E-08 | 3.395710E-10 |
| L8A1 | 3.127435E-06 | -3.111254E-07 | 1.267983E-08 | -2.507280E-10 | 1.965000E-12 |
| L8A2 | -2.482474E-06 | 6.288531E-08 | -1.533010E-10 | -2.977000E-11 | 4.920000E-13 |

FIG. 29

| Embodiment 7 |||||||
|---|---|---|---|---|---|---|
| EFL = 6.563 mm ; HFOV = 41.515 degrees ; TTL = 8.382 mm |||||||
| Fno = 1.700 ; Image Height = 6.150 mm |||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.765 | | | | |
| L1A1 | 1st lens element | 2.849 | 1.146 | 1.545 | 55.987 | 6.885 | Plastic |
| L1A2 | | 10.084 | 0.111 | | | | |
| L2A1 | 2nd lens element | 9.115 | 0.438 | 1.671 | 19.243 | -23.346 | Plastic |
| L2A2 | | 5.671 | 0.385 | | | | |
| L3A1 | 3rd lens element | 15.834 | 0.548 | 1.535 | 55.690 | 34.052 | Plastic |
| L3A2 | | 117.258 | 0.223 | | | | |
| L4A1 | 4th lens element | 35.905 | 0.383 | 1.640 | 23.529 | -22.223 | Plastic |
| L4A2 | | 10.197 | 0.093 | | | | |
| L5A1 | 5th lens element | 12.822 | 0.471 | 1.642 | 22.409 | 24.967 | Plastic |
| L5A2 | | 61.157 | 0.449 | | | | |
| L6A1 | 6th lens element | -11.010 | 0.991 | 1.535 | 55.690 | 7.296 | Plastic |
| L6A2 | | -2.979 | 0.046 | | | | |
| L7A1 | 7th lens element | 18.553 | 0.603 | 1.661 | 20.373 | -37.285 | Plastic |
| L7A2 | | 10.489 | 0.833 | | | | |
| L8A1 | 8th lens element | -48.069 | 0.597 | 1.535 | 55.690 | -5.216 | Plastic |
| L8A2 | | 2.985 | 0.685 | | | | |
| TFA1 | Filtering unit | INFINITY | 0.260 | 1.560 | 51.300 | | |
| TFA2 | | INFINITY | 0.122 | | | | |
| IMA | Image plane | INFINITY | | | | | |

FIG. 32

| Embodiment 7 | | | | | |
|---|---|---|---|---|---|
| Aspherical Parameters | | | | | |
| Surface # | K | $a_4$ | $a_6$ | $a_8$ | $a_{10}$ |
| L1A1 | 1.345744E-01 | 2.166050E-04 | 1.779777E-04 | -5.634345E-06 | 6.167318E-06 |
| L1A2 | 1.958721E+01 | -1.257369E-02 | 4.397870E-03 | -1.056448E-03 | 7.836986E-05 |
| L2A1 | 1.609852E+01 | -2.150461E-02 | 8.087990E-03 | -2.549938E-03 | 5.539036E-04 |
| L2A2 | 6.622481E+00 | -1.370075E-02 | 1.780620E-03 | 2.273379E-03 | -2.754020E-03 |
| L3A1 | 5.462599E+01 | -1.156920E-02 | 1.371977E-03 | -4.822176E-03 | 3.361123E-03 |
| L3A2 | 9.982174E+01 | -1.955778E-02 | 1.098788E-02 | -1.354219E-02 | 8.239349E-03 |
| L4A1 | 1.042759E+01 | -3.535312E-02 | 1.207838E-02 | -8.872777E-03 | 2.578813E-03 |
| L4A2 | -1.289756E+02 | -4.872038E-02 | 1.986210E-02 | -8.340132E-03 | 1.546921E-03 |
| L5A1 | 4.092460E+00 | -6.172699E-02 | 2.640079E-02 | -9.181656E-03 | 2.730150E-03 |
| L5A2 | 9.532718E+01 | -2.607644E-02 | 7.346948E-03 | -9.435033E-04 | 1.519027E-05 |
| L6A1 | 3.622650E+00 | -9.286790E-03 | 2.399872E-03 | -9.994477E-04 | 2.004757E-04 |
| L6A2 | -2.042550E+00 | -1.171919E-02 | 5.359573E-03 | -2.492021E-03 | 5.826840E-04 |
| L7A1 | 3.119391E+01 | -2.061835E-02 | 4.448022E-03 | -3.487861E-03 | 1.729396E-03 |
| L7A2 | -6.742967E+01 | -5.851298E-03 | -5.251064E-03 | 2.386905E-03 | -6.128480E-04 |
| L8A1 | 8.102824E+01 | -5.829451E-02 | 1.075995E-02 | -9.068612E-04 | 1.960415E-05 |
| L8A2 | -8.798512E+00 | -2.728352E-02 | 5.288948E-03 | -6.492281E-04 | 5.096081E-05 |
| Surface # | $a_{12}$ | $a_{14}$ | $a_{16}$ | $a_{18}$ | $a_{20}$ |
| L1A1 | 2.956022E-06 | -5.646047E-07 | -1.767669E-08 | | |
| L1A2 | 1.970423E-06 | -2.303240E-08 | -2.049001E-08 | | |
| L2A1 | -8.714055E-05 | 1.214001E-05 | -7.742763E-07 | | |
| L2A2 | 1.349626E-03 | -3.241901E-04 | 3.401554E-05 | | |
| L3A1 | -1.479716E-03 | 3.687663E-04 | -3.586515E-05 | | |
| L3A2 | -3.194116E-03 | 7.184045E-04 | -6.929085E-05 | | |
| L4A1 | -4.420439E-04 | 3.251309E-05 | -1.573714E-07 | | |
| L4A2 | 5.017168E-05 | -7.274195E-05 | 9.275522E-06 | | |
| L5A1 | -5.821067E-04 | 7.451338E-05 | -4.243193E-06 | | |
| L5A2 | 1.595402E-05 | -1.688812E-06 | 2.424840E-10 | | |
| L6A1 | -1.786892E-05 | 5.694922E-07 | 2.640201E-09 | | |
| L6A2 | -6.959614E-05 | 4.501097E-06 | -1.283993E-07 | | |
| L7A1 | -5.633361E-04 | 1.162356E-04 | -1.449685E-05 | 9.885872E-07 | -2.805886E-08 |
| L7A2 | 9.997032E-05 | -1.040331E-05 | 6.616672E-07 | -2.317646E-08 | 3.396940E-10 |
| L8A1 | 3.127276E-06 | -3.111358E-07 | 1.267925E-08 | -2.507600E-10 | 1.963000E-12 |
| L8A2 | -2.482640E-06 | 6.287524E-08 | -1.537900E-10 | -2.978800E-11 | 4.910000E-13 |

FIG. 33

| Embodiment 8 ||||||||
|---|---|---|---|---|---|---|---|
| EFL = 6.739 mm；HFOV = 41.501 degrees；TTL = 8.553 mm ||||||||
| Fno = 1.700；Image Height = 6.150 mm ||||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.727 | | | | |
| L1A1 | 1st lens element | 3.098 | 1.075 | 1.545 | 55.987 | 7.271 | Plastic |
| L1A2 | | 12.348 | 0.133 | | | | |
| L2A1 | 2nd lens element | 9.160 | 0.363 | 1.671 | 19.243 | -20.397 | Plastic |
| L2A2 | | 5.421 | 0.557 | | | | |
| L3A1 | 3rd lens element | 24.615 | 0.535 | 1.535 | 55.690 | 48.166 | Plastic |
| L3A2 | | 513.074 | 0.116 | | | | |
| L4A1 | 4th lens element | 14.201 | 0.349 | 1.671 | 19.243 | -43.514 | Plastic |
| L4A2 | | 9.489 | 0.113 | | | | |
| L5A1 | 5th lens element | 14.338 | 0.349 | 1.535 | 55.690 | 29.181 | Plastic |
| L5A2 | | 168.583 | 0.469 | | | | |
| L6A1 | 6th lens element | -8.283 | 0.799 | 1.535 | 55.690 | 9.966 | Plastic |
| L6A2 | | -3.359 | 0.625 | | | | |
| L7A1 | 7th lens element | 6.397 | 0.600 | 1.661 | 20.373 | -72.823 | Plastic |
| L7A2 | | 5.440 | 0.775 | | | | |
| L8A1 | 8th lens element | -50.899 | 0.597 | 1.535 | 55.690 | -6.275 | Plastic |
| L8A2 | | 3.620 | 0.400 | | | | |
| TFA1 | Filtering unit | INFINITY | 0.260 | 1.560 | 51.300 | | |
| TFA2 | | INFINITY | 0.438 | | | | |
| IMA | Image plane | INFINITY | | | | | |

FIG. 36

| Embodiment 8 | | | | | |
|---|---|---|---|---|---|
| Aspherical Parameters | | | | | |
| Surface # | K | $a_4$ | $a_6$ | $a_8$ | $a_{10}$ |
| L1A1 | 1.105412E-01 | 3.595319E-04 | 1.946238E-04 | -3.315745E-06 | -1.845683E-06 |
| L1A2 | 2.468130E+01 | -9.960568E-03 | 4.114393E-03 | -1.061683E-03 | 9.638801E-05 |
| L2A1 | 1.445484E+01 | -2.007609E-02 | 8.302010E-03 | -2.525730E-03 | 5.531272E-04 |
| L2A2 | 6.845474E+00 | -1.475694E-02 | 2.535485E-03 | 2.143497E-03 | -2.778703E-03 |
| L3A1 | 7.799749E+01 | -1.014310E-02 | 1.692341E-03 | -4.692468E-03 | 3.316317E-03 |
| L3A2 | -9.500675E+01 | -2.602022E-02 | 1.084524E-02 | -1.333169E-02 | 8.227409E-03 |
| L4A1 | 5.183467E+01 | -4.400099E-02 | 1.172758E-02 | -8.839305E-03 | 2.625889E-03 |
| L4A2 | -3.056442E+01 | -4.984020E-02 | 1.895785E-02 | -8.425520E-03 | 1.574688E-03 |
| L5A1 | 1.242499E+01 | -6.270472E-02 | 2.604559E-02 | -9.220487E-03 | 2.725315E-03 |
| L5A2 | 8.046004E+01 | -2.621676E-02 | 7.336772E-03 | -9.894321E-04 | 4.107317E-06 |
| L6A1 | -3.340866E+01 | -7.499829E-03 | 2.400207E-03 | -1.008800E-03 | 1.969446E-04 |
| L6A2 | -1.299474E+00 | -9.526897E-03 | 6.112437E-03 | -2.480942E-03 | 5.796342E-04 |
| L7A1 | -5.227680E+01 | -1.529404E-02 | 3.661132E-03 | -3.267086E-03 | 1.706689E-03 |
| L7A2 | -4.970301E+01 | -5.108955E-03 | -5.381475E-03 | 2.376029E-03 | -6.123465E-04 |
| L8A1 | 9.574516E+01 | -5.822340E-02 | 1.071021E-02 | -9.074183E-04 | 1.963201E-05 |
| L8A2 | -1.198676E+01 | -2.599748E-02 | 5.244189E-03 | -6.518535E-04 | 5.120524E-05 |
| Surface # | $a_{12}$ | $a_{14}$ | $a_{16}$ | $a_{18}$ | $a_{20}$ |
| L1A1 | 2.706307E-06 | -1.873955E-07 | -8.657260E-08 | | |
| L1A2 | 4.713648E-06 | -4.619476E-07 | -1.462181E-07 | | |
| L2A1 | -8.569500E-05 | 1.288655E-05 | -1.029059E-06 | | |
| L2A2 | 1.359330E-03 | -3.211199E-04 | 3.152563E-05 | | |
| L3A1 | -1.496178E-03 | 3.682922E-04 | -3.469143E-05 | | |
| L3A2 | -3.217929E-03 | 7.164193E-04 | -6.629581E-05 | | |
| L4A1 | -4.234557E-04 | 3.383516E-05 | -1.130571E-06 | | |
| L4A2 | 5.908002E-05 | -7.288960E-05 | 8.594271E-06 | | |
| L5A1 | -5.820222E-04 | 7.470549E-05 | -4.175388E-06 | | |
| L5A2 | 1.358505E-05 | -1.759379E-06 | 6.790331E-08 | | |
| L6A1 | -1.782875E-05 | 6.134550E-07 | -3.763160E-10 | | |
| L6A2 | -6.993268E-05 | 4.477341E-06 | -1.283313E-07 | | |
| L7A1 | -5.664237E-04 | 1.164361E-04 | -1.443988E-05 | 9.896115E-07 | -2.892044E-08 |
| L7A2 | 9.997044E-05 | -1.040511E-05 | 6.616332E-07 | -2.317434E-08 | 3.400620E-10 |
| L8A1 | 3.129210E-06 | -3.110692E-07 | 1.268080E-08 | -2.508160E-10 | 1.956000E-12 |
| L8A2 | -2.481092E-06 | 6.260707E-08 | -1.646820E-10 | -2.983600E-11 | 5.060000E-13 |

FIG. 37

| Embodiment 9 |||||||
| --- |
| EFL = 6.488 mm ; HFOV = 41.500 degrees ; TTL = 8.343 mm |||||||
| Fno = 1.700 ; Image Height = 6.150 mm |||||||
| Surface # | | Radius (mm) | Thickness /air gap (mm) | Refractive index | Abbe number | Focal length (mm) | Material |
|---|---|---|---|---|---|---|---|
| OBJ | Object | INFINITY | INFINITY | | | | |
| STO | Aperture stop | INFINITY | -0.774 | | | | |
| L1A1 | 1st lens element | 2.818 | 1.085 | 1.545 | 55.987 | 6.693 | Plastic |
| L1A2 | | 10.611 | 0.079 | | | | |
| L2A1 | 2nd lens element | 9.076 | 0.349 | 1.671 | 19.243 | -22.422 | Plastic |
| L2A2 | | 5.593 | 0.489 | | | | |
| L3A1 | 3rd lens element | 19.331 | 0.645 | 1.535 | 55.690 | 43.908 | Plastic |
| L3A2 | | 106.447 | 0.186 | | | | |
| L4A1 | 4th lens element | 31.173 | 0.470 | 1.671 | 19.243 | -29.007 | Plastic |
| L4A2 | | 11.981 | 0.091 | | | | |
| L5A1 | 5th lens element | 16.636 | 0.492 | 1.535 | 55.690 | 69.478 | Plastic |
| L5A2 | | 29.731 | 0.258 | | | | |
| L6A1 | 6th lens element | -20.609 | 1.109 | 1.535 | 55.690 | 5.841 | Plastic |
| L6A2 | | -2.772 | 0.240 | | | | |
| L7A1 | 7th lens element | 20.057 | 0.241 | 1.661 | 20.373 | -29.318 | Plastic |
| L7A2 | | 9.855 | 0.637 | | | | |
| L8A1 | 8th lens element | 9.799 | 0.638 | 1.535 | 55.690 | -5.482 | Plastic |
| L8A2 | | 2.211 | 0.685 | | | | |
| TFA1 | Filtering unit | INFINITY | 0.260 | 1.560 | 51.300 | | |
| TFA2 | | INFINITY | 0.387 | | | | |
| IMA | Image plane | INFINITY | | | | | |

FIG. 40

| Embodiment 9 | | | | | |
|---|---|---|---|---|---|
| Aspherical Parameters | | | | | |
| Surface # | K | $a_4$ | $a_6$ | $a_8$ | $a_{10}$ |
| L1A1 | 1.565344E-01 | 5.197985E-04 | 2.599742E-04 | 6.605828E-06 | 8.956585E-06 |
| L1A2 | 2.005859E+01 | -1.207982E-02 | 4.643626E-03 | -1.053868E-03 | 7.804886E-05 |
| L2A1 | 1.607671E+01 | -2.120551E-02 | 8.047612E-03 | -2.475052E-03 | 5.227612E-04 |
| L2A2 | 6.864877E+00 | -1.256727E-02 | 1.490481E-03 | 2.280823E-03 | -2.734444E-03 |
| L3A1 | 6.777113E+01 | -1.088664E-02 | 1.498795E-03 | -4.853418E-03 | 3.422164E-03 |
| L3A2 | -1.400799E+02 | -2.051428E-02 | 1.096119E-02 | -1.353989E-02 | 8.244287E-03 |
| L4A1 | 8.276049E+01 | -3.493280E-02 | 1.170751E-02 | -8.788712E-03 | 2.544750E-03 |
| L4A2 | -1.402498E+02 | -4.893692E-02 | 1.960997E-02 | -8.358559E-03 | 1.553671E-03 |
| L5A1 | -1.404346E+02 | -6.339675E-02 | 2.650758E-02 | -9.153124E-03 | 2.732743E-03 |
| L5A2 | -1.249921E+02 | -2.720120E-02 | 6.968460E-03 | -9.539615E-04 | 1.447608E-05 |
| L6A1 | 2.558982E+01 | -1.100125E-02 | 2.408386E-03 | -9.962737E-04 | 1.979896E-04 |
| L6A2 | -2.210874E+00 | -1.077847E-02 | 5.491618E-03 | -2.472922E-03 | 5.836390E-04 |
| L7A1 | 3.556605E+01 | -2.017763E-02 | 4.263086E-03 | -3.522440E-03 | 1.731116E-03 |
| L7A2 | -3.593601E+01 | -6.703401E-03 | -5.225623E-03 | 2.385333E-03 | -6.125845E-04 |
| L8A1 | -7.199646E+01 | -5.879980E-02 | 1.074872E-02 | -9.071254E-04 | 1.960145E-05 |
| L8A2 | -6.345706E+00 | -2.727075E-02 | 5.231227E-03 | -6.491717E-04 | 5.097876E-05 |
| Surface # | $a_{12}$ | $a_{14}$ | $a_{16}$ | $a_{18}$ | $a_{20}$ |
| L1A1 | 3.653159E-06 | -2.702494E-07 | 1.151238E-09 | | |
| L1A2 | 2.123502E-06 | 8.227831E-09 | 3.923206E-08 | | |
| L2A1 | -8.375935E-05 | 1.220930E-05 | -7.309195E-07 | | |
| L2A2 | 1.349912E-03 | -3.255765E-04 | 3.418989E-05 | | |
| L3A1 | -1.500143E-03 | 3.745050E-04 | -3.680413E-05 | | |
| L3A2 | -3.194777E-03 | 7.201942E-04 | -6.857156E-05 | | |
| L4A1 | -4.394921E-04 | 3.297102E-05 | -4.217081E-07 | | |
| L4A2 | 5.018012E-05 | -7.310731E-05 | 9.049047E-06 | | |
| L5A1 | -5.819355E-04 | 7.463683E-05 | -4.214583E-06 | | |
| L5A2 | 1.593370E-05 | -1.678401E-06 | 5.722801E-09 | | |
| L6A1 | -1.796632E-05 | 6.128330E-07 | 1.073358E-08 | | |
| L6A2 | -6.960682E-05 | 4.484319E-06 | -1.301133E-07 | | |
| L7A1 | -5.630868E-04 | 1.162587E-04 | -1.449810E-05 | 9.881924E-07 | -2.810946E-08 |
| L7A2 | 1.000065E-04 | -1.040193E-05 | 6.616466E-07 | -2.318762E-08 | 3.383680E-10 |
| L8A1 | 3.127446E-06 | -3.111190E-07 | 1.267955E-08 | -2.507090E-10 | 1.962000E-12 |
| L8A2 | -2.481599E-06 | 6.288403E-08 | -1.538390E-10 | -2.975100E-11 | 4.920000E-13 |

FIG. 41

| Embodiment 10 |||||||
|---|---|---|---|---|---|---|
| EFL = 8.382 mm；HFOV = 31.615 degrees；TTL = 11.971 mm |||||||
| Fno = 1.700；Image Height = 6.150 mm |||||||
| Surface # | | Radius (mm) | Thickness /air gap (mm) | Refractive index | Abbe number | Focal length (mm) | Material |
| OBJ | Object | INFINITY | INFINITY | | | | |
| L1A1 | 1st lens element | 3.825 | 1.845 | 1.545 | 55.987 | 8.984 | Plastic |
| L1A2 | | 14.377 | 0.300 | | | | |
| STO | Aperture stop | INFINITY | -0.100 | | | | |
| L2A1 | 2nd lens element | 10.339 | 0.549 | 1.671 | 19.243 | -18.418 | Plastic |
| L2A2 | | 5.533 | 0.349 | | | | |
| L3A1 | 3rd lens element | 14.971 | 0.854 | 1.535 | 55.690 | 228.553 | Plastic |
| L3A2 | | 16.713 | 0.189 | | | | |
| L4A1 | 4th lens element | 15.752 | 0.654 | 1.671 | 19.243 | -52.292 | Plastic |
| L4A2 | | 10.721 | 0.106 | | | | |
| L5A1 | 5th lens element | 41.241 | 1.154 | 1.535 | 55.690 | 1452.365 | Plastic |
| L5A2 | | 43.119 | 0.201 | | | | |
| L6A1 | 6th lens element | -20.388 | 1.427 | 1.535 | 55.690 | 6.512 | Plastic |
| L6A2 | | -3.056 | 0.100 | | | | |
| L7A1 | 7th lens element | 8.752 | 1.211 | 1.661 | 20.373 | -26.639 | Plastic |
| L7A2 | | 5.539 | 1.205 | | | | |
| L8A1 | 8th lens element | 36.322 | 0.817 | 1.535 | 55.690 | -7.969 | Plastic |
| L8A2 | | 3.796 | 0.400 | | | | |
| TFA1 | Filtering unit | INFINITY | 0.260 | 1.560 | 51.300 | | |
| TFA2 | | INFINITY | 0.451 | | | | |
| IMA | Image plane | INFINITY | | | | | |

FIG. 44

| Embodiment 10 ||||||
|---|---|---|---|---|---|
| Aspherical Parameters ||||||
| Surface # | K | $a_4$ | $a_6$ | $a_8$ | $a_{10}$ |
| L1A1 | 2.856628E-01 | 8.398318E-04 | 1.752073E-04 | -1.109777E-05 | -1.324469E-06 |
| L1A2 | 3.185773E+01 | -8.225591E-03 | 4.138823E-03 | -9.795310E-04 | 9.033950E-05 |
| L2A1 | 1.841294E+01 | -2.034944E-02 | 8.542228E-03 | -2.548200E-03 | 5.438700E-04 |
| L2A2 | 4.497298E+00 | -1.652099E-02 | 3.438322E-03 | 2.288324E-03 | -2.843947E-03 |
| L3A1 | 6.290288E+01 | -9.679481E-03 | 1.346408E-03 | -4.414875E-03 | 3.416873E-03 |
| L3A2 | 2.047599E+01 | -1.751755E-02 | 9.836524E-03 | -1.367469E-02 | 8.419848E-03 |
| L4A1 | 2.409885E+01 | -3.499882E-02 | 8.875456E-03 | -8.669023E-03 | 2.764180E-03 |
| L4A2 | -7.069921E+00 | -5.573712E-02 | 2.095148E-02 | -8.002431E-03 | 1.544774E-03 |
| L5A1 | 8.986072E+01 | -5.601596E-02 | 2.712861E-02 | -9.384387E-03 | 2.692097E-03 |
| L5A2 | -8.595677E+01 | -2.337477E-02 | 6.041321E-03 | -9.635575E-04 | 1.083331E-05 |
| L6A1 | 3.335946E+01 | -3.722947E-03 | 2.683435E-03 | -1.028368E-03 | 1.978756E-04 |
| L6A2 | -2.099199E+00 | -9.331313E-03 | 5.809750E-03 | -2.516150E-03 | 5.724032E-04 |
| L7A1 | -9.447975E+01 | -7.781426E-03 | 2.793917E-03 | -3.365214E-03 | 1.734818E-03 |
| L7A2 | -4.078177E+01 | 4.855346E-03 | -6.114073E-03 | 2.359549E-03 | -6.069594E-04 |
| L8A1 | 9.113324E+01 | -3.688923E-02 | 7.383303E-03 | -8.083794E-04 | 2.316499E-05 |
| L8A2 | -7.392739E+00 | -2.502259E-02 | 5.099731E-03 | -6.440491E-04 | 5.104985E-05 |
| Surface # | $a_{12}$ | $a_{14}$ | $a_{16}$ | $a_{18}$ | $a_{20}$ |
| L1A1 | 2.250133E-06 | -4.007452E-07 | 2.570595E-08 | | |
| L1A2 | 1.065041E-06 | -3.387893E-07 | -3.884066E-08 | | |
| L2A1 | -9.028738E-05 | 1.162485E-05 | -7.997475E-07 | | |
| L2A2 | 1.359826E-03 | -3.142453E-04 | 2.996709E-05 | | |
| L3A1 | -1.507949E-03 | 3.535098E-04 | -3.443809E-05 | | |
| L3A2 | -3.151767E-03 | 7.079806E-04 | -7.226522E-05 | | |
| L4A1 | -3.629332E-04 | 4.417732E-05 | -1.036288E-05 | | |
| L4A2 | 4.874609E-05 | -7.257088E-05 | 8.423533E-06 | | |
| L5A1 | -5.883727E-04 | 7.407681E-05 | -3.741615E-06 | | |
| L5A2 | 1.507753E-05 | -1.682453E-06 | 3.554165E-08 | | |
| L6A1 | -1.762725E-05 | 5.854920E-07 | 1.429432E-09 | | |
| L6A2 | -7.015970E-05 | 4.497997E-06 | -1.162643E-07 | | |
| L7A1 | -5.648072E-04 | 1.161912E-04 | -1.447121E-05 | 9.896362E-07 | -2.850723E-08 |
| L7A2 | 1.001181E-04 | -1.041834E-05 | 6.603521E-07 | -2.319715E-08 | 3.450030E-10 |
| L8A1 | 3.066033E-06 | -3.162371E-07 | 1.268557E-08 | -2.379040E-10 | 2.390000E-13 |
| L8A2 | -2.484446E-06 | 6.285442E-08 | -1.497520E-10 | -2.965700E-11 | 4.790000E-13 |

FIG. 45

| Embodiment | 1st | 2nd | 3rd | 4th | 5th |
|---|---|---|---|---|---|
| (ImgH+EFL)/Fno (mm) | 7.565 | 7.536 | 7.574 | 6.712 | 7.448 |
| Tmax/Tmin | 3.514 | 2.894 | 2.947 | 2.359 | 4.600 |
| V4+V5+V6 | 132.050 | 132.050 | 132.050 | 132.050 | 132.050 |
| HFOV/EFL (degrees/mm) | 5.804 | 6.149 | 5.988 | 8.201 | 6.370 |
| TTL/(G34+T8) | 12.005 | 11.335 | 10.160 | 9.567 | 11.944 |
| (EFL+BFL)/(Gmax+Gmin) | 9.250 | 6.837 | 9.768 | 9.618 | 9.772 |
| ALT/(G67+T7+G78) | 2.956 | 2.449 | 2.846 | 3.868 | 3.740 |
| AAG/(T5+T6+T8) | 1.494 | 1.515 | 1.264 | 0.916 | 1.035 |
| (T4+T6)/(G12+G23+G34+G45) | 0.734 | 0.875 | 0.806 | 1.149 | 1.215 |
| HFOV/(T5+T6+BFL) (degrees/mm) | 13.512 | 15.923 | 14.954 | 16.085 | 14.622 |
| TL/(G45+G56) | 9.010 | 13.438 | 13.285 | 15.711 | 15.761 |
| (EFL+T1)/(T3+T4) | 7.727 | 7.646 | 7.252 | 7.234 | 7.367 |
| (T1+G12+T2)/(T4+G78) | 1.115 | 0.913 | 1.227 | 1.315 | 1.397 |
| ALT/Gmax | 5.729 | 4.321 | 6.970 | 7.570 | 7.019 |
| (T1+Gmax)/(T3+T7) | 1.832 | 2.100 | 1.336 | 1.542 | 2.258 |
| HFOV/TTL (degrees/mm) | 4.547 | 4.891 | 4.664 | 5.826 | 4.847 |
| TL/BFL | 5.485 | 6.975 | 6.405 | 5.283 | 5.815 |
| (EFL+TL)/ImgH | 2.269 | 2.274 | 2.308 | 1.868 | 2.246 |
| (G23+T3+BFL)/(T7+G78) | 1.879 | 1.332 | 1.574 | 2.021 | 1.856 |
| (AAG+BFL)/Gmax | 5.210 | 3.685 | 5.131 | 5.195 | 4.513 |

FIG. 46A

| Embodiment | 6th | 7th | 8th | 9th | 10th |
|---|---|---|---|---|---|
| (ImgH+EFL)/Fno (mm) | 7.444 | 7.478 | 7.582 | 7.434 | 8.548 |
| Tmax/Tmin | 4.600 | 2.991 | 3.082 | 4.598 | 3.363 |
| V4+V5+V6 | 130.623 | 101.628 | 130.623 | 130.623 | 130.623 |
| HFOV/EFL (degrees/mm) | 6.384 | 6.326 | 6.158 | 6.396 | 3.772 |
| TTL/(G34+T8) | 10.538 | 10.233 | 11.989 | 10.124 | 11.904 |
| (EFL+BFL)/(Gmax+Gmin) | 11.240 | 8.688 | 8.820 | 10.916 | 7.273 |
| ALT/(G67+T7+G78) | 4.499 | 3.495 | 2.334 | 4.494 | 3.383 |
| AAG/(T5+T6+T8) | 0.753 | 1.040 | 1.598 | 0.884 | 0.691 |
| (T4+T6)/(G12+G23+G34+G45) | 2.285 | 1.693 | 1.249 | 1.871 | 2.466 |
| HFOV/(T5+T6+BFL) (degrees/mm) | 14.775 | 16.415 | 18.483 | 14.144 | 8.564 |
| TL/(G45+G56) | 18.461 | 13.490 | 12.813 | 20.072 | 35.471 |
| (EFL+T1)/(T3+T4) | 6.814 | 8.281 | 8.837 | 6.796 | 6.784 |
| (T1+G12+T2)/(T4+G78) | 1.391 | 1.394 | 1.397 | 1.367 | 1.396 |
| ALT/Gmax | 8.588 | 6.215 | 6.019 | 7.890 | 7.062 |
| (T1+Gmax)/(T3+T7) | 1.704 | 1.720 | 1.631 | 1.944 | 1.477 |
| HFOV/TTL (degrees/mm) | 4.898 | 4.953 | 4.852 | 4.974 | 2.641 |
| TL/BFL | 6.662 | 6.850 | 6.790 | 5.259 | 9.779 |
| (EFL+TL)/ImgH | 2.256 | 2.256 | 2.308 | 2.195 | 3.129 |
| (G23+T3+BFL)/(T7+G78) | 1.669 | 1.394 | 1.592 | 2.807 | 0.958 |
| (AAG+BFL)/Gmax | 4.318 | 3.851 | 5.011 | 5.197 | 2.871 |

FIG. 46B

OPTICAL IMAGING LENS

CROSS-REFERENCE TO RELATED APPLICATIONS

This application claims priority to P.R.C. Patent Application No. 202010824314.9 titled "Optical Imaging Lens," filed on Aug. 17, 2020, with the State Intellectual Property Office of the People's Republic of China (SIPO).

TECHNICAL FIELD

The present disclosure relates to an optical imaging lens, and particularly, to an optical imaging lens having at least eight lens elements.

BACKGROUND

Recently, optical imaging lenses continue to evolve. In addition to requiring the lens to be thin and short, a large field of view has gradually become a market trend. Moreover, in order to improve the pixel and resolution, the image height of the optical imaging lens must be increased, and a larger image sensor is used to receive the imaging rays to meet the demand for high resolution. Therefore, how to design an optical imaging lens with small F-number, large field of view, large image height in addition to pursuing a light, thin and short lens is also the focus of research and development.

SUMMARY

In view of the above-mentioned problems, in addition to the good imaging quality of the optical imaging lens, shortening the length of the lens, decreasing the F-number, expanding the field of view, and increasing the image height are the key points of improvement of the present invention.

The present disclosure provides an optical imaging lens for capturing images and videos such as the optical imaging lens of cell phones, cameras, tablets, and personal digital assistants. By controlling the convex or concave shape of the surfaces of at least eight lens elements, the volume of the optical imaging lens may be reduced, the F-number may be decreased, the field of view may be enlarged, and the image height may be enlarged while maintaining good optical characteristics.

In the specification, parameters used herein may include:

| Parameter | Definition |
|---|---|
| T1 | A thickness of the first lens element along the optical axis |
| G12 | A distance from the image-side surface of the first lens element to the object-side surface of the second lens element along the optical axis, i.e., an air gap between the first lens element and the second lens element along the optical axis |
| T2 | A thickness of the second lens element along the optical axis |
| G23 | A distance from the image-side surface of the second lens element to the object-side surface of the third lens element along the optical axis, i.e., an air gap between the second lens element and the third lens element along the optical axis |
| T3 | A thickness of the third lens element along the optical axis |
| G34 | A distance from the image-side surface of the third lens element to the object-side surface of the fourth lens element along the optical axis, i.e., an air gap between the third lens element and the fourth lens element along the optical axis |
| T4 | A thickness of the fourth lens element along the optical axis |
| G45 | A distance from the image-side surface of the fourth lens element to the object-side surface of the fifth lens element along the optical axis, i.e., an air gap between the fourth lens element and the fifth lens element along the optical axis |
| T5 | A thickness of the fifth lens element along the optical axis |
| G56 | A distance from the image-side surface of the fifth lens element to the object-side surface of the sixth lens element along the optical axis, i.e., an air gap between the fifth lens element and the sixth lens element along the optical axis |
| T6 | A thickness of the sixth lens element along the optical axis |
| G67 | A distance from the image-side surface of the sixth lens element to the object-side surface of the seventh lens element along the optical axis, i.e., an air gap between the sixth lens element and the seventh lens element along the optical axis |
| T7 | A thickness of the seventh lens element along the optical axis |
| G78 | A distance from the image-side surface of the seventh lens element to the object-side surface of the eighth lens element along the optical axis, i.e., an air gap between the seventh lens element and the eighth lens element along the optical axis |
| T8 | A thickness of the eighth lens element along the optical axis |
| G8F | A distance from the image-side surface of the eighth lens element to the object-side surface of the filtering unit along the optical axis, i.e., an air gap between the eighth lens element and the filtering unit along the optical axis |
| TTF | A thickness of the filtering unit along the optical axis |
| GFP | An air gap between the filtering unit and the image plane along the optical axis |
| f1 | A focal length of the first lens element |
| f2 | A focal length of the second lens element |
| f3 | A focal length of the third lens element |
| f4 | A focal length of the fourth lens element |
| f5 | A focal length of the fifth lens element |
| f6 | A focal length of the sixth lens element |
| f7 | A focal length of the seventh lens element |
| f8 | A focal length of the eighth lens element |
| n1 | A refractive index of the first lens element |
| n2 | A refractive index of the second lens element |
| n3 | A refractive index of the third lens element |
| n4 | A refractive index of the fourth lens element |
| n5 | A refractive index of the fifth lens element |
| n6 | A refractive index of the sixth lens element |

| Parameter | Definition |
| --- | --- |
| n7 | A refractive index of the seventh lens element |
| n8 | A refractive index of the eighth lens element |
| V1 | An Abbe number of the first lens element |
| V2 | An Abbe number of the second lens element |
| V3 | An Abbe number of the third lens element |
| V4 | An Abbe number of the fourth lens element |
| V5 | An Abbe number of the fifth lens element |
| V6 | An Abbe number of the sixth lens element |
| V7 | An Abbe number of the seventh lens element |
| V8 | An Abbe number of the eighth lens element |
| HFOV | Half Field of View of the optical imaging lens |
| Fno | F-number of the optical imaging lens |
| EFL | An effective focal length of the optical imaging lens |
| TTL | A distance from the object-side surface of the first lens element to the image plane along the optical axis, i.e., the system length of the optical imaging lens |
| ALT | A sum of the thicknesses of the first lens element, the second lens element, the third lens element, the fourth lens element, the fifth lens element, the sixth lens element, the seventh lens element, and the eighth lens element along the optical axis |
| AAG | A sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis, a distance from the image-side surface of the fifth lens element to the object-side surface of the sixth lens element along the optical axis, a distance from the image-side surface of the sixth lens element to the object-side surface of the seventh lens element along the optical axis, and a distance from the image-side surface of the seventh lens element to the object-side surface of the eighth lens element along the optical axis |
| BFL | A back focal length of the optical imaging lens, i.e., a distance from the image-side surface of the eighth lens element to the image plane along the optical axis (i.e. a sum of G8F, TTF, and GFP) |
| TL | A distance from the object-side surface of the first lens element to the image-side surface of the eighth lens element along the optical axis |
| ImgH | An image height of the optical imaging lens |
| Tmax | A maximum lens element thickness among the first lens elements to the eighth lens elements along the optical axis, i.e., a maximum value of T1, T2, T3, T4, T5, T6, T7, and T8 |
| Tmin | A minimum lens element thickness among the first lens elements to the eighth lens elements along the optical axis, i.e., a minimum value of T1, T2, T3, T4, T5, T6, T7, and T8 |
| Gmax | A maximum air gap among the first lens elements to the eighth lens elements along the optical axis, i.e., a maximum value of G12, G23, G34, G45, G56, G67, and G78 |
| Gmin | A minimum air gap among the first lens elements to the eighth lens elements along the optical axis, i.e., a minimum value of G12, G23, G34, G45, G56, G67, and G78 |

According to one embodiment of the optical imaging lens of the present disclosure, an optical imaging lens may comprise a first lens element, a second lens element, a third lens element, a fourth lens element, a fifth lens element, a sixth lens element, a seventh lens element, and an eighth lens element sequentially from an object side to an image side along an optical axis. The first lens element to the eighth lens element may each comprise an object-side surface facing toward the object side and allowing imaging rays to pass through and an image-side surface facing toward the image side and allowing the imaging rays to pass through. A periphery region of the image-side surface of the first lens element may be concave. A periphery region of the image-side surface of the second lens element may be concave. A periphery region of the object-side surface of the third lens element may be concave. The fourth lens element may have negative refracting power. Lens elements included by the optical imaging lens are only the eight lens elements described above. The optical imaging lens may satisfy Inequality (1): (ImgH+EFL)/Fno≥6.000 mm and Inequality (2): Tmax/Tmin≤4.600.

According to another embodiment of the optical imaging lens of the present disclosure, an optical imaging lens may comprise a first lens element, a second lens element, a third lens element, a fourth lens element, a fifth lens element, a sixth lens element, a seventh lens element, and an eighth lens element sequentially from an object side to an image side along an optical axis. The first lens element to the eighth lens element may each comprise an object-side surface facing toward the object side and allowing imaging rays to pass through and an image-side surface facing toward the image side and allowing the imaging rays to pass through. A periphery region of the image-side surface of the first lens element may be concave. A periphery region of the object-side surface of the third lens element may be concave. The fourth lens element may have negative refracting power. A periphery region of the image-side surface of the fourth lens element may be convex. Lens elements included by the optical imaging lens are only the eight lens elements described above. The optical imaging lens may satisfy Inequality (1): (ImgH+EFL)/Fno≥6.000 mm and Inequality (2): Tmax/Tmin≤4.600.

According to another embodiment of the optical imaging lens of the present disclosure, an optical imaging lens may comprise a first lens element, a second lens element, a third lens element, a fourth lens element, a fifth lens element, a sixth lens element, a seventh lens element, and an eighth lens element sequentially from an object side to an image side along an optical axis. The first lens element to the eighth lens element may each comprise an object-side surface facing toward the object side and allowing imaging rays to pass through and an image-side surface facing toward the image side and allowing the imaging rays to pass through. A periphery region of the image-side surface of the first lens element may be concave. The fourth lens element may have negative refracting power. A periphery region of the image-side surface of the fourth lens element may be convex. A periphery region of the object-side surface of the eighth lens element may be concave. Lens elements included by the optical imaging lens are only the eight lens elements described above. The optical imaging lens may satisfy Inequality (1): (ImgH+EFL)/Fno≥6.000 mm, Inequality (2): Tmax/Tmin≤4.600, and Inequality (3): V4+V5+V6≥100.000.

In above three embodiments, some Inequalities could be taken into consideration as follows:

| | |
|---|---|
| HFOV/EFL ≤ 8.300 degrees/mm | Inequality (4); |
| HFOV/(T5 + T6 + BFL) ≤ 20.000 degrees/mm | Inequality (5); |
| HFOV/TTL ≤ 7.000 degrees/mm | Inequality (6); |
| (EFL + TL)/ImgH ≤ 3.500 | Inequality (7); |
| TTL/(G34 + T8) ≤ 12.000 | Inequality (8); |
| (EFL + BFL)/(Gmax + Gmin) ≥ 6.800 | Inequality (9); |
| ALT/(G67 + T7 + G78) ≤ 4.500 | Inequality (10); |
| AAG/(T5 + T6 + T8) ≤ 1.600 | Inequality (11); |
| (T4 + T6)/(G12 + G23 + G34 + G45) ≥ 0.700 | Inequality (12); |
| TL/(G45 + G56) ≥ 9.000 | Inequality (13); |
| (EFL + T1)/(T3 + T4) ≥ 6.700 | Inequality (14); |
| (T1 + G12 + T2)/(T4 + G78) ≤ 1.400 | Inequality (15); |
| ALT/Gmax ≥ 4.300 | Inequality (16); |
| (T1 + Gmax)/(T3 + T7) ≥ 1.300 | Inequality (17); |
| TL/BFL ≥ 5.200 | Inequality (18); |
| (G23 + T3 + BFL)/(T7 + G78) ≤ 2.850 | Inequality (19); |
| (AAG + BFL)/Gmax ≤ 5.250 | Inequality (20). |

Any one of the aforementioned inequalities may be selectively incorporated in other inequalities to apply to the present embodiments, and as such are not limiting. In some example embodiments, more details about the convex or concave surface structure, refracting power or chosen material etc. could be incorporated for one specific lens element or broadly for plural lens elements to enhance the control for the system performance and/or resolution. It is noted that the details listed here could be incorporated in example embodiments if no inconsistency occurs.

According to above illustration, the length of the optical imaging lens may be shortened, the F-number may be decreased, the field of view may be extended, and the image height may be enlarged while maintaining good optical characteristics by controlling the convex or concave shape of the surfaces of lens elements.

BRIEF DESCRIPTION OF THE DRAWINGS

Exemplary embodiments will be more readily understood from the following detailed description when read in conjunction with the appended drawings, in which:

FIG. 8 depicts a table of optical data for each lens element of an optical imaging lens of the first embodiment of the present disclosure;

FIG. 9 depicts a table of aspherical data of the first embodiment of an optical imaging lens according to the present disclosure;

FIG. 12 depicts a table of optical data for each lens element of an optical imaging lens of the second embodiment of the present disclosure;

FIG. 13 depicts a table of aspherical data of the second embodiment of the optical imaging lens according to the present disclosure;

FIG. 16 depicts a table of optical data for each lens element of the optical imaging lens of the third embodiment of the present disclosure;

FIG. 17 depicts a table of aspherical data of the third embodiment of the optical imaging lens according to the present disclosure;

FIG. 20 depicts a table of optical data for each lens element of an optical imaging lens of the fourth embodiment of the present disclosure;

FIG. 21 depicts a table of aspherical data of the fourth embodiment of the optical imaging lens according to the present disclosure;

FIG. 24 depicts a table of optical data for each lens element of the optical imaging lens of the fifth embodiment of the present disclosure;

FIG. 25 depicts a table of aspherical data of the fifth embodiment of the optical imaging lens according to the present disclosure;

FIG. 28 depicts a table of optical data for each lens element of the sixth embodiment of an optical imaging lens according to the present disclosure;

FIG. 29 depicts a table of aspherical data of the sixth embodiment of the optical imaging lens according to the present disclosure;

FIG. 32 depicts a table of optical data for each lens element of the seventh embodiment of an optical imaging lens according to the present disclosure;

FIG. 33 depicts a table of aspherical data of the seventh embodiment of the optical imaging lens according to the present disclosure;

FIG. 36 depicts a table of optical data for each lens element of the eighth embodiment of an optical imaging lens according to the present disclosure;

FIG. 37 depicts a table of aspherical data of the eighth embodiment of the optical imaging lens according to the present disclosure;

FIG. 40 depicts a table of optical data for each lens element of the ninth embodiment of an optical imaging lens according to the present disclosure;

FIG. 41 depicts a table of aspherical data of the ninth embodiment of the optical imaging lens according to the present disclosure;

FIG. 44 depicts a table of optical data for each lens element of the tenth embodiment of an optical imaging lens according to the present disclosure;

FIG. 45 depicts a table of aspherical data of the tenth embodiment of the optical imaging lens according to the present disclosure;

FIG. 46A is a table for the values of (ImgH+EFL)/Fno, Tmax/Tmin, V4+V5+V6, HFOV/EFL, TTL/(G34+T8), (EFL+BFL)/(Gmax+Gmin), ALT/(G67+T7+G78), AAG/(T5+T6+T8), (T4+T6)/(G12+G23+G34+G45), HFOV/(T5+T6+BFL), TL/(G45+G56), (EFL+T1)/(T3+T4), (T1+G12+T2)/(T4+G78), ALT/Gmax, (T1+Gmax)/(T3+T7), HFOV/TTL, TL/BFL, (EFL+TL)/ImgH, (G23+T3+BFL)/(T7+G78), and (AAG+BFL)/Gmax as determined in the first to fifth embodiments.

FIG. 46B is a table for the values of (ImgH+EFL)/Fno, Tmax/Tmin, V4+V5+V6, HFOV/EFL, TTL/(G34+T8), (EFL+BFL)/(Gmax+Gmin), ALT/(G67+T7+G78), AAG/(T5+T6+T8), (T4+T6)/(G12+G23+G34+G45), HFOV/(T5+T6+BFL), TL/(G45+G56), (EFL+T1)/(T3+T4), (T1+G12+T2)/(T4+G78), ALT/Gmax, (T1+Gmax)/(T3+T7), HFOV/TTL, TL/BFL, (EFL+TL)/ImgH, (G23+T3+BFL)/(T7+G78), and (AAG+BFL)/Gmax as determined in the sixth to tenth embodiments.

DETAILED DESCRIPTION

The terms "optical axis region", "periphery region", "concave", and "convex" used in this specification and claims should be interpreted based on the definition listed in the specification by the principle of lexicographer.

Figures 1, 2:
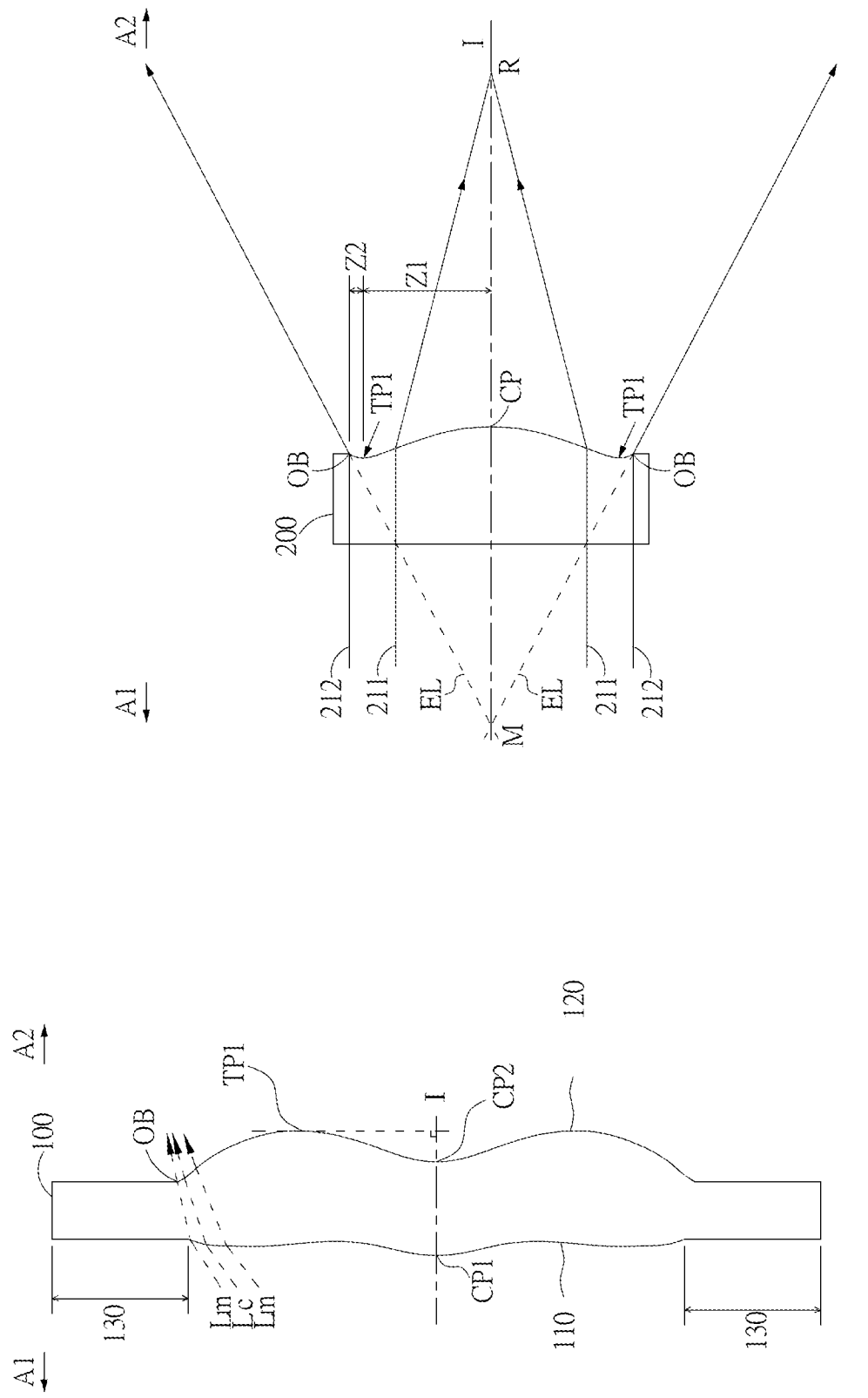
FIG. 1 depicts a cross-sectional view of one single lens element according to one embodiment of the present disclosure.
FIG. 2 depicts a schematic view of a relation between a surface shape and an optical focus of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
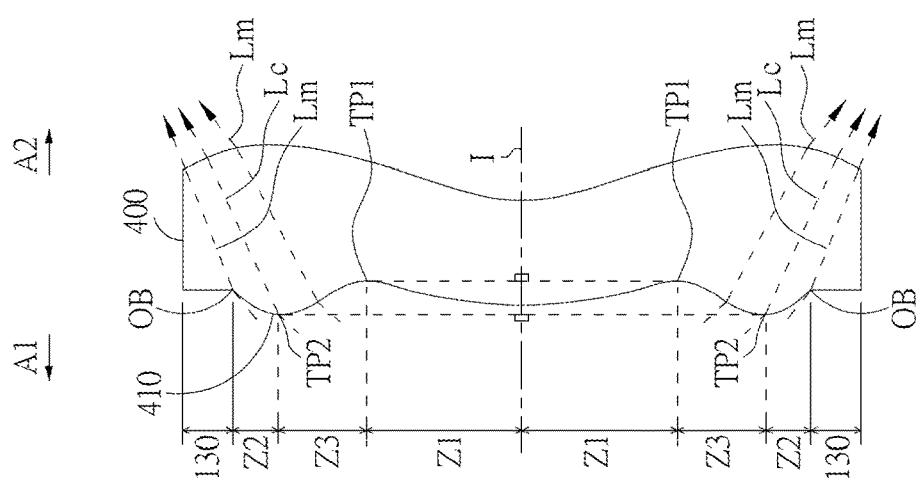
FIG. 4 depicts a schematic view of a second example of a surface shape and an effective radius of a lens element.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
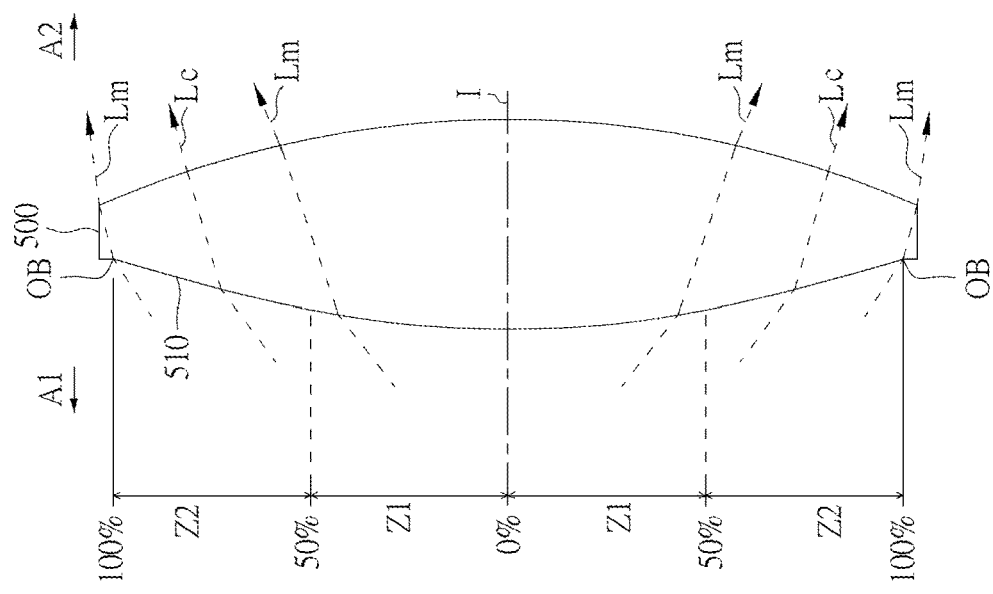
FIG. 5 depicts a schematic view of a third example of a surface shape and an effective radius of a lens element.
Figure 3:
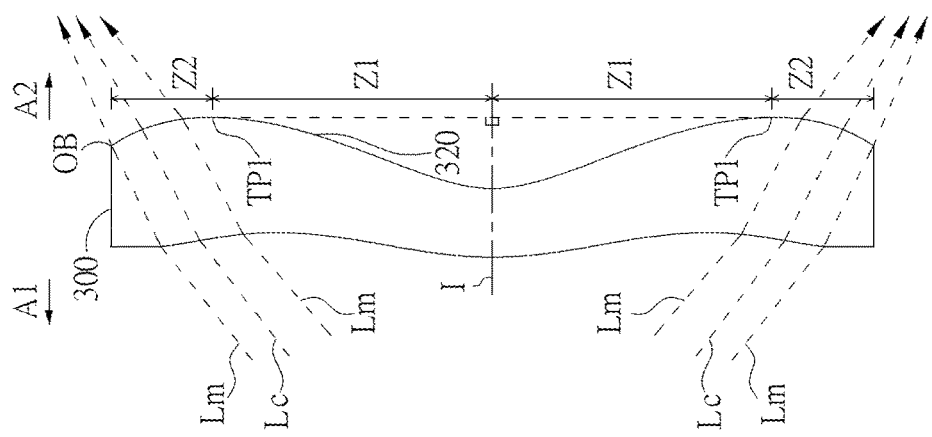
FIG. 3 depicts a schematic view of a first example of a surface shape and an effective radius of a lens element.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

The optical imaging lens of the present disclosure may comprise at least eight lens elements, in which a first lens element, a second lens element, a third lens element, a fourth lens element, a fifth lens element, a sixth lens element, a seventh lens element, and an eighth lens element are arranged sequentially from an object side to an image side along an optical axis. The first lens element to the eighth lens element may each comprise an object-side surface facing toward the object side and allowing imaging rays to pass through and an image-side surface facing toward the image side and allowing the imaging rays to pass through. Through designing concave and/or convex surfaces of each lens elements described below, the optical imaging lens may provide improved imaging quality, reduced length of the optical imaging lens, decreased F-number, extended field of view, and enlarged image height.

According to some embodiments of the present invention, decreasing the F-number and extending the field of view of the optical lens system while maintaining the imaging quality can be effectively achieved through the concave-convex design of the following surface shape and the limitation of the refracting power of lens elements: a periphery region of the image-side surface of the first lens element being concave, a periphery region of the object-side surface of the third lens element being concave, the fourth lens element having negative refracting power, and the optical imaging lens satisfying Inequality (1): (ImgH+EFL)/Fno≥6.000 mm and Inequality (2): Tmax/Tmin≤4.600, in conjunction with a periphery region of the image-side surface of the second lens element being concave or a periphery region of the image-side surface of the fourth lens element being convex. Further, a preferable range of Inequality (1) may be 6.000 mm≤(ImgH+EFL)/Fno≤9.000 mm and preferable range of Inequality (2) may be 2.100≤Tmax/Tmin≤4.600.

According to some embodiments of the present invention, decreasing the F-number and extending the field of view of the optical lens system while maintaining the imaging quality can be effectively achieved through the concave-convex design of the following surface shape and the limitation of the refracting power of lens elements: a periphery region of the image-side surface of the first lens element being concave, the fourth lens element having negative refracting power, a periphery region of the image-side surface of the fourth lens element being convex, a periphery region of the object-side surface of the eighth lens element being concave, and the optical imaging lens satisfying Inequality (1): (ImgH+EFL)/Fno≥6.000 mm and Inequality (2): Tmax/Tmin≤4.600. In addition, the chromatic aberration of the optical system may be improved when the optical imaging lens satisfies Inequality (3): V4+V5+V6≥100.000. Further, a preferable range of Inequality (3) may be 100.000≤V4+V5+V6≤145.000.

The extended field of view can be effectively achieved when the half field of view HFOV of the optical imaging lens satisfies Inequality (4), Inequality (5), and Inequality (6). Further, a preferable range of Inequality (4) may be 3.400 degrees/mm≤HFOV/EFL≤8.300≤degrees/mm, a preferable range of Inequality (5) may be 7.700 degrees/mm≤HFOV/(T5+T6+BFL)≤20.000 degrees/mm, and a preferable range of Inequality (6) may be 2.400 degrees/mm≤HFOV/TTL≤7.000 degrees/mm.

When the optical imaging lens satisfies Inequality (7), the system image height can be increased, and the imaging pixel and resolution can be improved, and a preferable range of Inequality (7) may be 1.700≤(EFL+TL)/ImgH≤3.500.

According to some embodiments of the present invention, to achieve a shortened length of lens system while maintaining image quality, values of the air gap between lens elements or the thickness of each lens element may be adjusted appropriately. The optical imaging lens may be designed to selectively satisfy inequalities (8)-(20). To consider ease of manufacturing the optical imaging lens, an optical imaging lens of the present disclosure may also satisfy one or more of the inequalities below:

$8.600 \leq TTL/(G34+T8) \leq 12.000;$ $6.800 \leq (EFL+BFL)/(G\max+G\min) \leq 12.000;$ $2.100 \leq ALT/(G67+T7+G78) \leq 4.500;$ $0.600 \leq AAG/(T5+T6+T8) \leq 1.600;$ $0.700 \leq (T4+T6)/(G12+G23+G34+G45) \leq 2.700;$ $9.000 \leq TL/(G45+G56) \leq 39.000;$ $6.700 \leq (EFL+T1)/(T3+T4) \leq 9.700;$ $0.800 \leq (T1+G12+T2)/(T4+G78) \leq 1.400;$ $4.300 \leq ALT/G\max \leq 9.400;$ $1.300 \leq (T1+G\max)/(T3+T7) \leq 2.500;$ $5.200 \leq TL/BFL \leq 10.700;$ $0.900 \leq (G23+T3+BFL)/(T7+G78) \leq 2.850;$ and $2.600 \leq (AAG+BFL)/G\max \leq 5.250.$ In addition, any combination of the embodiment parameters can be selected to increase the limitations of the optical imaging lens, so as to facilitate the design of the optical imaging lens of the same architecture of the present invention. In light of the unpredictability in an optical system, in the present disclosure, satisfying these inequalities listed above may result in promoting the imaging quality, shortening the system length, decreasing the F-number, increasing the field of view, increasing the image height and/or increasing the yield in the assembly process.

Several exemplary embodiments and associated optical data will now be provided to illustrate non-limiting examples of optical imaging lens systems having good optical characteristics, extended field of view, reduced F-number, and enlarged image height.

Figure 6:
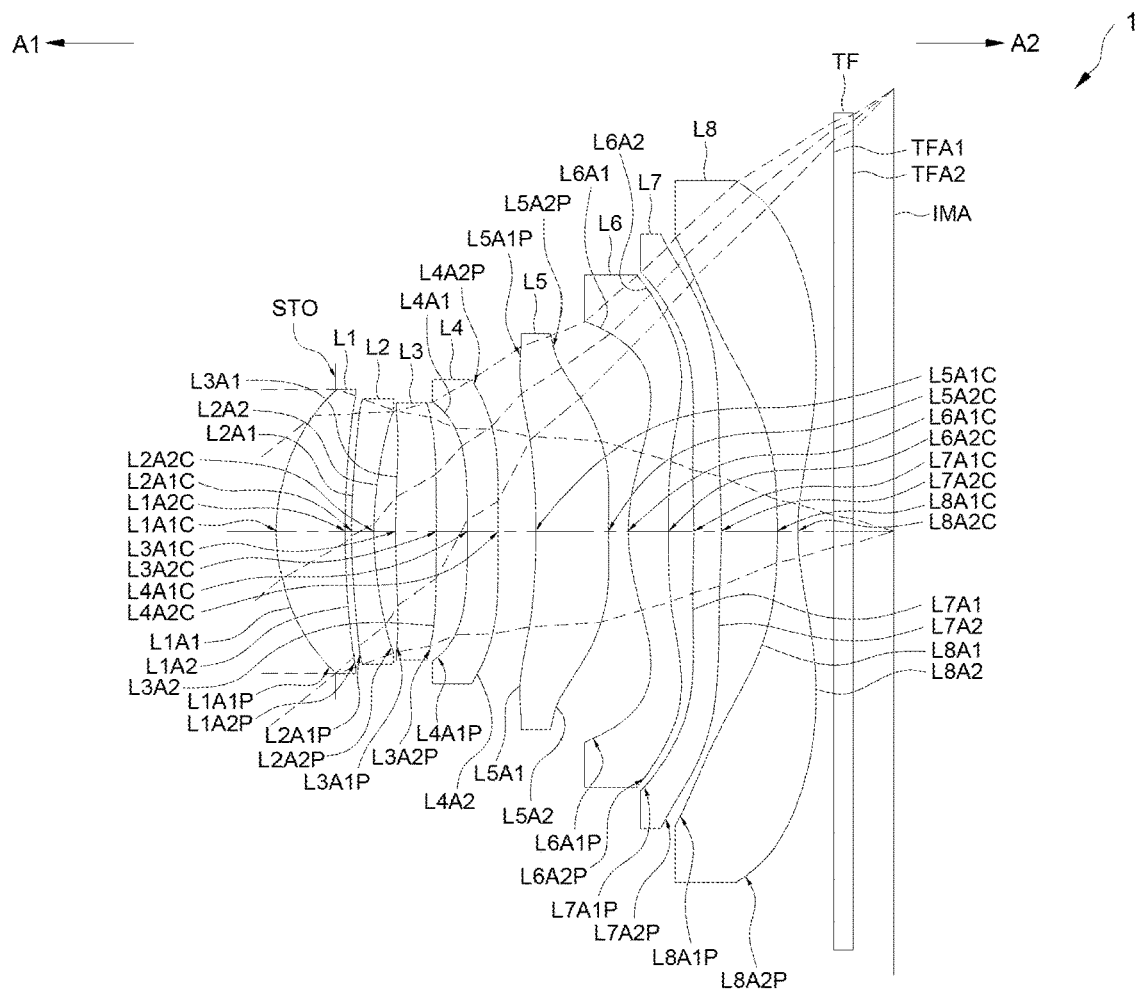
FIG. 6 depicts a cross-sectional view of the first embodiment of an optical imaging lens according to the present disclosure.
Figure 7:
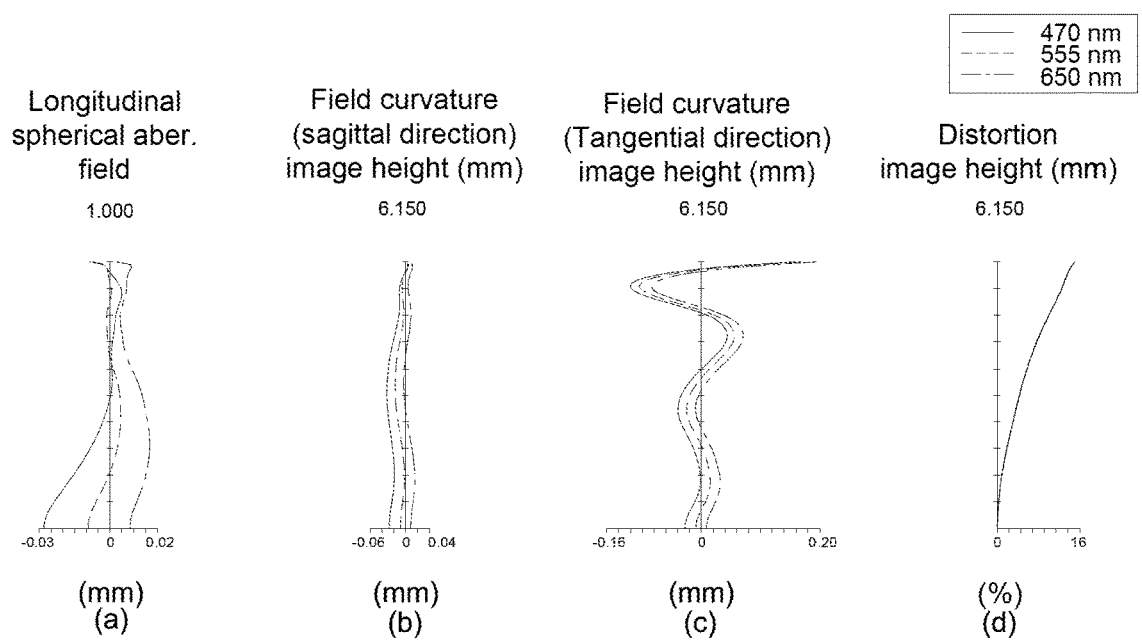
FIG. 7 depicts a chart of a longitudinal spherical aberration and other kinds of optical aberrations of the first embodiment of an optical imaging lens according to the present disclosure.

Reference is now made to FIGS. 6-9. FIG. 6 illustrates an example cross-sectional view of an optical imaging lens 1 according to a first example embodiment. FIG. 7 shows example charts of a longitudinal spherical aberration and other kinds of optical aberrations of the optical imaging lens 1 according to the first example embodiment. FIG. 8 illustrates an example table of optical data of each lens element of the optical imaging lens 1 according to the first example embodiment. FIG. 9 depicts an example table of aspherical data of the optical imaging lens 1 according to the first example embodiment.

As shown in FIG. 6, the optical imaging lens 1 of the present embodiment may comprise, in order from an object side A1 to an image side A2 along an optical axis, an aperture stop STO, a first lens element L1, a second lens element L2, a third lens element L3, a fourth lens element L4, a fifth lens element L5, a sixth lens element L6, a seventh lens element L7 and an eighth lens element L8. A filtering unit TF and an image plane IMA of an image sensor (not shown) are positioned at the image side A2 of the optical imaging lens 1. Each of the first, second, third, fourth, fifth, sixth, seventh and eighth lens elements L1, 1, L2, L3, L4, L5, L6, L7, L8 and the filtering unit TF may comprise an object-side surface L1A1/L2A1/L3A1/L4A1/L5A1/L6A1/L7A1/L8A1/TFA1 facing toward the object side A1 and an image-side surface L1A2/L2A2/L3A2/L4A2/L5A2/L6A2/L7A2/L8A2/TFA2 facing toward the image side A2. The example embodiment of the filtering unit TF illustrated may be an IR cut filter (infrared cut filter) positioned between the eighth lens element L8 and the image plane IMA. The filtering unit TF selectively absorbs light passing optical imaging lens 1 that has a specific wavelength to prevent the infrared ray in the light from being transmitted to the image plane and affecting the imaging quality.

Exemplary embodiments of each lens element of the optical imaging lens 1 will now be described with reference to the drawings. The lens elements L1, L2, L3, L4, L5, L6, L7, L8 of the optical imaging lens 1 may be constructed using plastic materials in this embodiment for the purpose of lightweight product, but is not limit thereto.

An example embodiment of the first lens element L1 may have positive refracting power. The optical axis region L1A1C and the periphery region L1A1P of the object-side surface L1A1 of the first lens element L1 may be convex. The optical axis region L1A2C and the periphery region L1A2P of the image-side surface L1A2 of the first lens element L1 may be concave.

An example embodiment of the second lens element L2 may have negative refracting power. The optical axis region L2A1C and the periphery region L2A1P of the object-side surface L2A1 of the second lens element L2 may be convex. The optical axis region L2A2C and the periphery region L2A2P of the image-side surface L2A2 of the second lens element L2 may be concave.

An example embodiment of the third lens element L3 may have positive refracting power. The optical axis region L3A1C of the object-side surface L3A1 of the third lens element L3 may be convex. The periphery region L3A1P of the object-side surface L3A1 of the third lens element L3 may be concave. The optical axis region L3A2C and the periphery region L3A2P of the image-side surface L3A2 of the third lens element L3 may be convex.

An example embodiment of the fourth lens element L4 may have negative refracting power. The optical axis region L4A1C and the periphery region L4A1P of the object-side surface L4A1 of the fourth lens element L4 may be concave. The optical axis region L4A2C of the image-side surface L4A2 of the fourth lens element L4 Lmay be concave. The periphery region L4A2P of the image-side surface L4A2 of the fourth lens element L4 Lmay be convex.

An example embodiment of the fifth lens element L5 Lmay have negative refracting power. The optical axis region L5A1C of the object-side surface L5A1 of the fifth lens element L5 Lmay be concave. The periphery region L5A1P of the object-side surface L5A1 of the fifth lens element L5 Lmay be convex. The optical axis region L5A2C of the image-side surface L5A2 Aof the fifth lens element L5 Lmay be concave. The periphery region L5A2P of the image-side surface L5A2 Aof the fifth lens element L5 Lmay be convex.

An example embodiment of the sixth lens element L6 Lmay have positive refracting power. The optical axis region L6A1C of the object-side surface L6A1 of the sixth lens element L6 Lmay be convex. The periphery region L6A1P of the object-side surface L6A1 of the sixth lens element L6 Lmay be concave. The optical axis region L6A2C and the periphery region L6A2P of the image-side surface L6A2 Aof the sixth lens element L6 Lmay be convex.

An example embodiment of the seventh lens element L7 Lmay have positive refracting power. The optical axis region L7A1C and the periphery region L7A1P of the object-side surface L7A1 of the seventh lens element L7 Lmay be concave. The optical axis region L7A2C and the periphery region L7A2P of the image-side surface L7A2 Aof the seventh lens element L7 Lmay be convex.

An example embodiment of the eighth lens element L8 Lmay have negative refracting power. The optical axis region L8A1C and the periphery region L8A1P of the object-side surface L8A1 of the eighth lens element L8 Lmay be concave. The optical axis region L8A2C of the image-side surface L8A2 Aof the eighth lens element L8 Lmay be concave. The periphery region L8A2P of the image-side surface L8A2 Aof the eighth lens element L8 Lmay be convex.

The totaled 16 aspherical surfaces including the object-side surface L1A1 and the image-side surface L1A2 Aof the first lens element L1, the object-side surface L2A1 and the image-side surface L2A2 Aof the second lens element L2, the object-side surface L3A1 and the image-side surface L3A2 Aof the third lens element L3, the object-side surface L4A1 and the image-side surface L4A2 Aof the fourth lens element L4, the object-side surface L5A1 and the image-side surface L5A2 Aof the fifth lens element L5, the object-side surface L6A1 and the image-side surface L6A2 Aof the sixth lens element L6, the object-side surface L7A1 and the image-side surface L7A2 Aof the seventh lens element L7, and the object-side surface L8A1 and the image-side surface L8A2 Aof the eighth lens element L8 Lmay all be defined by the following aspherical formula (1):

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \qquad \text{formula (1)}$$

wherein,

Z represents the depth of the aspherical surface (the perpendicular distance between the point of the aspherical surface at a distance Y from the optical axis and the tangent plane of the vertex on the optical axis of the aspherical surface);

R represents the radius of curvature of the surface of the lens element;

Y represents the perpendicular distance between the point of the aspherical surface and the optical axis;

K represents a conic constant; and $a_{2i}$ represents an aspherical coefficient of $2i^{th}$ level.

The values of each aspherical parameter are shown in FIG. 9.

FIG. 7(a) shows a longitudinal spherical aberration for three representative wavelengths (470 nm, 555 nm, 650 nm), wherein the vertical axis of FIG. 7(a) defines the field of view. FIG. 7(b) shows the field curvature aberration in the sagittal direction for three representative wavelengths (470 nm, 555 nm, 650 nm), wherein the vertical axis of FIG. 7(b) defines the image height. FIG. 7(c) shows the field curvature aberration in the tangential direction for three representative wavelengths (470 nm, 555 nm, 650 nm), wherein the vertical axis of FIG. 7(c) defines the image height. FIG. 7(d) shows a variation of the distortion aberration, wherein the vertical axis of FIG. 7(d) defines the image height. The three curves with different wavelengths (470 nm, 555 nm, 650 nm) may represent that off-axis light with respect to these wavelengths may be focused around an image point. From the vertical deviation of each curve shown in FIG. 7(a), the offset of the off-axis light relative to the image point may be within ±0.03 mm. Therefore, the first embodiment may improve the longitudinal spherical aberration with respect to different wavelengths. Referring to FIG. 7(b), the focus variation with respect to the three different wavelengths in the whole field may fall within ±0.06 mm. Referring to FIG. 7(c), and the focus variation with respect to the three different wavelengths in the whole field may fall within ±0.20 mm. Referring to FIG. 7(d), the variation of the distortion aberration may be within ±16%.

As shown in FIG. 8, the distance from the object-side surface L1A1 of the first lens element L1 Lto the image plane IMA along the optical axis (TTL) may be 8.565 mm, Fno may be 1.700, HFOV may be 38.944 degrees, the effective length (EFL) may be 6.710 mm, and the image height (ImgH) may be 6.150 mm. In conjunction with values of aberrations in FIG. 7, the present embodiment may provide an optical imaging lens 1 having a reduced volume and an extended field of view while improving optical performance.

Please refer to FIG. 46A for the values of (ImgH+EFL)/Fno, Tmax/Tmin, V4+V5+V6, HFOV/EFL, TTL/(G34+T8), (EFL+BFL)/(Gmax+Gmin), ALT/(G67+T7+G78), AAG/(T5+T6+T8), (T4+T6)/(G12+G23+G34+G45), HFOV/(T5+T6+BFL), TL/(G45+G56), (EFL+T1)/(T3+T4), (T1+G12+T2)/(T4+G78), ALT/Gmax, (T1+Gmax)/(T3+T7), HFOV/TTL, TL/BFL, (EFL+TL)/ImgH, (G23+T3+BFL)/(T7+G78), and (AAG+BFL)/Gmax of the present embodiment.

Figure 10:
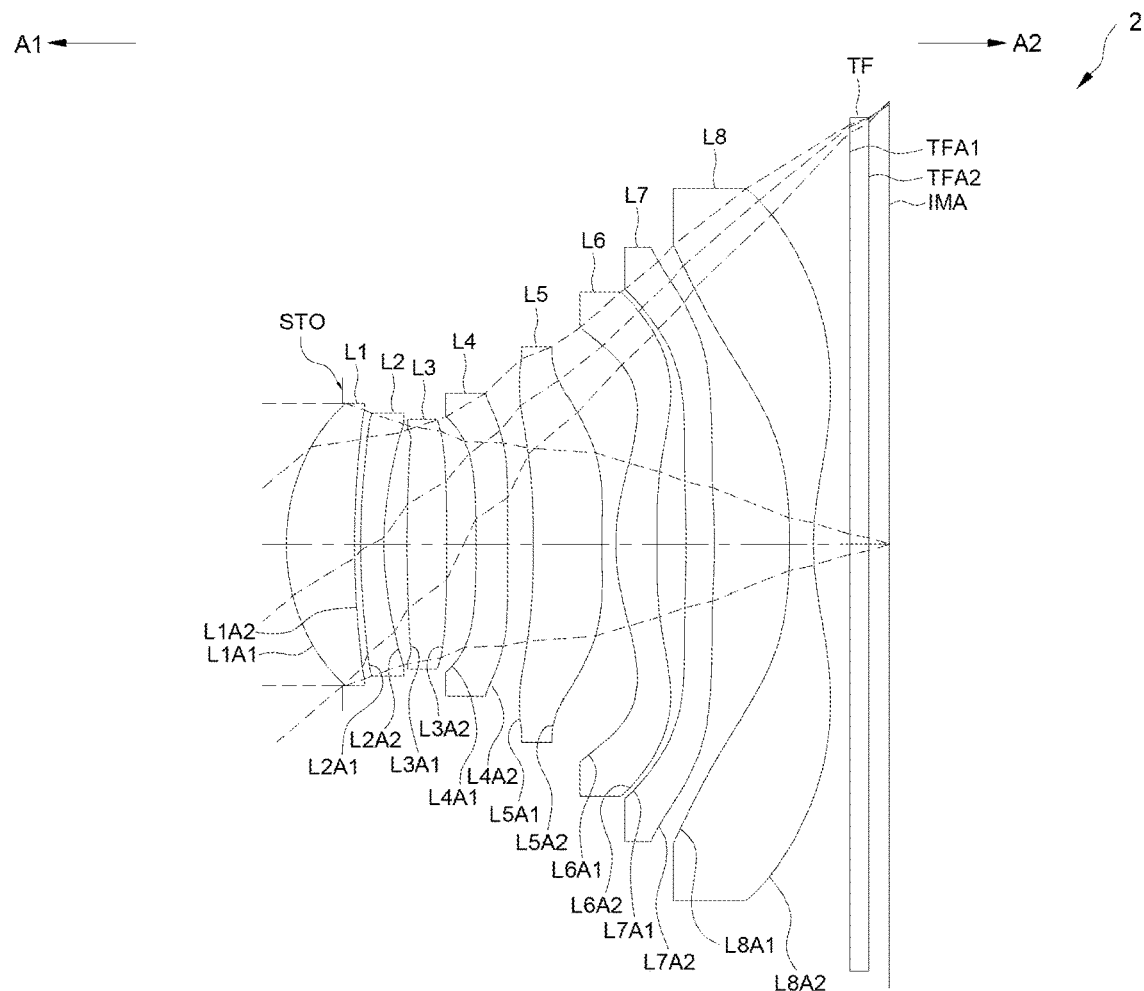
FIG. 10 depicts a cross-sectional view of the second embodiment of an optical imaging lens according to the present disclosure.
Figure 11:
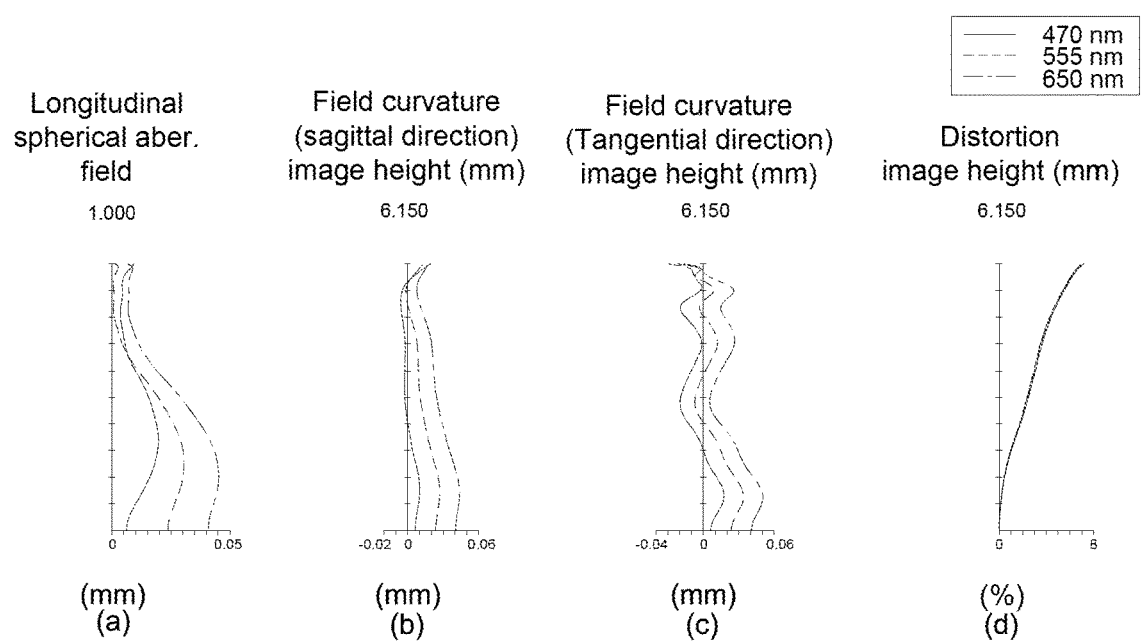
FIG. 11 depicts a chart of a longitudinal spherical aberration and other kinds of optical aberrations of the second embodiment of an optical imaging lens according to the present disclosure.

Reference is now made to FIGS. 10-13. FIG. 10 illustrates an example cross-sectional view of an optical imaging lens 2 according to a second example embodiment. FIG. 11 shows example charts of a longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment.

As shown in FIG. 10, the optical imaging lens 2 of the present embodiment, in an order from an object side A1 to an image side A2 Aalong an optical axis, may comprise an aperture stop STO, a first lens element L1, a second lens element L2, a third lens element L3, a fourth lens element L4, a fifth lens element L5, a sixth lens element L6, a seventh lens element L7, and an eighth lens element L8.

The arrangement of the convex or concave surface structures of the lens elements, including the object-side surfaces L1A1, L2A1, L3A1, L4A1, L5A1, L6A1, L7A1, and L8A1 and the image-side surfaces L1A2, L2A2, L3A2, L4A2, L5A2, L6A2, L7A2, and L8A2, and the refracting powers of the lens elements of the present embodiment may be generally similar to the optical imaging lens 1. Additional differences may include a radius of curvature, a thickness, aspherical data, and/or an effective focal length of each lens element.

Here, in the interest of clearly showing the drawings of the present embodiment, only the surface shapes which are different from that in the first embodiment may be labeled. Please refer to FIG. 12 for the optical characteristics of each lens element in the optical imaging lens 2 of the present embodiment.

From the vertical deviation of each curve shown in FIG. 11(a), the offset of the off-axis light relative to the image point may be within ±0.05 mm. Referring to FIG. 11(b), and the focus variation with respect to the three different wavelengths in the whole field may fall within ±0.06 mm. Referring to FIG. 11(c), the focus variation with respect to the three different wavelengths in the whole field may fall within ±0.06 mm. Referring to FIG. 11(d), the variation of the distortion aberration of the optical imaging lens 2 may be within ±8%.

As shown in FIG. 11 and FIG. 12, in comparison with the first embodiment, the field curvature aberration in the tangential direction, and the distortion aberration in the second embodiment may be smaller, the system length of the optical imaging lens 2 in the second embodiment may be shorter, and the field of view in the second embodiment may be larger.

Please refer to FIG. 46A for the values of (ImgH+EFL)/Fno, Tmax/Tmin, V4+V5+V6, HFOV/EFL, TTL/(G34+T8), (EFL+BFL)/(Gmax+Gmin), ALT/(G67+T7+G78), AAG/(T5+T6+T8), (T4+T6)/(G12+G23+G34+G45), HFOV/(T5+T6+BFL), TL/(G45+G56), (EFL+T1)/(T3+T4), (T1+G12+T2)/(T4+G78), ALT/Gmax, (T1+Gmax)/(T3+T7), HFOV/TTL, TL/BFL, (EFL+TL)/ImgH, (G23+T3+BFL)/(T7+G78), and (AAG+BFL)/Gmax of the present embodiment.

Figure 14:
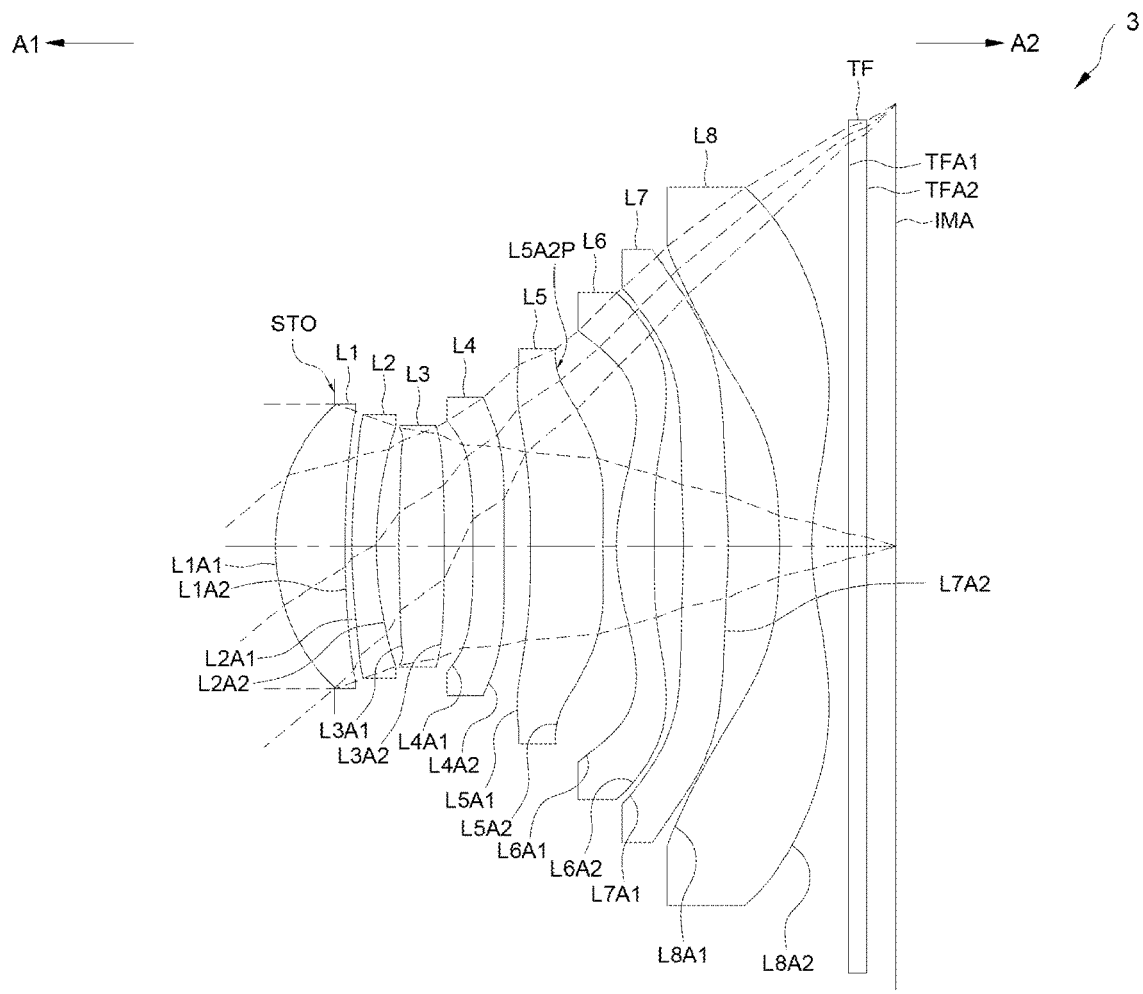
FIG. 14 depicts a cross-sectional view of the third embodiment of an optical imaging lens according to the present disclosure.
Figure 15:
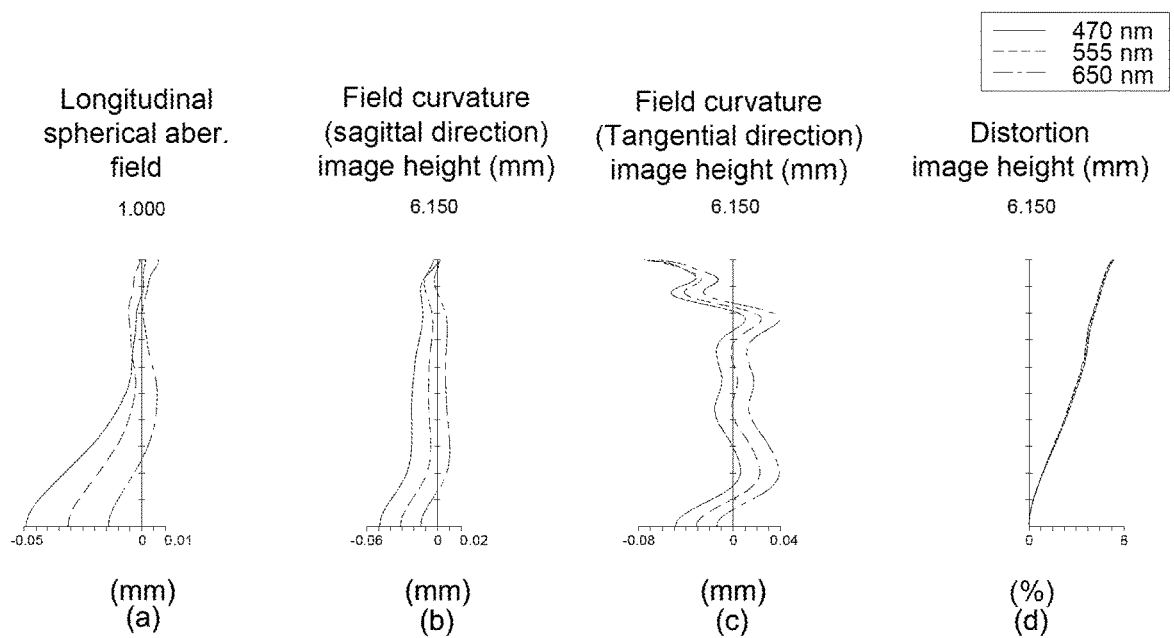
FIG. 15 depicts a chart of a longitudinal spherical aberration and other kinds of optical aberrations of the third embodiment of an optical imaging lens according to the present disclosure.

Reference is now made to FIGS. 14-17. FIG. 14 illustrates an example cross-sectional view of an optical imaging lens 3 according to a third example embodiment. FIG. 15 shows example charts of a longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 13 shows an example table of aspherical data of the optical imaging lens 3 according to the third example embodiment.

As shown in FIG. 14, the optical imaging lens 3 of the present embodiment, in an order from an object side A1 to an image side A2 Aalong an optical axis, may comprise an aperture stop STO, a first lens element L1, a second lens element L2, a third lens element L3, a fourth lens element L4, a fifth lens element L5, a sixth lens element L6, a seventh lens element L7, and an eighth lens element L8.

The arrangement of the convex or concave surface structures of the lens elements, including the object-side surfaces UAL L2A1, L3A1, L4A1, L5A1, L6A1, L7A1, and L8A1 and the image-side surfaces L1A2, L2A2, L3A2, L4A2, L6A2, L7A2, and L8A2, and the refracting powers of the lens elements of the present embodiment may be generally similar to the optical imaging lens 1, but the differences between the optical imaging lens 1 and the optical imaging lens 3 may include the concave or convex surface structures of the image-side surface L5A2. Additional differences may include a radius of curvature, a thickness, aspherical data, and/or an effective focal length of each lens element. More specifically, the periphery region L5A2P of the image-side surface L5A2 Aof the fifth lens element L5 Lmay be concave.

Here, in the interest of clearly showing the drawings of the present embodiment, only the surface shapes which are different from that in the first embodiment may be labeled. Please refer to FIG. 16 for the optical characteristics of each lens element in the optical imaging lens 3 of the present embodiment.

From the vertical deviation of each curve shown in FIG. 15($a$), the offset of the off-axis light relative to the image point may be within ±0.05 mm. Referring to FIG. 15($b$), and the focus variation with respect to the three different wavelengths in the whole field may fall within ±0.06 mm. Referring to FIG. 15($c$), the focus variation with respect to the three different wavelengths in the whole field may fall within ±0.08 mm. Referring to FIG. 15($d$), the variation of the distortion aberration of the optical imaging lens 3 may be within ±8%.

As shown in FIG. 15 and FIG. 16, in comparison with the first embodiment, the field curvature aberration in the tangential direction, the distortion aberration in the third embodiment may be smaller, and the field of view in the third embodiment may be larger.

Please refer to FIG. 46A for the values of (ImgH+EFL)/Fno, Tmax/Tmin, V4+V5+V6, HFOV/EFL, TTL/(G34+T8), (EFL+BFL)/(Gmax+Gmin), ALT/(G67+T7+G78), AAG/(T5+T6+T8), (T4+T6)/(G12+G23+G34+G45), HFOV/(T5+T6+BFL), TL/(G45+G56), (EFL+T1)/(T3+T4), (T1+G12+T2)/(T4+G78), ALT/Gmax, (T1+Gmax)/(T3+T7), HFOV/TTL, TL/BFL, (EFL+TL)/ImgH, (G23+T3+BFL)/(T7+G78), and (AAG+BFL)/Gmax of the present embodiment.

Figure 18:
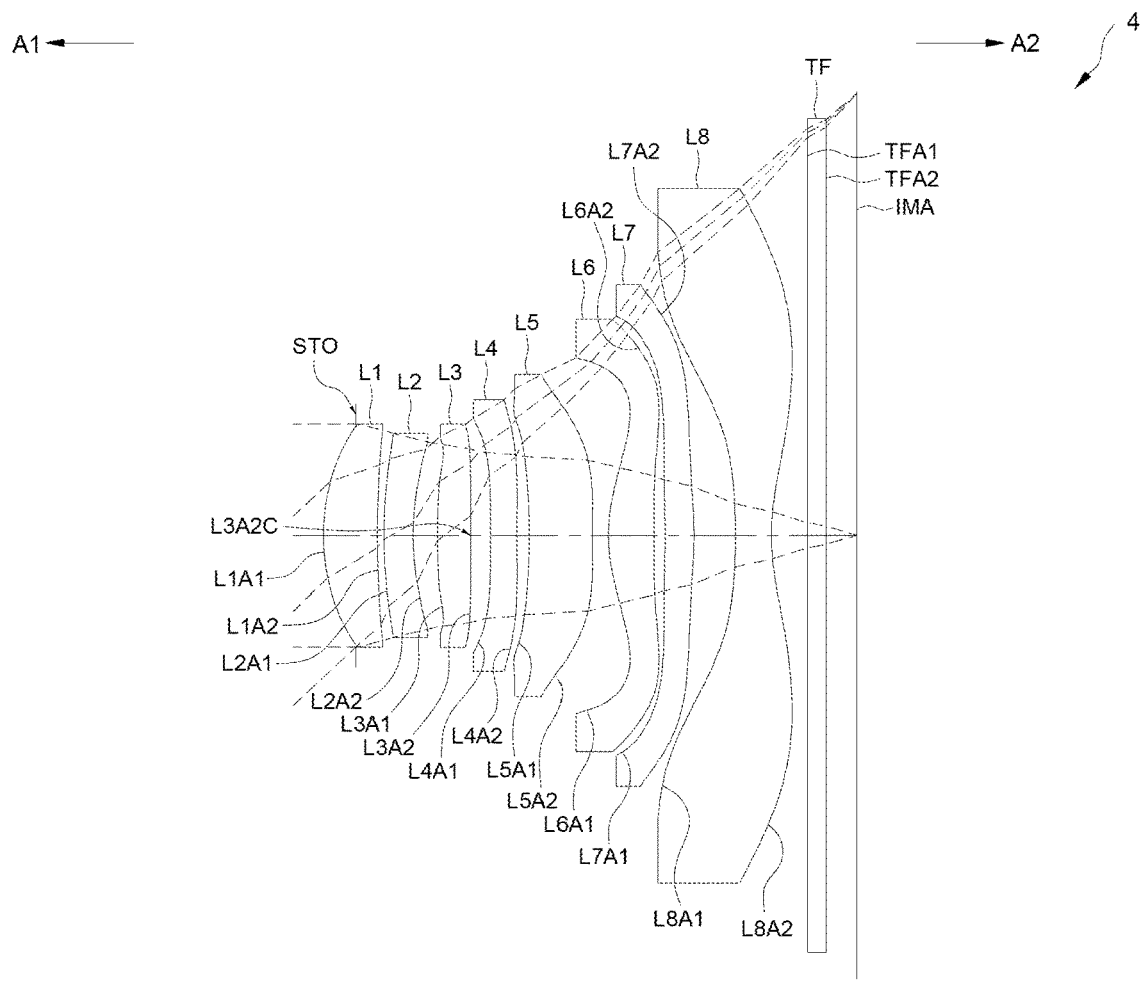
FIG. 18 depicts a cross-sectional view of the fourth embodiment of an optical imaging lens according to the present disclosure.
Figure 19:
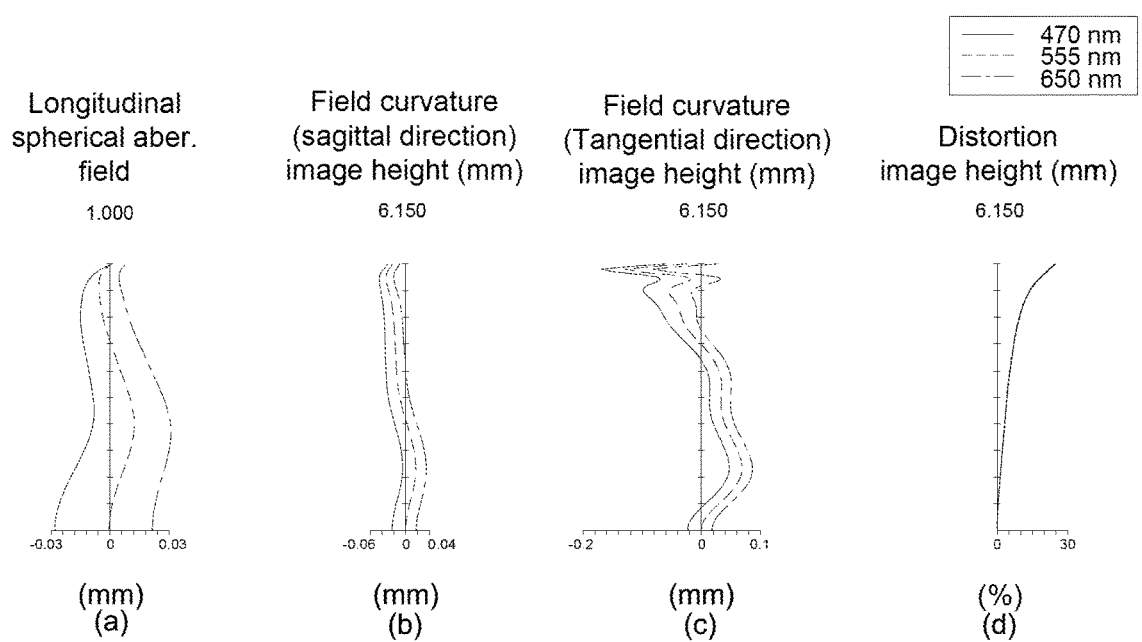
FIG. 19 depicts a chart of a longitudinal spherical aberration and other kinds of optical aberrations of the fourth embodiment of an optical imaging lens according to the present disclosure.

Reference is now made to FIGS. 18-21. FIG. 18 illustrates an example cross-sectional view of an optical imaging lens 4 according to a fourth example embodiment. FIG. 19 shows example charts of a longitudinal spherical aberration and other kinds of optical aberrations of the optical imaging lens 4 according to the fourth example embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment.

As shown in FIG. 18, the optical imaging lens 4 of the present embodiment, in an order from an object side A1 to an image side A2 Aalong an optical axis, may comprise an aperture stop STO, a first lens element L1, a second lens element L2, a third lens element L3, a fourth lens element L4, a fifth lens element L5, a sixth lens element L6, a seventh lens element L7, and an eighth lens element L8.

The arrangement of the convex or concave surface structures of the lens elements, including the object-side surfaces L1A1, L2A1, L3A1, L4A1, L5A1, L6A1, L7A1, and L8A1 and the image-side surfaces L1A2, L2A2, L4A2, L5A2, L6A2, L7A2, and L8A2, and the refracting powers of the lens elements of the present embodiment may be generally similar to the optical imaging lens 1, but the differences between the optical imaging lens 1 and the optical imaging lens 4 may include the concave or convex surface structures of the image-side surface L3A2. Additional differences may include a radius of curvature, a thickness, aspherical data, and/or an effective focal length of each lens element. More specifically, the optical axis region L3A2C of the image-side surface L3A2 Aof the third lens element L3 Lmay be concave.

Here, in the interest of clearly showing the drawings of the present embodiment, only the surface shapes which are different from that in the first embodiment may be labeled. Please refer to FIG. 20 for the optical characteristics of each lens element in the optical imaging lens 4 of the present embodiment.

From the vertical deviation of each curve shown in FIG. 19($a$), the offset of the off-axis light relative to the image point may be within ±0.03 mm. Referring to FIG. 19($b$), and the focus variation with respect to the three different wavelengths in the whole field may fall within ±0.06 mm. Referring to FIG. 19($c$), the focus variation with respect to the three different wavelengths in the whole field may fall within ±0.2 mm. Referring to FIG. 19($d$), the variation of the distortion aberration of the optical imaging lens 4 may be within ±30%.

As shown in FIG. 19 and FIG. 20, in comparison with the first embodiment, the system length of the optical imaging lens 4 may be shorter, and the field of view in the fourth embodiment may be larger.

Please refer to FIG. 46A for the values of (ImgH+EFL)/Fno, Tmax/Tmin, V4+V5+V6, HFOV/EFL, TTL/(G34+T8), (EFL+BFL)/(Gmax+Gmin), ALT/(G67+T7+G78), AAG/(T5+T6+T8), (T4+T6)/(G12+G23+G34+G45), HFOV/(T5+T6+BFL), TL/(G45+G56), (EFL+T1)/(T3+T4), (T1+G12+T2)/(T4+G78), ALT/Gmax, (T1+Gmax)/(T3+T7), HFOV/TTL, TL/BFL, (EFL+TL)/ImgH, (G23+T3+BFL)/(T7+G78), and (AAG+BFL)/Gmax of the present embodiment.

Figure 22:
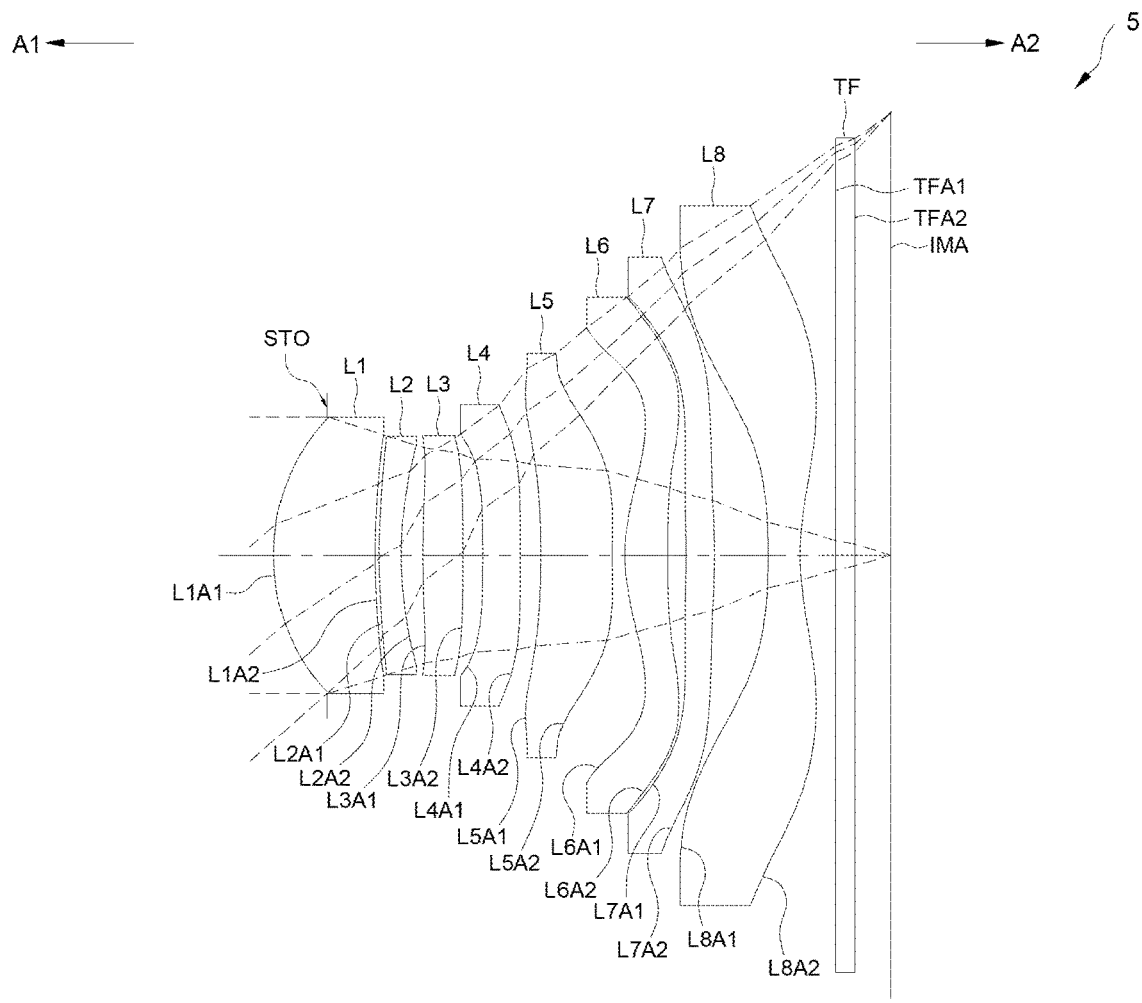
FIG. 22 depicts a cross-sectional view of the fifth embodiment of an optical imaging lens according to the present disclosure.
Figure 23:
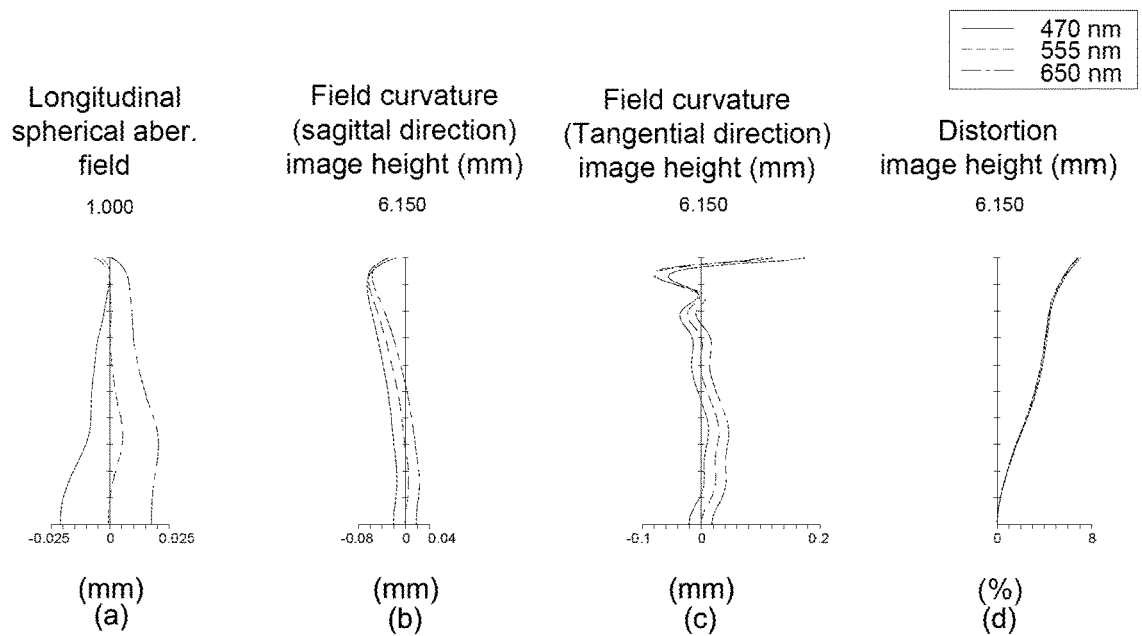
FIG. 23 depicts a chart of a longitudinal spherical aberration and other kinds of optical aberrations of the fifth embodiment of the optical imaging lens according to the present disclosure.

Reference is now made to FIGS. 22-25. FIG. 22 illustrates an example cross-sectional view of an optical imaging lens 5 according to a fifth example embodiment. FIG. 23 shows example charts of a longitudinal spherical aberration and other kinds of optical aberrations of the optical imaging lens 5 according to the fifth example embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment.

As shown in FIG. 22 the optical imaging lens 5 of the present embodiment, in an order from an object side A1 to an image side A2 Aalong an optical axis, may comprise an aperture stop STO, a first lens element L1, a second lens element L2, a third lens element L3, a fourth lens element L4, a fifth lens element L5, a sixth lens element L6, a seventh lens element L7, and an eighth lens element L8.

The arrangement of the convex or concave surface structures of the lens elements, including the object-side surfaces L1A1, L2A1, L3A1, L4A1, L5A1, L6A1, L7A1, and L8A1 and the image-side surfaces L1A2, L2A2, L3A2, L4A2, L5A2, L6A2, L7A2, and L8A2, and the refracting powers of the lens elements of the present embodiment may be generally similar to the optical imaging lens 1. Additional differences may include a radius of curvature, a thickness, aspherical data, and/or an effective focal length of each lens element.

Here, in the interest of clearly showing the drawings of the present embodiment, only the surface shapes which are different from that in the first embodiment may be labeled. Please refer to FIG. 24 for the optical characteristics of each lens element in the optical imaging lens 5 of the present embodiment.

From the vertical deviation of each curve shown in FIG. 23(a), the offset of the off-axis light relative to the image point may be within ±0.025 mm. Referring to FIG. 23(b), and the focus variation with respect to the three different wavelengths in the whole field may fall within ±0.08 mm. Referring to FIG. 23(c), the focus variation with respect to the three different wavelengths in the whole field may fall within ±0.2 mm. Referring to FIG. 23(d), the variation of the distortion aberration of the optical imaging lens 5 may be within ±8%.

As shown in FIG. 23 and FIG. 24, in comparison with the first embodiment, the longitudinal spherical aberration and the distortion aberration of the fifth embodiment may be smaller, the system length of the optical imaging lens 5 may be shorter, and the field of view in the fifth embodiment may be larger.

Please refer to FIG. 46A for the values of (ImgH+EFL)/Fno, Tmax/Tmin, V4+V5+V6, HFOV/EFL, TTL/(G34+T8), (EFL+BFL)/(Gmax+Gmin), ALT/(G67+T7+G78), AAG/(T5+T6+T8), (T4+T6)/(G12+G23+G34+G45), HFOV/(T5+T6+BFL), TL/(G45+G56), (EFL+T1)/(T3+T4), (T1+G12+T2)/(T4+G78), ALT/Gmax, (T1+Gmax)/(T3+T7), HFOV/TTL, TL/BFL, (EFL+TL)/ImgH, (G23+T3+BFL)/(T7+G78), and (AAG+BFL)/Gmax of the present embodiment.

Figure 26:
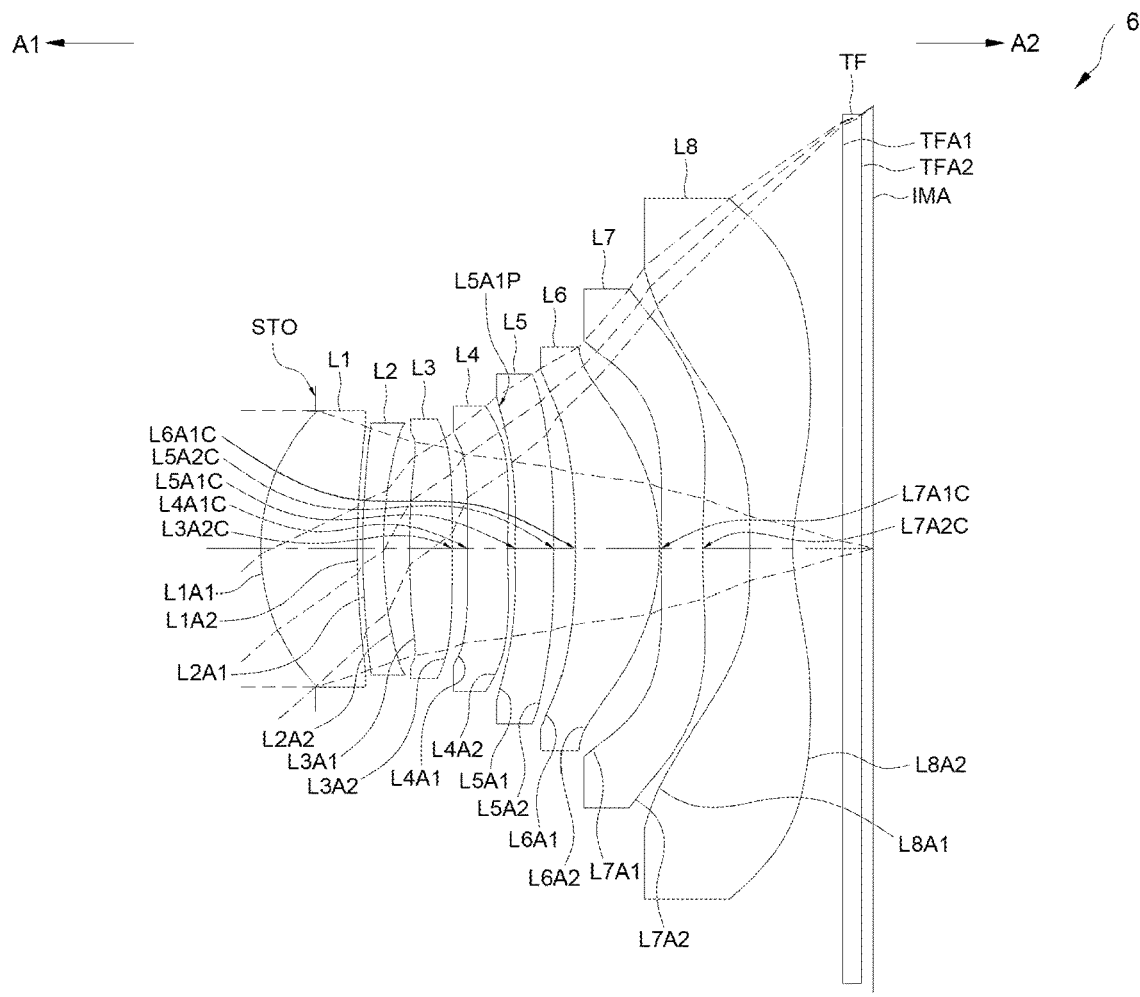
FIG. 26 depicts a cross-sectional view of the sixth embodiment of an optical imaging lens elements according to the present disclosure.
Figure 27:
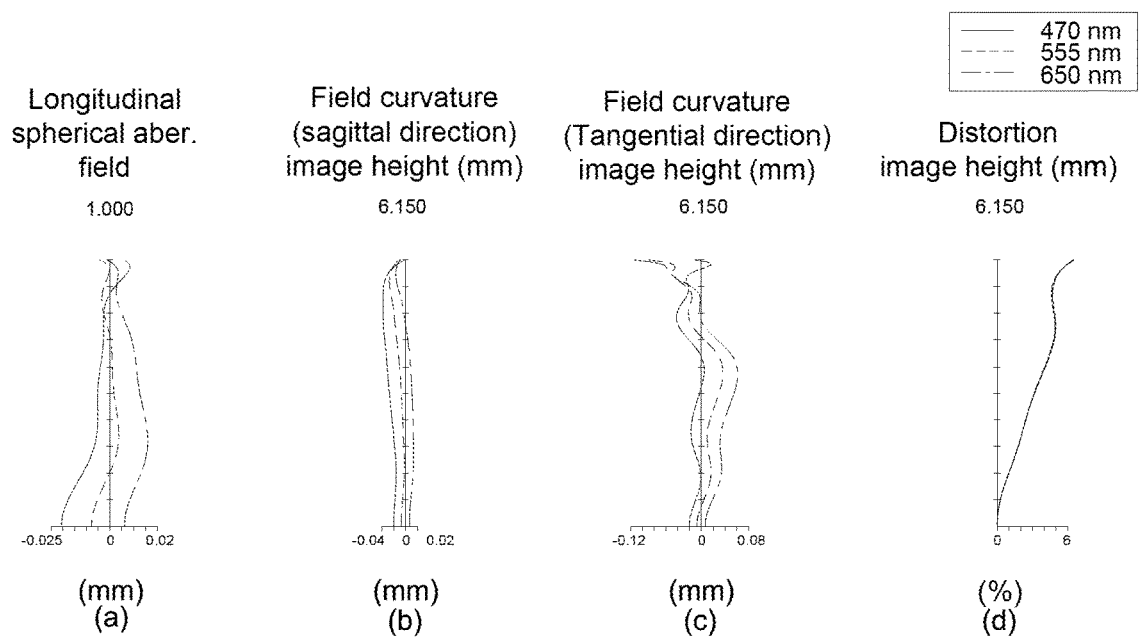
FIG. 27 depicts a chart of a longitudinal spherical aberration and other kinds of optical aberrations of the sixth embodiment of the optical imaging lens according to the present disclosure.

Reference is now made to FIGS. 26-29. FIG. 26 illustrates an example cross-sectional view of an optical imaging lens 6 according to a sixth example embodiment. FIG. 27 shows example charts of a longitudinal spherical aberration and other kinds of optical aberrations of the optical imaging lens 6 according to the sixth example embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment.

As shown in FIG. 26 the optical imaging lens 6 of the present embodiment, in an order from an object side A1 to an image side A2 Aalong an optical axis, may comprise an aperture stop STO, a first lens element L1, a second lens element L2, a third lens element L3, a fourth lens element L4, a fifth lens element L5, a sixth lens element L6, a seventh lens element L7, and an eighth lens element L8.

The arrangement of the convex or concave surface structures of the lens elements, including the object-side surfaces L1 LA1, L2A1, L3A1, and L8A1 and the image-side surfaces L1A2, L2A2, L4A2, L6A2, and L8A2, and the refracting powers of the lens elements of the present embodiment may be generally similar to the optical imaging lens 1, but the differences between the optical imaging lens 1 and the optical imaging lens 6 may include the refracting power of the fifth lens element L5 Land the seventh lens element L7, and the concave or convex surface structures of the object-side surfaces L4A1, L5A1, L6A1, L7A1 and the image-side surfaces L3A2, L5A2, L7A2. Additional differences may include a radius of curvature, a thickness, aspherical data, and/or an effective focal length of each lens element. More specifically, the optical axis region L3A2C of the image-side surface L3A2 Aof the third lens element L3 Lmay be concave, the optical axis region L4A1C of the object-side surface L4A1 of the fourth lens element L4 Lmay be convex, the optical axis region L5A1C of the object-side surface L5A1 of the fifth lens element L5 Lmay be convex, the periphery region L5A1P of the object-side surface L5A1 of the fifth lens element L5 Lmay be concave, the optical axis region L5A2C of the image-side surface L5A2 Aof the fifth lens element L5 Lmay be convex, the optical axis region L6A1C of the object-side surface L6A1 of the sixth lens element L6 Lmay be concave, the optical axis region L7A1C of the object-side surface L7A1 of the seventh lens element L7 may be convex, the optical axis region L7A2C of the image-side surface L7A2 Aof the seventh lens element L7 Lmay be concave, the fifth lens element L5 Lmay have positive refracting power, and the seventh lens element L7 Lmay have negative power.

Here, in the interest of clearly showing the drawings of the present embodiment, only the surface shapes which are different from that in the first embodiment may be labeled. Please refer to FIG. 28 for the optical characteristics of each lens element in the optical imaging lens 6 of the present embodiment.

From the vertical deviation of each curve shown in FIG. 27(a), the offset of the off-axis light relative to the image point may be within ±0.025 mm. Referring to FIG. 27(b), and the focus variation with respect to the three different wavelengths in the whole field may fall within ±0.04 mm. Referring to FIG. 27(c), the focus variation with respect to the three different wavelengths in the whole field may fall within ±0.12 mm. Referring to FIG. 27(d), the variation of the distortion aberration of the optical imaging lens 6 may be within ±6%.

As shown in FIG. 27 and FIG. 28, in comparison with the first embodiment, the longitudinal spherical aberration, the field curvature aberration in the sagittal direction, the field curvature aberration in the tangential direction, and the distortion aberration of the sixth embodiment may be smaller, the field of view of the sixth lens element may be larger, and the system length of the optical imaging lens 6 may be shorter.

Please refer to FIG. 46B for the values of (ImgH+EFL)/Fno, Tmax/Tmin, V4+V5+V6, HFOV/EFL, TTL/(G34+T8), (EFL+BFL)/(Gmax+Gmin), ALT/(G67+T7+G78), AAG/(T5+T6+T8), (T4+T6)/(G12+G23+G34+G45), HFOV/(T5+T6+BFL), TL/(G45+G56), (EFL+T1)/(T3+T4), (T1+G12+T2)/(T4+G78), ALT/Gmax, (T1+Gmax)/(T3+T7), HFOV/TTL, TL/BFL, (EFL+TL)/ImgH, (G23+T3+BFL)/(T7+G78), and (AAG+BFL)/Gmax of the present embodiment.

Figure 30:
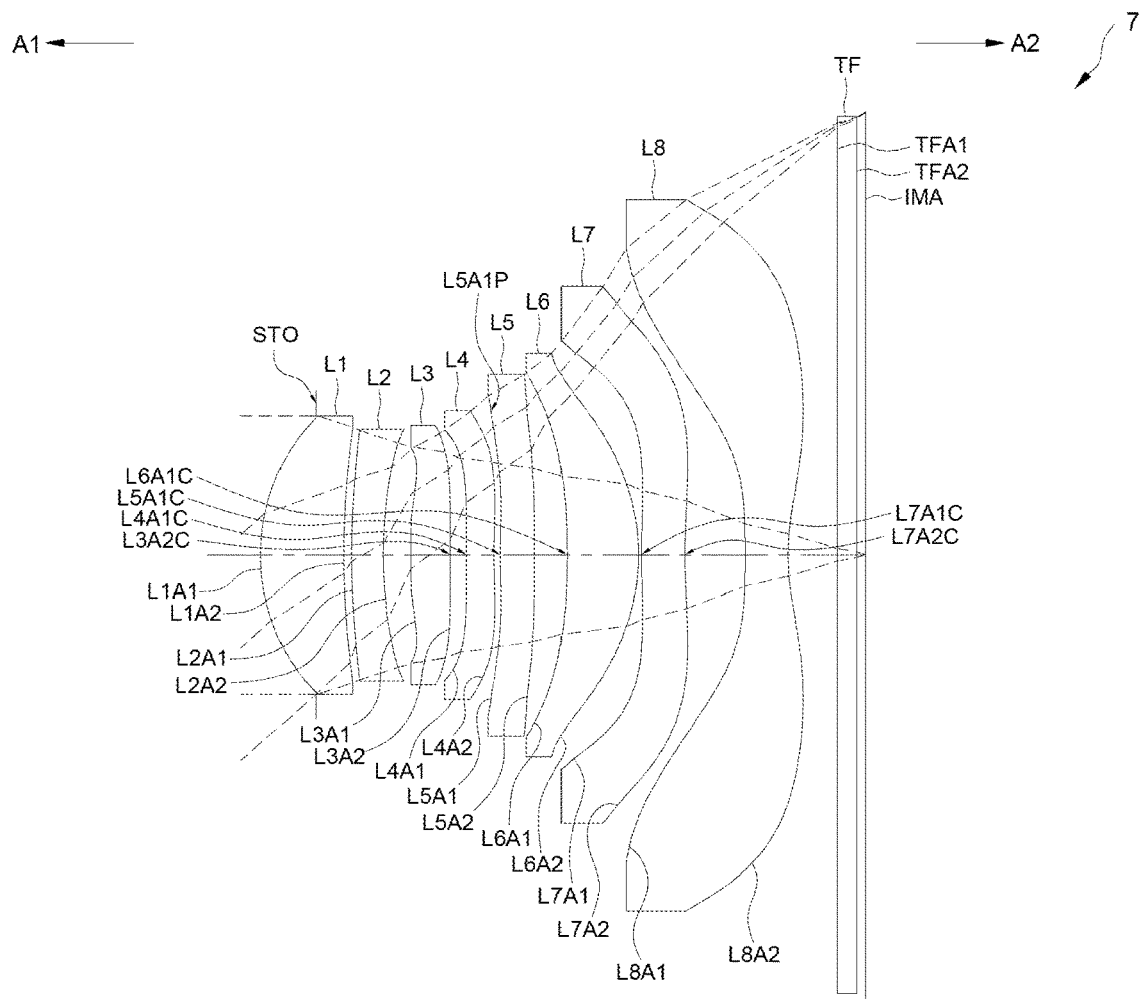
FIG. 30 depicts a cross-sectional view of the seventh embodiment of an optical imaging lens elements according to the present disclosure.
Figure 31:
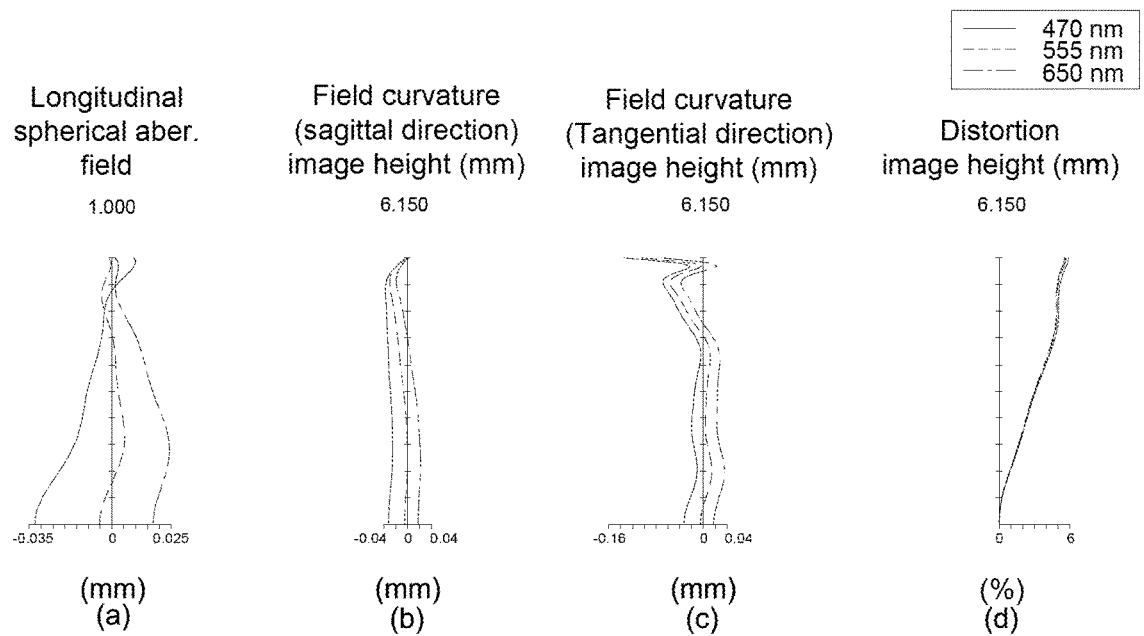
FIG. 31 depicts a chart of a longitudinal spherical aberration and other kinds of optical aberrations of the seventh embodiment of the optical imaging lens according to the present disclosure.

Reference is now made to FIGS. 30-33. FIG. 30 illustrates an example cross-sectional view of an optical imaging lens 7 according to a seventh example embodiment. FIG. 31 shows example charts of a longitudinal spherical aberration and other kinds of optical aberrations of the optical imaging lens 7 according to the seventh example embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment.

As shown in FIG. 30 the optical imaging lens 7 of the present embodiment, in an order from an object side A1 to an image side A2 Aalong an optical axis, may comprise an aperture stop STO, a first lens element L1, a second lens element L2, a third lens element L3, a fourth lens element L4, a fifth lens element L5, a sixth lens element L6, a seventh lens element L7, and an eighth lens element L8.

The arrangement of the convex or concave surface structures of the lens elements, including the object-side surfaces L1 LA1, L2A1, L3A1, and L8A1 and the image-side surfaces L1A2, L2A2, L4A2, L5A2, L6A2, and L8A2, and the refracting powers of the lens elements of the present embodiment may be generally similar to the optical imaging lens 1, but the differences between the optical imaging lens 1 and the optical imaging lens 7 may include the refracting power of the fifth lens element L5 Land the seventh lens element L7, the concave or convex surface structures of the object-side surfaces L4A1, L5A1, L6A1, L7A1 and the image-side surfaces L3A2, L7A2. Additional differences may include a radius of curvature, a thickness, aspherical data, and/or an effective focal length of each lens element. More specifically, the optical axis region L3A2C of the image-side surface L3A2 Aof the third lens element L3 Lmay be concave, the optical axis region L4A1C of the object-side surface L4A1 of the fourth lens element L4 Lmay be convex, the optical axis region L5A1C of the object-side surface L5A1 of the fifth lens element L5 Lmay be convex, the periphery region L5A1P of the object-side surface L5A1 of the fifth lens element L5 Lmay be concave, the optical axis region L6A1C of the object-side surface L6A1 of the sixth lens element L6 Lmay be concave, the optical axis region L7A1C of the object-side surface L7A1 of the seventh lens element L7 Lmay be convex, the optical axis region L7A2C of the image-side surface L7A2 Aof the seventh lens element L7 Lmay be concave, the fifth lens element L5 Lmay have positive refracting power, and the seventh lens element L7 may have negative refracting power.

Here, in the interest of clearly showing the drawings of the present embodiment, only the surface shapes which are different from that in the first embodiment may be labeled. Please refer to FIG. 32 for the optical characteristics of each lens element in the optical imaging lens 7 of the present embodiment.

From the vertical deviation of each curve shown in FIG. 31(a), the offset of the off-axis light relative to the image point may be within ±0.035 mm. Referring to FIG. 31(b), and the focus variation with respect to the three different wavelengths in the whole field may fall within ±0.04 mm. Referring to FIG. 31(c), the focus variation with respect to the three different wavelengths in the whole field may fall within ±0.16 mm. Referring to FIG. 31(d), the variation of the distortion aberration of the optical imaging lens 7 may be within ±6%.

As shown in FIG. 31 and FIG. 32, in comparison with the first embodiment, the field curvature aberration in the sagittal direction, the field curvature aberration in the tangential direction, and the distortion aberration of the seventh embodiment may be smaller, the field of view of the seventh lens element may be larger, and the system length of the optical imaging lens 7 may be shorter.

Please refer to FIG. 46B for the values of (ImgH+EFL)/Fno, Tmax/Tmin, V4+V5+V6, HFOV/EFL, TTL/(G34+T8), (EFL+BFL)/(Gmax+Gmin), ALT/(G67+T7+G78), AAG/(T5+T6+T8), (T4+T6)/(G12+G23+G34+G45), HFOV/(T5+T6+BFL), TL/(G45+G56), (EFL+T1)/(T3+T4), (T1+G12+T2)/(T4+G78), ALT/Gmax, (T1+Gmax)/(T3+T7), HFOV/TTL, TL/BFL, (EFL+TL)/ImgH, (G23+T3+BFL)/(T7+G78), and (AAG+BFL)/Gmax of the present embodiment.

Figure 34:
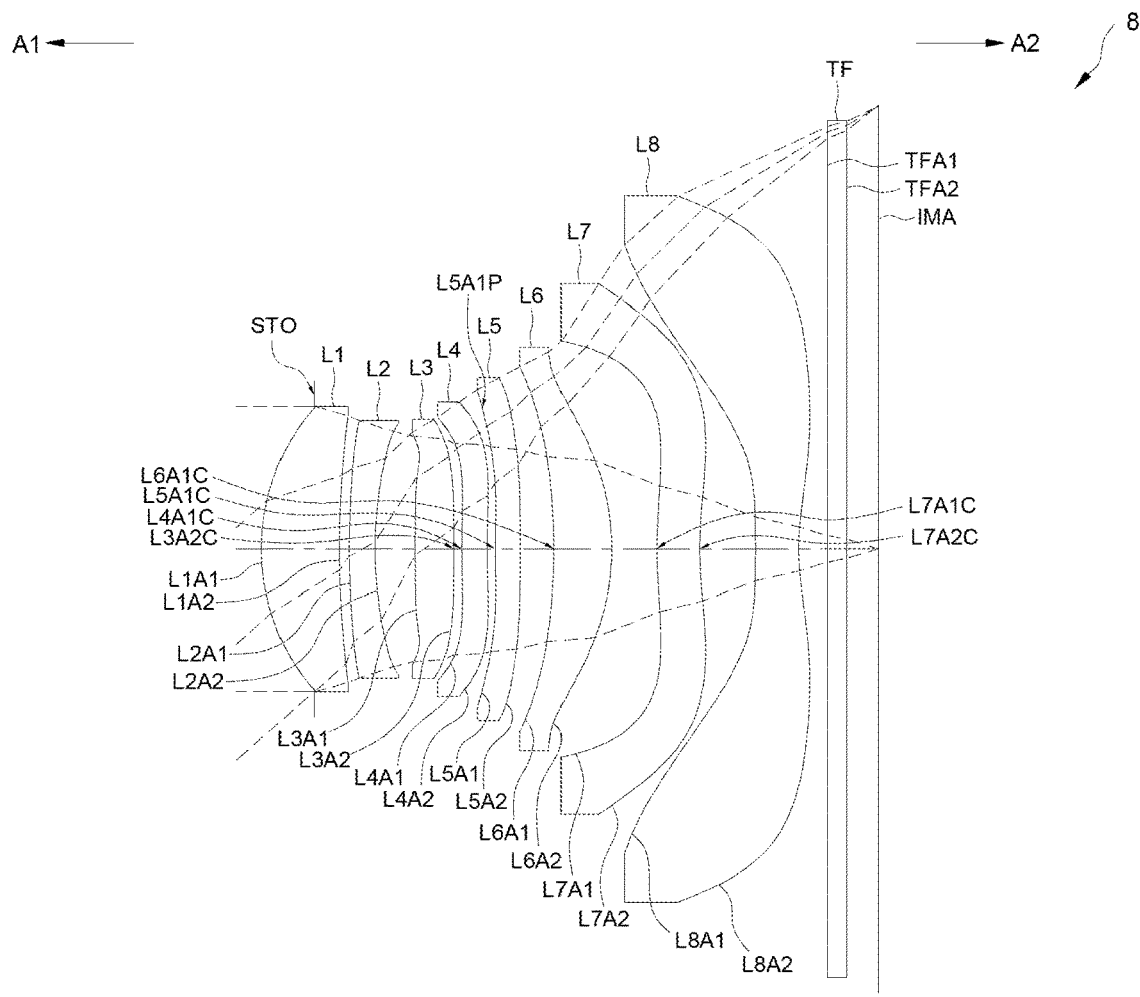
FIG. 34 depicts a cross-sectional view of the eighth embodiment of an optical imaging lens according to the present disclosure.
Figure 35:
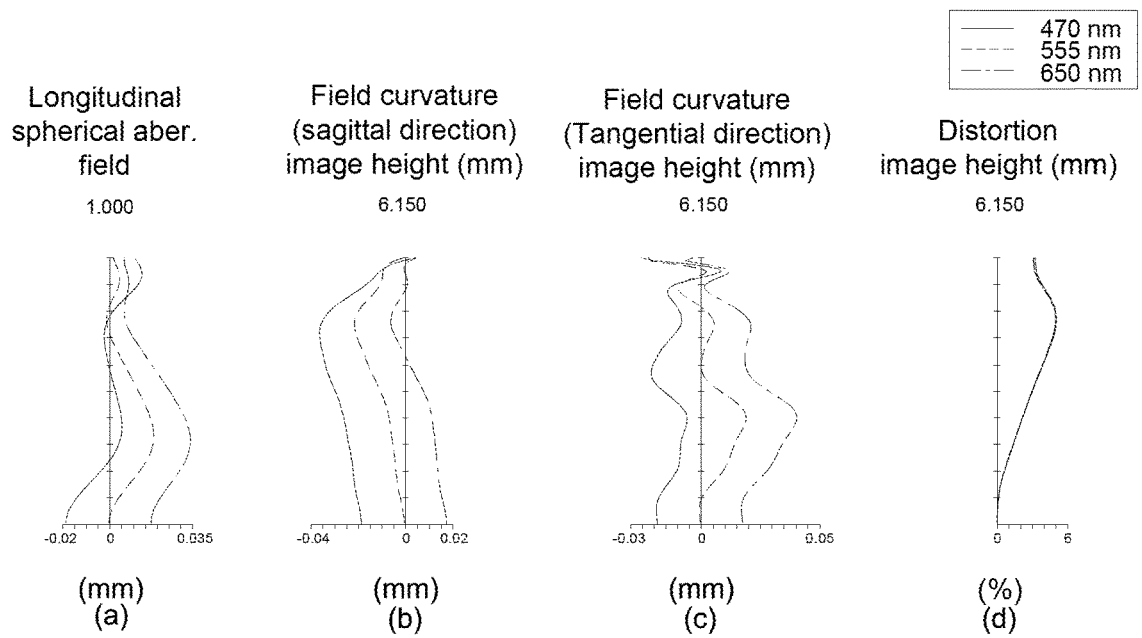
FIG. 35 depicts a chart of a longitudinal spherical aberration and other kinds of optical aberrations of the eighth embodiment of the optical imaging lens according to the present disclosure.

Reference is now made to FIGS. 34-37. FIG. 34 illustrates an example cross-sectional view of an optical imaging lens 8 according to an eighth example embodiment. FIG. 35 shows example charts of a longitudinal spherical aberration and other kinds of optical aberrations of the optical imaging lens 8 according to the eighth example embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment.

As shown in FIG. 34 the optical imaging lens 8 of the present embodiment, in an order from an object side A1 to an image side A2 Aalong an optical axis, may comprise an aperture stop STO, a first lens element L1, a second lens element L2, a third lens element L3, a fourth lens element L4, a fifth lens element L5, a sixth lens element L6, a seventh lens element L7, and an eighth lens element L8.

The arrangement of the convex or concave surface structures of the lens elements, including the object-side surfaces L1A1, L2A1, L3A1, and L8A1 and the image-side surfaces L1A2, L2A2, L4A2, L5A2, L6A2, and L8A2, and the refracting powers of the lens elements of the present embodiment may be generally similar to the optical imaging lens 1, but the differences between the optical imaging lens 1 and the optical imaging lens 8 may include the concave or convex surface structures of the object-side surfaces L4A1, L5A1, L6A1, L7A1 and the image-side surfaces L3A2, L7A2, and the refracting power of the fifth lens element L5 Land the seventh lens element L7. Additional differences may include a radius of curvature, a thickness, aspherical data, and/or an effective focal length of each lens element. More specifically, the optical axis region L3A2C of the image-side surface L3A2 Aof the third lens element L3 Lmay be concave, the optical axis region L4A1C of the object-side surface L4A1 of the fourth lens element L4 Lmay be convex, the optical axis region L5A1C of the object-side surface L5A1 of the fifth lens element L5 Lmay be convex, the periphery region L5A1P of the object-side surface L5A1 of the fifth lens element L5 Lmay be concave, the optical axis region L6A1C of the object-side surface L6A1 of the sixth lens element L6 Lmay be concave, the optical axis region L7A1C of the object-side surface L7A1 of the seventh lens element L7 Lmay be convex, the optical axis region L7A2C of the image-side surface L7A2 Aof the seventh lens element L7 Lmay be concave, the fifth lens element L5 Lmay have positive refracting power, and the seventh lens element L7 Lmay have negative refracting power.

Here, in the interest of clearly showing the drawings of the present embodiment, only the surface shapes which are different from that in the first embodiment may be labeled. Please refer to FIG. 36 for the optical characteristics of each lens element in the optical imaging lens 8 of the present embodiment.

From the vertical deviation of each curve shown in FIG. 35(a), the offset of the off-axis light relative to the image point may be within ±0.035 mm. Referring to FIG. 35(b), and the focus variation with respect to the three different wavelengths in the whole field may fall within ±0.04 mm. Referring to FIG. 35(c), the focus variation with respect to the three different wavelengths in the whole field may fall within ±0.05 mm. Referring to FIG. 35(d), the variation of the distortion aberration of the optical imaging lens 8 may be within ±6%.

As shown in FIG. 35 and FIG. 36, in comparison with the first embodiment, the field curvature aberration in the sagittal direction, the field curvature aberration in the tangential direction, and the distortion aberration of the eighth embodiment may be smaller, the field of view of the optical imaging lens 8 may be larger, and the system length of the optical imaging lens 8 may be shorter.

Please refer to FIG. 46B for the values of (ImgH+EFL)/ Fno, Tmax/Tmin, V4+V5+V6, HFOV/EFL, TTL/(G34+ T8), (EFL+BFL)/(Gmax+Gmin), ALT/(G67+T7+G78), AAG/(T5+T6+T8), (T4+T6)/(G12+G23+G34+G45), HFOV/(T5+T6+BFL), TL/(G45+G56), (EFL+T1)/(T3+T4), (T1+G12+T2)/(T4+G78), ALT/Gmax, (T1+Gmax)/(T3+ T7), HFOV/TTL, TL/BFL, (EFL+TL)/ImgH, (G23+T3+ BFL)/(T7+G78), and (AAG+BFL)/Gmax of the present embodiment.

Figure 38:
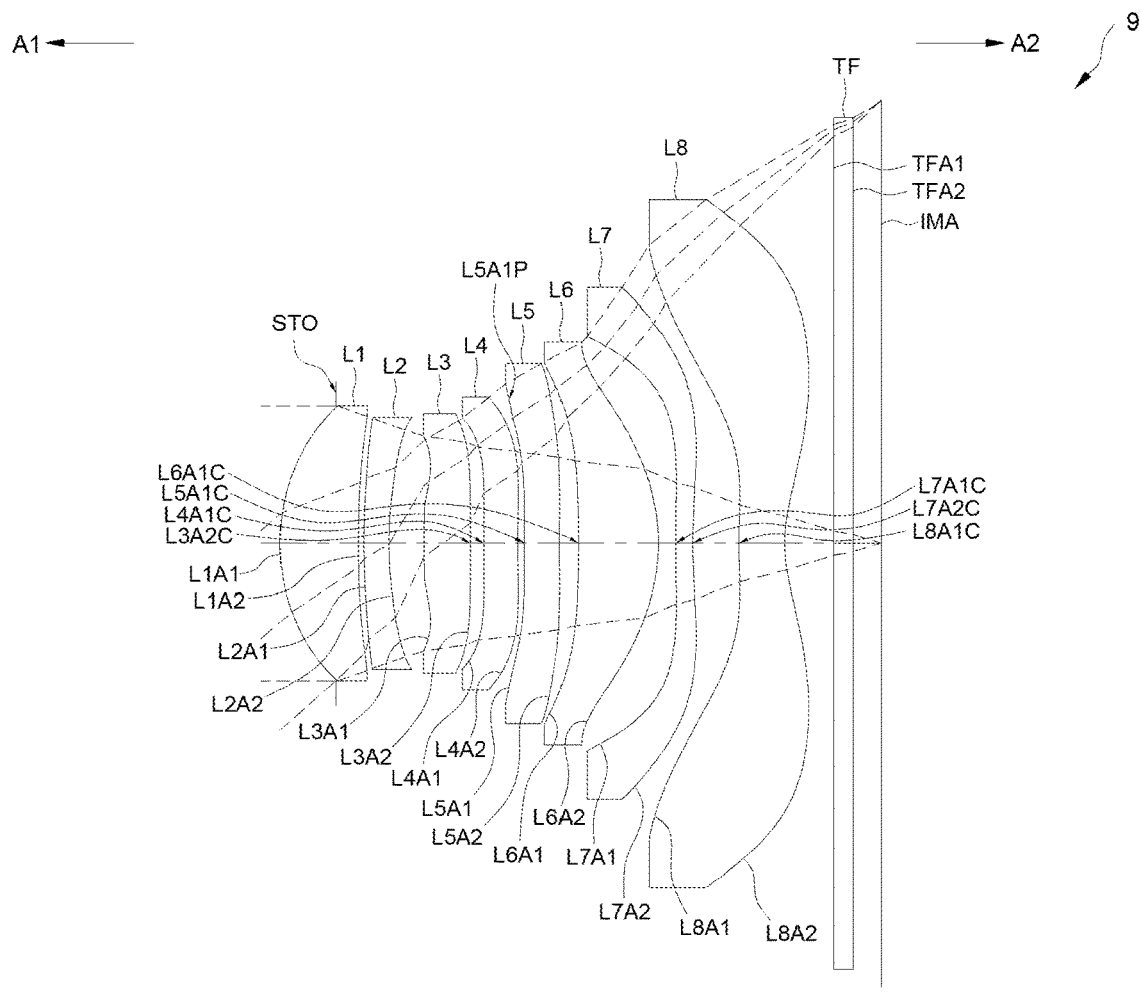
FIG. 38 depicts a cross-sectional view of the ninth embodiment of an optical imaging lens according to the present disclosure.
Figure 39:
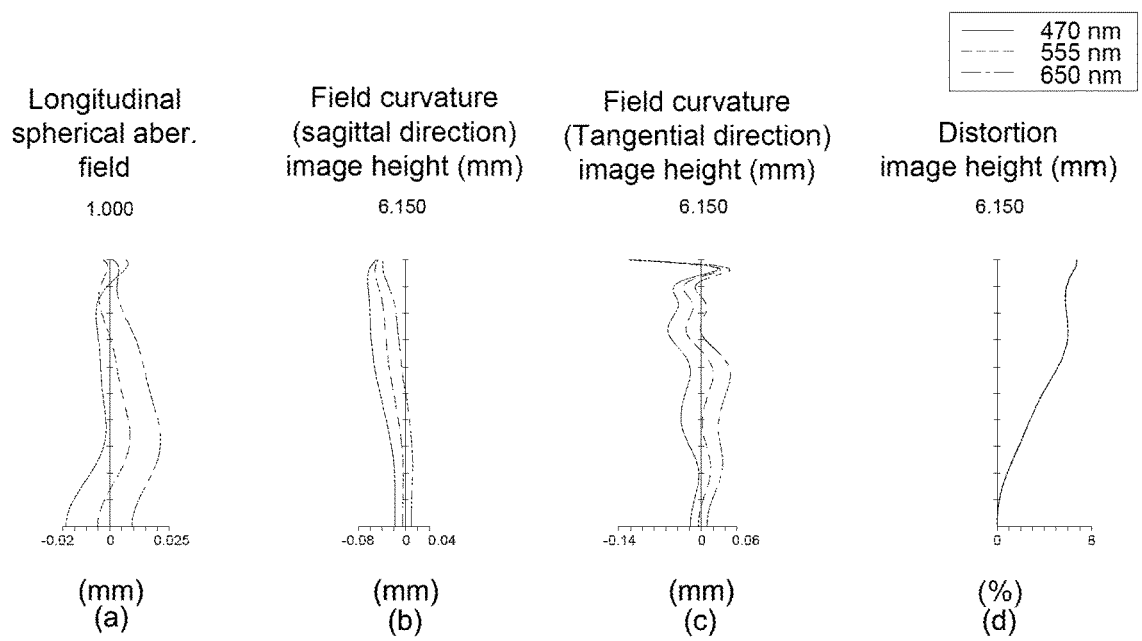
FIG. 39 depicts a chart of a longitudinal spherical aberration and other kinds of optical aberrations of the ninth embodiment of the optical imaging lens according to the present disclosure.

Reference is now made to FIGS. 38-41. FIG. 38 illustrates an example cross-sectional view of an optical imaging lens 9 according to a ninth example embodiment. FIG. 39 shows example charts of a longitudinal spherical aberration and other kinds of optical aberrations of the optical imaging lens 9 according to the ninth example embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment.

As shown in FIG. 38 the optical imaging lens 9 of the present embodiment, in an order from an object side A1 to an image side A2 Aalong an optical axis, may comprise an aperture stop STO, a first lens element L1, a second lens element L2, a third lens element L3, a fourth lens element L4, a fifth lens element L5, a sixth lens element L6, a seventh lens element L7, and an eighth lens element L8.

The arrangement of the convex or concave surface structures of the lens elements, including the object-side surfaces L1A1, L2A1, and L3A1 and the image-side surfaces L1A2, L2A2, L4A2, L5A2, L6A2, and L8A2, and the refracting powers of the lens elements of the present embodiment may be generally similar to the optical imaging lens 1, but the differences between the optical imaging lens 1 and the optical imaging lens 9 may include the concave or convex surface structures of the object-side surfaces L4A1, L5A1, L6A1, L7A1, L8A1 and the image-side surfaces L3A2, L7A2, and the refracting power of the fifth lens element L5 Land the seventh lens element L7. Additional differences may include a radius of curvature, a thickness, aspherical data, and/or an effective focal length of each lens element. More specifically, the optical axis region L3A2C of the image-side surface L3A2 Aof the third lens element L3 Lmay be concave, the optical axis region L4A1C of the object-side surface L4A1 of the fourth lens element L4 Lmay be convex, the optical axis region L5A1C of the object-side surface L5A1 of the fifth lens element L5 Lmay be convex, the periphery region L5A1P of the object-side surface L5A1 of the fifth lens element L5 Lmay be concave, the optical axis region L6A1C of the object-side surface L6A1 of the sixth lens element L6 Lmay be concave, the optical axis region L7A1C of the object-side surface L7A1 of the seventh lens element L7 Lmay be convex, the optical axis region L7A2C of the image-side surface L7A2 Aof the seventh lens element L7 Lmay be concave, the optical axis region L8A1C of the object-side surface L8A1 of the eighth lens element L8 Lmay be convex, the fifth lens element L5 Lmay have positive refracting power, and the seventh lens element L7 Lmay have negative refracting power.

Here, in the interest of clearly showing the drawings of the present embodiment, only the surface shapes which are different from that in the first embodiment may be labeled.

Please refer to FIG. 40 for the optical characteristics of each lens element in the optical imaging lens 9 of the present embodiment.

From the vertical deviation of each curve shown in FIG. 39(a), the offset of the off-axis light relative to the image point may be within ±0.025 mm. Referring to FIG. 39(b), and the focus variation with respect to the three different wavelengths in the whole field may fall within ±0.08 mm. Referring to FIG. 39(c), the focus variation with respect to the three different wavelengths in the whole field may fall within ±0.14 mm. Referring to FIG. 39(d), the variation of the distortion aberration of the optical imaging lens 9 may be within ±8%.

As shown in FIG. 39 and FIG. 40, in comparison with the first embodiment, the longitudinal spherical aberration, the field curvature aberration in the tangential direction, and the distortion aberration of the ninth embodiment may be smaller, the field of view of the ninth lens element may be larger, and the system length of the optical imaging lens 9 may be shorter.

Please refer to FIG. 46B for the values of (ImgH+EFL)/ Fno, Tmax/Tmin, V4+V5+V6, HFOV/EFL, TTL/(G34+ T8), (EFL+BFL)/(Gmax+Gmin), ALT/(G67+T7+G78), AAG/(T5+T6+T8), (T4+T6)/(G12+G23+G34+G45), HFOV/(T5+T6+BFL), TL/(G45+G56), (EFL+T1)/(T3+T4), (T1+G12+T2)/(T4+G78), ALT/Gmax, (T1+Gmax)/(T3+ T7), HFOV/TTL, TL/BFL, (EFL+TL)/ImgH, (G23+T3+ BFL)/(T7+G78), and (AAG+BFL)/Gmax of the present embodiment.

Figure 42:
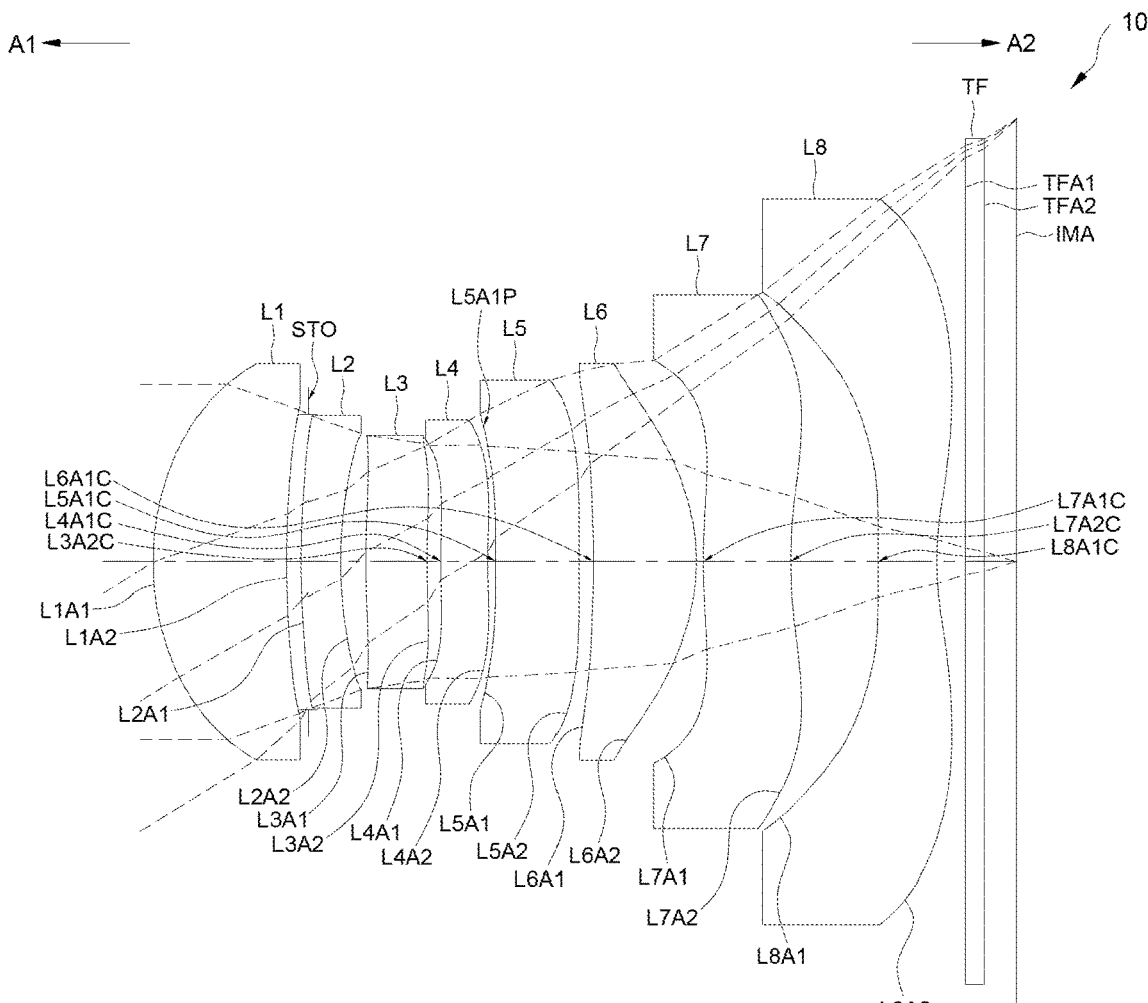
FIG. 42 depicts a cross-sectional view of the tenth embodiment of an optical imaging lens according to the present disclosure.
Figure 43:
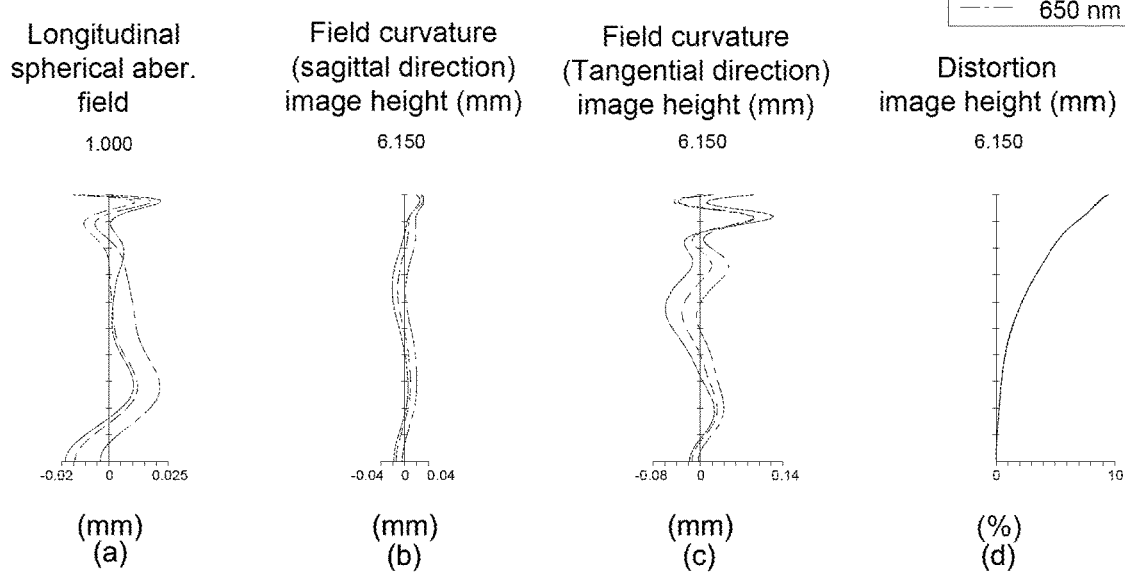
FIG. 43 depicts a chart of a longitudinal spherical aberration and other kinds of optical aberrations of the tenth embodiment of the optical imaging lens according to the present disclosure.

Reference is now made to FIGS. 42-45. FIG. 42 illustrates an example cross-sectional view of an optical imaging lens 10 according to a tenth example embodiment. FIG. 43 shows example charts of a longitudinal spherical aberration and other kinds of optical aberrations of the optical imaging lens 10 according to the tenth example embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment.

As shown in FIG. 42 the optical imaging lens 10 of the present embodiment, in an order from an object side A1 to an image side A2 Aalong an optical axis, may comprise a first lens element L1, an aperture stop STO, a second lens element L2, a third lens element L3, a fourth lens element L4, a fifth lens element L5, a sixth lens element L6, a seventh lens element L7, and an eighth lens element L8.

The arrangement of the convex or concave surface structures of the lens elements, including the object-side surfaces L1 LA1, L2A1, and L3A1 and the image-side surfaces L1A2, L2A2, L4A2, L5A2, L6A2, and L8A2, and the refracting powers of the lens elements of the present embodiment may be generally similar to the optical imaging lens 1, but the differences between the optical imaging lens 1 and the optical imaging lens 10 may include the concave or convex surface structures of the object-side surfaces L4A1, L5A1, L6A1, L7A1, L8A1 and the image-side surfaces L3A2, L7A2, and the refracting power of the fifth lens element L5 Land the seventh lens element L7. Additional differences may include a radius of curvature, a thickness, aspherical data, and/or an effective focal length of each lens element. More specifically, the optical axis region L3A2C of the image-side surface L3A2 Aof the third lens element L3 Lmay be concave, the optical axis region L4A1C of the object-side surface L4A1 of the fourth lens element L4 Lmay be convex, the optical axis region L5A1C of the object-side surface L5A1 of the fifth lens element L5 Lmay be convex, the periphery region L5A1P of the object-side surface L5A1 of the fifth lens element L5 Lmay be concave, the optical axis region L6A1C of the object-side surface L6A1 of the sixth lens element L6 Lmay be concave, the optical axis region L7A1C of the object-side surface L7A1 of the seventh lens element L7 Lmay be convex, the optical axis region L7A2C of the image-side surface L7A2 Aof the seventh lens element L7 Lmay be concave, the optical axis region L8A1C of the object-side surface L8A1 of the eighth lens element L8 Lmay be convex, the fifth lens element L5 Lmay have positive refracting power, and the seventh lens element L7 Lmay have negative refracting power.

Here, in the interest of clearly showing the drawings of the present embodiment, only the surface shapes which are different from that in the first embodiment may be labeled. Please refer to FIG. 44 for the optical characteristics of each lens element in the optical imaging lens 10 of the present embodiment.

From the vertical deviation of each curve shown in FIG. 43(a), the offset of the off-axis light relative to the image point may be within ±0.025 mm. Referring to FIG. 43(b), and the focus variation with respect to the three different wavelengths in the whole field may fall within ±0.04 mm. Referring to FIG. 43(c), the focus variation with respect to the three different wavelengths in the whole field may fall within ±0.14 mm. Referring to FIG. 43(d), the variation of the distortion aberration of the optical imaging lens 10 may be within ±10%.

As shown in FIG. 43 and FIG. 44, in comparison with the first embodiment, the longitudinal spherical aberration, the field curvature aberration in the sagittal direction, the field curvature aberration in the tangential direction, and the distortion aberration of the tenth embodiment may be smaller.

Please refer to FIG. 46B for the values of (ImgH+EFL)/Fno, Tmax/Tmin, V4+V5+V6, HFOV/EFL, TTL/(G34+T8), (EFL+BFL)/(Gmax+Gmin), ALT/(G67+T7+G78), AAG/(T5+T6+T8), (T4+T6)/(G12+G23+G34+G45), HFOV/(T5+T6+BFL), TL/(G45+G56), (EFL+T1)/(T3+T4), (T1+G12+T2)/(T4+G78), ALT/Gmax, (T1+Gmax)/(T3+T7), HFOV/TTL, TL/BFL, (EFL+TL)/ImgH, (G23+T3+BFL)/(T7+G78), and (AAG+BFL)/Gmax of the present embodiment.

The optical imaging lens in each embodiment of the present disclosure with the arrangements of the convex or concave surface structures described below may advantageously increase the field of view, and the image height, decrease the F-number and the system length of the optical imaging lens and maintain good optical characteristics: a periphery region of the image-side surface of the first lens element being concave, a periphery region of the image-side surface of the second lens element being concave, a periphery region of the object-side surface of the third lens element being concave, and the fourth lens element having negative refracting power; alternatively, a periphery region of image-side surface of the first lens element being concave, a periphery region of the object-side surface of the third lens element being concave, the fourth lens element having negative refracting power, and a periphery region of the image-side surface of the fourth lens element being convex; alternatively, a periphery region of the image-side surface of the first lens element being concave, the fourth lens element having negative refracting power, a periphery region of the image-side surface of the fourth lens element being convex, and a periphery region of the object-side surface of the eighth lens element being concave. The above three combinations may advantageously correct longitudinal spherical aberrations and field curvature aberration, and reduce the distortion aberration.

A numerical range including maximum and minimum values that is obtained based on combination and proportional relationships of the optical parameters disclosed in the embodiments of the disclosure may be implemented according thereto.

According to above disclosure, the longitudinal spherical aberration, the field curvature aberration and the variation of the distortion aberration of each embodiment may meet the use requirements of various electronic products which implement an optical imaging lens. Moreover, the off-axis light with respect to three different wavelengths may be focused around an image point, and the offset of the off-axis light for each curve relative to the image point may be controlled to effectively inhibit the longitudinal spherical aberration, the field curvature aberration and/or the variation of the distortion aberration. Further, as shown by the imaging quality data provided for each embodiment, the distance between the three different wavelengths may indicate that focusing ability and inhibiting ability for dispersion may be provided for different wavelengths.

In consideration of the non-predictability of the optical lens assembly, while the optical lens assembly may satisfy any one of inequalities described above, the optical lens assembly herein according to the disclosure may achieve a shortened length and smaller spherical aberration, field curvature aberration, and/or distortion aberration, provide a decreased F-number, an enlarged field of view, increase an imaging quality and/or assembly yield, and/or effectively improve drawbacks of a typical optical lens assembly.

While various embodiments in accordance with the disclosed principles are described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens comprising a first lens element, a second lens element, a third lens element, a fourth lens element, a fifth lens element, a sixth lens element, a seventh lens element and an eighth lens element sequentially from an object side to an image side along an optical axis, each of the first, second, third, fourth, fifth, sixth, seventh and eighth lens elements having an object-side surface facing toward the object side and allowing imaging rays to pass through as well as an image-side surface facing toward the image side and allowing the imaging rays to pass through, wherein:

an optical axis region of the image-side surface of the first lens element is concave;
a periphery region of the image-side surface of the first lens element is concave;
a periphery region of the image-side surface of the second lens element is concave;
the third lens element has positive refracting power;
a periphery region of the object-side surface of the third lens element is concave;
the fourth lens element has negative refracting power;
lens elements included by the optical imaging lens are only the eight lens elements described above;
an image height of the optical imaging lens is represented by ImgH;
an effective focal length of the optical imaging lens is represented by EFL;
a F-number of the optical imaging lens is represented by Fno;
a maximum lens element thickness among the first lens elements to the eighth lens elements along the optical axis represented by Tmax;
a minimum lens element thickness among the first lens elements to the eighth lens elements along the optical axis is represented by Tmin; and
the optical imaging lens satisfies Inequalities: (ImgH+EFL)/Fno≥6.000 mm and Tmax/Tmin≤4.600.

2. The optical imaging lens according to claim 1, wherein a half field of view of the optical imaging lens is represented by HFOV, and the optical imaging lens further satisfies an inequality: HFOV/EFL≤8.300 degrees/mm.

3. The optical imaging lens according to claim 1, wherein a distance from the object-side surface of the first lens element to an image plane along the optical axis is represented by TTL, a distance from the image-side surface of the third lens element to the object-side surface of the fourth lens element along the optical axis is represented by G34, a thickness of the eighth lens element along the optical axis is represented by T8, and the optical imaging lens further satisfies an inequality: TTL/(G34+T8)≤12.000.

4. The optical imaging lens according to claim 1, wherein a distance from the image-side surface of the eighth lens element to an image plane along the optical axis is represented by BFL, a maximum air gap among the first lens elements to the eighth lens elements along the optical axis is represented by Gmax, a minimum air gap among the first lens elements to the eighth lens elements along the optical axis is represented by Gmin, and the optical imaging lens further satisfies an inequality: (EFL+BFL)/(Gmax+Gmin)≥6.800.

5. The optical imaging lens according to claim 1, wherein a sum of the thicknesses of the first lens element, the second lens element, the third lens element, the fourth lens element, the fifth lens element, the sixth lens element, the seventh lens element, and the eighth lens element along the optical axis is represented by ALT, a distance from the image-side surface of the sixth lens element to the object-side surface of the seventh lens element along the optical axis is represented by G67, a distance from the image-side surface of the seventh lens element to the object-side surface of the eighth lens element along the optical axis is represented by G78, a thickness of the seventh lens element along the optical axis is represented by T7, and the optical imaging lens further satisfies an inequality: ALT/(G67+T7+G78)≤4.500.

6. The optical imaging lens according to claim 1, wherein a sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis, a distance from the image-side surface of the fifth lens element to the object-side surface of the sixth lens element along the optical axis, a distance from the image-side surface of the sixth lens element to the object-side surface of the seventh lens element along the optical axis, and a distance from the image-side surface of the seventh lens element to the object-side surface of the eighth lens element along the optical axis is represented by AAG, a thickness of the fifth lens element along the optical axis is represented by T5, a thickness of the sixth lens element along the optical axis is represented by T6, a thickness of the eighth lens element along the optical axis is represented by T8, and the optical imaging lens further satisfies an inequality: AAG/(T5+T6+T8)≤1.600.

7. The optical imaging lens according to claim 1, wherein a thickness of the fourth lens element along the optical axis is represented by T4, a thickness of the sixth lens element along the optical axis is represented by T6, a distance from the image-side surface of the first lens element to the object-side surface of the second lens element along the optical axis is represented by G12, a distance from the image-side surface of the second lens element to the object-side surface of the third lens element along the optical axis is represented by G23, a distance from the image-side surface of the third lens element to the object-side surface of the fourth lens element along the optical axis is represented by G34, a distance from the image-side surface of the fourth lens element to the object-side surface of the fifth lens element along the optical axis is represented by G45, and the optical imaging lens further satisfies an inequality: (T4+T6)/(G12+G23+G34+G45)≥0.700.

8. An optical imaging lens comprising a first lens element, a second lens element, a third lens element, a fourth lens element, a fifth lens element, a sixth lens element, a seventh lens element and an eighth lens element sequentially from an object side to an image side along an optical axis, each of the first, second, third, fourth, fifth, sixth, seventh and eighth lens elements having an object-side surface facing toward the object side and allowing imaging rays to pass through as well as an image-side surface facing toward the image side and allowing the imaging rays to pass through, wherein:

an optical axis region of the image-side surface of the first lens element is concave;
a periphery region of the image-side surface of the first lens element is concave;
a periphery region of the object-side surface of the third lens element is concave;
the third lens element has positive refracting power;
the fourth lens element has negative refracting power;
a periphery region of the image-side surface of the fourth lens element is convex;
lens elements included by the optical imaging lens are only the eight lens elements described above;
an image height of the optical imaging lens is represented by ImgH;

an effective focal length of the optical imaging lens is represented by EFL;

a F-number of the optical imaging lens is represented by Fno;

a maximum lens element thickness among the first lens elements to the eighth lens elements along the optical axis represented by Tmax;

a minimum lens element thickness among the first lens elements to the eighth lens elements along the optical axis is represented by Tmin; and the optical imaging lens satisfies Inequalities: (ImgH+EFL)/Fno≥6.000 mm and Tmax/Tmin≤4.600.

9. The optical imaging lens according to claim 8, wherein a half field of view of the optical imaging lens is represented by HFOV, a thickness of the fifth lens element along the optical axis is represented by T5, a thickness of the sixth lens element along the optical axis is represented by T6, a distance from the image-side surface of the eighth lens element to an image plane along the optical axis is represented by BFL, and the optical imaging lens further satisfies an inequality: HFOV/(T5+T6+BFL)≤20.000 degrees/mm.

10. The optical imaging lens according to claim 8, wherein a distance from the object-side surface of the first lens element to the image-side surface of the eighth lens element along the optical axis is represented by TL, a distance from the image-side surface of the fourth lens element to the object-side surface of the fifth lens element along the optical axis is represented by G45, a distance from the image-side surface of the fifth lens element to the object-side surface of the sixth lens element along the optical axis is represented by G56, and the optical imaging lens further satisfies an inequality: TL/(G45+G56)≥9.000.

11. The optical imaging lens according to claim 8, wherein a thickness of the first lens element along the optical axis is represented by T1, a thickness of the third lens element along the optical axis is represented by T3 a thickness of the fourth lens element along the optical axis is represented by T4, and the optical imaging lens further satisfies an inequality: (EFL+T1)/(T3+T4)≥6.700.

12. The optical imaging lens according to claim 8, wherein a thickness of the first lens element along the optical axis is represented by T1, a thickness of the second lens element along the optical axis is represented by T2, a thickness of the fourth lens element along the optical axis is represented by T4, a distance from the image-side surface of the first lens element to the object-side surface of the second lens element along the optical axis is represented by G12, a distance from the image-side surface of the seventh lens element to the object-side surface of the eighth lens element along the optical axis is represented by G78, and the optical imaging lens further satisfies an inequality: (T1+G12+T2)/(T4+G78)≤1.400.

13. The optical imaging lens according to claim 8, wherein a sum of the thicknesses of the first lens element, the second lens element, the third lens element, the fourth lens element, the fifth lens element, the sixth lens element, the seventh lens element, and the eighth lens element along the optical axis is represented by ALT, a maximum air gap among the first lens elements to the eighth lens elements along the optical axis is represented by Gmax, and the optical imaging lens further satisfies an inequality: ALT/Gmax≥4.300.

14. The optical imaging lens according to claim 8, wherein a maximum air gap among the first lens elements to the eighth lens elements along the optical axis is represented by Gmax, a thickness of the first lens element along the optical axis is represented by T1, a thickness of the third lens element along the optical axis is represented by T3, a thickness of the seventh lens element along the optical axis is represented by T7, and the optical imaging lens further satisfies an inequality: (T1+Gmax)/(T3+T7)≥1.300.

15. An optical imaging lens comprising a first lens element, a second lens element, a third lens element, a fourth lens element, a fifth lens element, a sixth lens element, a seventh lens element and an eighth lens element sequentially from an object side to an image side along an optical axis, each of the first, second, third, fourth, fifth, sixth, seventh and eighth lens elements having an object-side surface facing toward the object side and allowing imaging rays to pass through as well as an image-side surface facing toward the image side and allowing the imaging rays to pass through, wherein:

a periphery region of the image-side surface of the first lens element is concave;

the fourth lens element has negative refracting power;

a periphery region of the image-side surface of the fourth lens element is convex;

a periphery region of the object-side surface of the eighth lens element is concave;

lens elements included by the optical imaging lens are only the eight lens elements described above;

an image height of the optical imaging lens is represented by ImgH;

an effective focal length of the optical imaging lens is represented by EFL;

a F-number of the optical imaging lens is represented by Fno;

a maximum lens element thickness among the first lens elements to the eighth lens elements along the optical axis represented by Tmax;

a minimum lens element thickness among the first lens elements to the eighth lens elements along the optical axis is represented by Tmin;

a maximum air gap among the first lens elements to the eighth lens elements along the optical axis is represented by Gmax;

a thickness of the first lens element along the optical axis is represented by T1;

a thickness of the third lens element along the optical axis is represented by T3;

a thickness of the seventh lens element along the optical axis is represented by T7;

an Abbe number of the fourth lens element is represented by V4;

an Abbe number of the fifth lens element is represented by V5;

an Abbe number of the sixth lens element is represented by V6; and the optical imaging lens satisfies Inequalities: (ImgH+EFL)/Fno≥6.000 mm, Tmax/Tmin≤4.600, (T1+Gmax)/(T3+T7)≥1.300 and V4+V5+V6≥100.000.

16. The optical imaging lens according to claim 15, wherein a half field of view of the optical imaging lens is represented by HFOV, a distance from the object-side surface of the first lens element to an image plane along the optical axis is represented by TTL, and the optical imaging lens further satisfies an inequality: HFOV/TTL≤7.000 degrees/mm.

17. The optical imaging lens according to claim 15, wherein a distance from the object-side surface of the first lens element to the image-side surface of the eighth lens element along the optical axis is represented by TL, a distance from the image-side surface of the eighth lens element to an image plane along the optical axis is represented by BFL, and the optical imaging lens further satisfies an inequality: TL/BFL≥5.200.

18. The optical imaging lens according to claim 15, wherein a distance from the object-side surface of the first lens element to the image-side surface of the eighth lens element along the optical axis is represented by TL, and the optical imaging lens further satisfies an inequality: (EFL+TL)/ImgH≤3.500.

19. The optical imaging lens according to claim 15, wherein a distance from the image-side surface of the second lens element to the object-side surface of the third lens element along the optical axis is represented by G23, a distance from the image-side surface of the seventh lens element to the object-side surface of the eighth lens element along the optical axis is represented by G78, a distance from the image-side surface of the eighth lens element to an image plane along the optical axis is represented by BFL, and the optical imaging lens further satisfies an inequality: (G23+T3+BFL)/(T7+G78)≤2.850.

20. The optical imaging lens according to claim 15, a distance from the image-side surface of the eighth lens element to an image plane along the optical axis is represented by BFL, a sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis, a distance from the image-side surface of the fifth lens element to the object-side surface of the sixth lens element along the optical axis, a distance from the image-side surface of the sixth lens element to the object-side surface of the seventh lens element along the optical axis, and a distance from the image-side surface of the seventh lens element to the object-side surface of the eighth lens element along the optical axis is represented by AAG, and the optical imaging lens further satisfies an inequality: (AAG+BFL)/Gmax≤5.250.

* * * * *